US010257159B2

(12) United States Patent
Kim

(10) Patent No.: US 10,257,159 B2
(45) Date of Patent: Apr. 9, 2019

(54) METHODS, SYSTEMS, AND APPARATUSES FOR PROVIDING A SINGLE NETWORK ADDRESS TRANSLATION CONNECTION FOR MULTIPLE DEVICES

(71) Applicant: Belkin International, Inc., Playa Vista, CA (US)

(72) Inventor: Ryan Yong Kim, Rolling Hills Estates, CA (US)

(73) Assignee: Belkin International, Inc., Playa Vista, CA (US)

( * ) Notice: Subject to any disclaimer, the term of this patent is extended or adjusted under 35 U.S.C. 154(b) by 192 days.

(21) Appl. No.: 14/958,700

(22) Filed: Dec. 3, 2015

(65) Prior Publication Data

US 2016/0164831 A1   Jun. 9, 2016

Related U.S. Application Data

(60) Provisional application No. 62/087,733, filed on Dec. 4, 2014, provisional application No. 62/087,673, filed on Dec. 4, 2014.

(51) Int. Cl.
*G06F 15/173* (2006.01)
*H04L 29/12* (2006.01)
(Continued)

(52) U.S. Cl.
CPC .......... *H04L 61/2528* (2013.01); *H04L 43/08* (2013.01); *H04L 61/2575* (2013.01);
(Continued)

(58) Field of Classification Search
CPC ... H04L 63/0281; H04L 65/102; H04L 67/28; H04L 67/2814; H04L 61/2528;
(Continued)

(56) References Cited

U.S. PATENT DOCUMENTS 6,119,162 A * 9/2000 Li ........................... H04L 29/06
709/220
9,191,209 B2   11/2015 Erickson et al.
(Continued)

OTHER PUBLICATIONS

International Search Report and Written Opinion issued in International Application No. PCT/US2015/063938 dated Feb. 23, 2015, 16 pages.
(Continued)

*Primary Examiner* — Liang Che A Wang
*Assistant Examiner* — Johnny B Aguiar
(74) *Attorney, Agent, or Firm* — Kilpatrick Townsend & Stockton LLP

(57) ABSTRACT

Techniques and systems for operating a device as a proxy network address translation device for other devices are provided. For example, a method, computing device, or computer-program product may be provided. In one example, a method may include receiving a communication that includes a performance metric of one or more devices on a local network. The computing device and the one or more devices share a common network service provider. The method may further include determining, based on the performance metric, that the computing device is selected for operating as a proxy network address translation device for the one or more devices that share the common network service provider. The method may further include aggregating network address translation traversal for the one or more devices, including establishing a single network address translation connection with the common network service provider. Communications of the one or more devices can then be communicated over the single network address translation connection. The method may further include causing a transmitter to transmit communications of the one or more devices over the single network address translation connection with the common network service provider.

17 Claims, 29 Drawing Sheets

(51) Int. Cl.
   *H04L 12/26*   (2006.01)
   *H04L 29/06*   (2006.01)
   *H04L 29/08*   (2006.01)

(52) U.S. Cl.
   CPC ........ *H04L 61/2589* (2013.01); *H04L 65/102* (2013.01); *H04L 67/28* (2013.01); *H04L 61/2514* (2013.01); *H04L 63/0281* (2013.01); *H04L 67/1008* (2013.01); *H04L 67/2814* (2013.01)

(58) Field of Classification Search
   CPC ............ H04L 61/2589; H04L 61/2575; H04L 61/2514; H04L 43/08; H04L 67/1008
   USPC ................ 709/217, 219, 223, 224, 227, 238
   See application file for complete search history.

(56) References Cited

U.S. PATENT DOCUMENTS

| | | | | |
|---|---|---|---|---|
| 2004/0028035 | A1* | 2/2004 | Read | H04L 29/06027 370/352 |
| 2006/0031520 | A1 | 2/2006 | Bedekar et al. | |
| 2007/0255856 | A1* | 11/2007 | Reckamp | H04L 12/2818 709/250 |
| 2008/0022336 | A1 | 1/2008 | Howcroft et al. | |
| 2010/0251312 | A1* | 9/2010 | Albano | H04L 12/2801 725/78 |
| 2012/0284328 | A1* | 11/2012 | Chung | H04L 67/2833 709/203 |
| 2012/0317166 | A1* | 12/2012 | Schleifer | H04L 67/2814 709/202 |
| 2013/0044669 | A1* | 2/2013 | Song | H04L 12/189 370/312 |
| 2016/0150443 | A1* | 5/2016 | Suryavanshi | H04L 67/1042 370/331 |

OTHER PUBLICATIONS

Border Hughes Network Systems M Kojo University of Helsinki J Griner NASA Glenn Research Center G Montenegro Sun Microsystems J Et: "Performance Enhancing Proxies Intended to Mitigate Link-Related Degradations; rfc3135.txt", 5. JCT-VC Meeting; 96. MPEG Meeting; Mar. 16, 2011-Mar. 23, 2011; Geneva; URL: http://wftp3.itu.int/av-arch/jctvc-site/, Internet Engineering Task Force, IETF, CH, Jun. 1, 2001 (Jun. 1, 2001), XP015008916, ISSN: 0000-0003 sections 2.1.1 and 2.4.

Rosenberg Jdrosen Net J: "Interactive Connectivity Establishment (ICE): A Protocol for Network Address Translator (NAT) Traversal for Offer/Answer Protocols; rfc5245.txt", Interactive Connectivity Establishment (ICE): A Protocol for Network Address Translator (NAT) Traversal for Offer/Answer Protocols; RFC5245.TXT, Internet Engineering Task Force, IETF; Standard, Internet Society (ISOC) 4, Rue Des Falaises CH-1205 Gen, Apr. 30, 2010 (Apr. 30, 2010), pp. 1-117, XP015070785, [retrieved on Apr. 30, 2010] sections 1 and 2 including sub-sections.

* cited by examiner

500

RECEIVE, BY A COMPUTING DEVICE, A COMMUNICATION, WHEREIN THE COMMUNICATION INCLUDES A PERFORMANCE METRIC OF ONE OR MORE DEVICES ON A LOCAL NETWORK, WHEREIN THE COMPUTING DEVICE AND THE ONE OR MORE DEVICES SHARE A COMMON NETWORK SERVICE PROVIDER
502

DETERMINE THAT THE COMPUTING DEVICE IS SELECTED FOR OPERATING AS A PROXY NETWORK ADDRESS TRANSLATION DEVICE FOR THE ONE OR MORE DEVICES THAT SHARE THE COMMON NETWORK SERVICE PROVIDER
504

AGGREGATE NETWORK ADDRESS TRANSLATION TRAVERSAL FOR THE ONE OR MORE DEVICES THAT SHARE THE COMMON NETWORK SERVICE PROVIDER, WHEREIN AGGREGATING NETWORK ADDRESS TRANSLATION TRAVERSAL INCLUDES ESTABLISHING A SINGLE NETWORK ADDRESS TRANSLATION CONNECTION WITH THE COMMON NETWORK SERVICE PROVIDER
506

CAUSE A TRANSMITTER TO TRANSMIT COMMUNICATIONS OF THE ONE OR MORE DEVICES, WHEREIN THE COMMUNICATIONS OF THE ONE OR MORE DEVICES ARE TRANSMITTED OVER THE SINGLE NETWORK ADDRESS TRANSLATION CONNECTION WITH THE COMMON NETWORK SERVICE PROVIDER
508

RECEIVE, BY A COMPUTING DEVICE, A FIRST COMMUNICATION, WHEREIN THE FIRST COMMUNICATION INCLUDES A PERFORMANCE METRIC OF ONE OR MORE DEVICES ON A LOCAL NETWORK, AND WHEREIN THE COMPUTING DEVICE AND THE ONE OR MORE DEVICES SHARE A COMMON NETWORK SERVICE PROVIDER
602

↓

DETERMINE THAT ANOTHER DEVICE IS SELECTED FOR OPERATING AS A PROXY NETWORK ADDRESS TRANSLATION DEVICE FOR THE COMPUTING DEVICE
604

↓

CAUSE A TRANSMITTER TO TRANSMIT A SECOND COMMUNICATION DESTINED FOR THE COMMON NETWORK SERVICE PROVIDER, WHEREIN THE SECOND COMMUNICATION IS TRANSMITTED OVER A CONNECTION WITH THE OTHER DEVICE, AND WHEREIN THE SECOND COMMUNICATION IS COMMUNICATED TO THE COMMON NETWORK SERVICE PROVIDER BY THE OTHER DEVICE
606

FIG. 6

METHODS, SYSTEMS, AND APPARATUSES FOR PROVIDING A SINGLE NETWORK ADDRESS TRANSLATION CONNECTION FOR MULTIPLE DEVICES

CROSS REFERENCE TO RELATED APPLICATIONS

This application claims the benefit of and priority to U.S. Provisional Patent Application No. 62/087,733 filed on Dec. 4, 2014 and to U.S. Provisional Patent Application No. 62/087,673 filed on Dec. 4, 2014, the contents of which are incorporated by reference herein in their entirety for all purposes.

FIELD

The present disclosure relates to optimizing network performance. Specifically, various techniques and systems are provided for operating a device as a proxy network address translation device for other devices.

BACKGROUND

One or more gateways may be present within a local area network. For example, a local area network may include a router and may also include one or more range extending devices. Client devices (e.g., network devices, access devices, or the like) that provide various functionalities may also be present within the local area network. A gateway allows client devices to access a network by providing wired connections and/or wireless connections using radio frequency channels in one or more frequency bands. A separate connection or session is typically established with a network service provider for each device that requests services from the network service provider. As a result, multiple connections or sessions are established and maintained between the gateway and the network service provider when multiple devices are present in a network, creating networking overhead for the gateway and the network service provider.

BRIEF SUMMARY

Techniques and systems are described for operating a device as a proxy network address translation device for other devices connected to a network provided by a gateway. A device acting as a proxy network address translation device may be referred to herein as a proxy device. In some examples, a client device (e.g., a network device, an access device, or other device) may operate as a proxy device for other client devices by exchanging communications with the gateway and a network service provider for the other client devices. Once selected as a proxy device, the proxy device may establish a single network address translation connection with the network service provider (via the gateway) for the proxy device and the other devices for which it is operating as a proxy device. The proxy device may receive communications from one or more devices for which it is operating as a proxy device, and may communicate the communications to the gateway for routing to the network service provider. The proxy device may also receive a communication over the single connection with the network service provider that is destined for a device for which the proxy device is operating as a proxy. The proxy device may determine the appropriate destination device for the communication, and may forward the communication to the destination device. By operating a device as a proxy network address translation device for other devices, only a single connection with the network service provider is established for the proxy device and the other devices for which the proxy device is operating as a proxy. As a result, the number of device connections with the gateway and the network service provider is reduced by the number of devices that use the proxy device to communicate with the gateway and the network service provider. Reducing the number of devices connections limits the number of network address translation connections that need to be maintained by the gateway and the network service provider, thus reducing processing overhead of the gateway and the network service provider.

In some embodiments, a device may act as a proxy network address translation device for other devices that share a common network service provider with the proxy device. In one illustrative example, devices that share a common voice-over-Internet-Protocol (VoIP) network service provider may promote a proxy from among the devices to exchange communications with or otherwise interface with the VoIP network service provider. As another illustrative example, devices that share a common Internet of Things (IoT) network service provider may promote a proxy to interface with the IoT service provider. One of ordinary skill in the art will appreciate that the techniques described herein are not limited to any particular network service provider or service, and that these techniques apply to any network service provider that provides network services other than VoIP or IoT.

In some embodiments, a promotion process may be performed by devices in order to select a proxy device from among the devices. For example, a device may compare its own performance metrics with performance metrics of other devices on the network, and may promote or select a device that has the best performance metrics as the proxy device. The proxy device may also compare its performance metrics with performance metrics of other devices to determine that it should be selected as the proxy device. In some examples, the proxy device may send a query to the other devices requesting that it be selected as the proxy device. The other devices may reply with a response indicating or confirming that the device is selected as the proxy device based on the other devices' performance metric comparison. In some examples, the other devices on the network may transmit a message to the selected proxy device indicating or verifying that it has been selected as the proxy device. In such examples, the other devices may send the message upon completing the performance metric comparison, in which case the proxy device may not send the query to the other devices.

In some examples, a gateway may operate as a proxy network address translation device for network devices and/or access devices. In some embodiments, the gateway may include a router for a local area network. The gateway may establish a single connection with a network service provider for the devices for which it is operating as a proxy device. Accordingly, a single connection is established with each network service provider that interfaces with clients on the network provided by the gateway.

Techniques and systems are also described herein for monitoring networks for self-healing and notification, and for network disconnection identification and repair. A variety of network devices, when powered on, periodically connect to a provider's network over the internet. For example, devices may connect to a provider's network to register or announce the devices' presence or to allow for two-way communication with another's network devices, such as for online gaming. Other devices establish a direct connection with a provider, such as may occur with various cable and satellite set-top boxes. From the provider's vantage point, these connections provide the ability to determine whether a customer's device is powered on or connected to the internet, but yield little other information when the device is disconnected from the provider's network.

From the user's perspective, when an internet connection or connection with an application service provider is lost at a local area network (LAN), little information is readily obtainable as to the origin of the lost connection, and users can spend significant time troubleshooting and diagnosing to determine whether a problem exists within the LAN, at the user's internet service provider or at another service provider, such as another network service provider or an application service provider. There remains a need for further techniques for monitoring and analysis of network connections to identify and remedy problems on a network.

As more and more devices that connect to outside networks are added to a LAN, the ability to have an always active connection to the network becomes more important. For example, as network connected security systems become more ubiquitous, having the security system reachable over the internet can be critical for being able to timely control the security system to provide or secure access as desirable. Although network devices may be generally reliable, a single device malfunction or disconnection, when it occurs, can prevent or delay access, potentially leaving a user vulnerable, or can prevent or delay securing a home or building.

Techniques and systems described herein overcome these issues by identifying problems occurring on a network, such as a lost network connection, a malfunctioning device or a service interruption or outage, amongst other problems. The techniques and systems described allow for self-diagnosis and self-healing of problems that occur on the network. For example, once a malfunctioning device is identified, instructions can be sent to automatically reboot or update the device in order to resolve the malfunction. For some circumstances, however, automatic resolution cannot be achieved and instead a message can be provided to a user for identifying a problematic device and providing suggested instructions for fixing the problem.

The methods and systems described herein are useful for generating notifications to alert users and systems of virtually any network problem, such as an error or deficiency, that can be determined remotely. For example, network outages can be identified by obtaining status information, such as network connectivity status information or service provider system status information, and alerts can be provided to inform a user or system of an outage, with optional instructions included for correcting, bypassing or otherwise reducing the effects of the outage. Depending on the network configuration, a source, location or cause of the problem can be further identified, advantageously providing for more detailed instructions for improving the problem.

For problems that cannot be distinctly identified using only status information, investigations can be performed to obtain more information about the problem, such as by requesting information from devices on the same network as the problem. For example, devices may share connection logs with one another to provide insights as to the origin, cause or location of the problem. Additionally or alternatively, devices may inquire as to the network connectivity status of other devices, which may also provide insights regarding the origin, cause or location of a problem. In various embodiments, devices that lose connectivity with a network, such as an infrastructure wireless network, may establish channels of off-network communication, such as an ad hoc or mesh network, in order to communicate with one another for purposes of investigating a problem.

According to at least one example of establishing a single network address translation connection, a computing device may be provided that includes one or more data processors, and a receiver configured to receive a communication, wherein the communication includes a performance metric of one or more devices on a local network, wherein the computing device and the one or more devices share a common network service provider. The computing device further includes a non-transitory machine-readable storage medium containing instructions which when executed on the one or more data processors, cause the one or more processors to perform operations including: determining that the computing device is selected for operating as a proxy network address translation device for the one or more devices that share the common network service provider, wherein determining that the computing device is selected is based on the performance metric; aggregating network address translation traversal for the one or more devices that share the common network service provider, wherein aggregating network address translation traversal includes establishing a single network address translation connection with the common network service provider, and wherein communications of the one or more devices are communicated over the single network address translation connection; and causing a transmitter to transmit communications of the one or more devices, wherein the communications of the one or more devices are transmitted over the single network address translation connection with the common network service provider.

In some embodiments, a computer-implemented method may be provided that includes receiving, by a computing device, a communication, wherein the communication includes a performance metric of one or more devices on a local network, wherein the computing device and the one or more devices share a common network service provider. The method further includes determining that the computing device is selected for operating as a proxy network address translation device for the one or more devices that share the common network service provider, wherein determining that the computing device is selected is based on the performance metric. The method further includes aggregating network address translation traversal for the one or more devices that share the common network service provider, wherein aggregating network address translation traversal includes establishing a single network address translation connection with the common network service provider, and wherein communications of the one or more devices are communicated over the single network address translation connection. The method further includes causing a transmitter to transmit communications of the one or more devices, wherein the communications of the one or more devices are transmitted over the single network address translation connection with the common network service provider.

In some embodiments, a computer-program product tangibly embodied in a non-transitory machine-readable storage medium of a first network device may be provided. The computer-program product may include instructions configured to cause one or more data processors to: receive a communication, wherein the communication includes a performance metric of one or more devices on a local network, wherein the computing device and the one or more devices share a common network service provider; determine that the computing device is selected for operating as a proxy network address translation device for the one or more devices that share the common network service provider, wherein determining that the computing device is selected is based on the performance metric; aggregate network address translation traversal for the one or more devices that share the common network service provider, wherein aggregating network address translation traversal includes establishing a single network address translation connection with the common network service provider, and wherein communications of the one or more devices are communicated over the single network address translation connection; and cause a transmitter to transmit communications of the one or more devices, wherein the communications of the one or more devices are transmitted over the single network address translation connection with the common network service provider.

In some embodiments, the method, computing device, and computer-program product described above may further include instructions which when executed on the one or more data processors, cause the one or more processors to perform operations including: comparing a performance metric of the computing device with the received performance metric of the one or more devices; and determining that the computing device is selected for operating as the proxy network address translation device for the one or more devices when the performance metric of the computing device outperforms the performance metric of the one or more devices.

In some embodiments, the performance metric includes signal strength, a number of hops, processing power, connection reliability, or duty cycle.

In some embodiments, the method, computing device, and computer-program product described above may further include instructions which when executed on the one or more data processors, cause the one or more processors to perform operations including: determining whether the computing device has an existing connection to the common network service provider; and determining that the computing device is selected for operating as the proxy network address translation device for the one or more devices when the computing device has an existing connection to the common network service provider.

In some embodiments, the method, computing device, and computer-program product described above may further include instructions which when executed on the one or more data processors, cause the one or more processors to cause the transmitter to transmit a request message to the one or more devices, wherein the request message includes a request for each of the one or more devices to send the performance metric.

In some embodiments, the performance metric of one or more devices is periodically received.

In some embodiments, the method, computing device, and computer-program product described above may further include instructions which when executed on the one or more data processors, cause the one or more processors to cause the transmitter to transmit a query, wherein the query includes a request for selection of the computing device as the proxy network address translation device for the one or more devices.

In some embodiments, the receiver is configured to receive a response to the query indicating that the computing device is selected as the proxy network address translation device for the one or more device.

In some embodiments, the receiver is configured to receive a network communication, wherein the network communication includes a unique identifier assigned to a destination device for the network communication, and wherein the network communication is received over the single network address translation connection with the common network service provider. The method, computing device, and computer-program product described above may further include instructions which when executed on the one or more data processors, cause the one or more processors to determine the destination device for the network communication, wherein the destination device is determined by comparing the unique identifier to a table of unique identifiers assigned to the computing device and the one or more devices.

According to another example of establishing a single network address translation connection, a computing device may be provided that includes one or more data processors, and a receiver configured to receive a first communication, wherein the first communication includes a performance metric of one or more devices on a local network, and wherein the computing device and the one or more devices share a common network service provider. The computing device further includes a non-transitory machine-readable storage medium containing instructions which when executed on the one or more data processors, cause the one or more processors to perform operations including: determining that another device is selected for operating as a proxy network address translation device for the computing device, wherein determining that the other device is selected is based on the performance metric; and causing a transmitter to transmit a second communication destined for the common network service provider, wherein the second communication is transmitted over a connection with the other device, and wherein the second communication is communicated to the common network service provider by the other device.

In some embodiments, a computer-implemented method may be provided that includes receiving, by a computing device, a first communication, wherein the first communication includes a performance metric of one or more devices on a local network, and wherein the computing device and the one or more devices share a common network service provider. The method further includes determining that another device is selected for operating as a proxy network address translation device for the computing device, wherein determining that the other device is selected is based on the performance metric. The method further includes causing a transmitter to transmit a second communication destined for the common network service provider, wherein the second communication is transmitted over a connection with the other device, and wherein the second communication is communicated to the common network service provider by the other device.

In some embodiments, a computer-program product tangibly embodied in a non-transitory machine-readable storage medium of a computing device may be provided. The computer-program product may include instructions configured to cause one or more data processors to: receive a first communication, wherein the first communication includes a performance metric of one or more devices on a local network, and wherein the computing device and the one or more devices share a common network service provider; determine that another device is selected for operating as a proxy network address translation device for the computing device, wherein determining that the other device is selected is based on the performance metric; and cause a transmitter to transmit a second communication destined for the common network service provider, wherein the second communication is transmitted over a connection with the other device, and wherein the second communication is communicated to the common network service provider by the other device.

In some embodiments, the method, computing device, and computer-program product described above may further include instructions which when executed on the one or more data processors, cause the one or more processors to perform operations including: comparing a performance metric of the computing device with the received performance metric of the one or more devices; and determining that the other device is selected for operating as the proxy network address translation device for the computing device when the performance metric of the computing device is outperformed by the performance metric of the other device.

In some embodiments, the receiver is configured to receive a query, and wherein the query includes a request for selection of the other device as the proxy network address translation device for the computing device. The method, computing device, and computer-program product described above may further include instructions which when executed on the one or more data processors, cause the one or more processors to cause the transmitter to transmit a response to the query, wherein the response indicates that the other device is selected as the proxy network address translation device for the computing device.

In some embodiments, the method, computing device, and computer-program product described above may further include instructions which when executed on the one or more data processors, cause the one or more processors to cause the transmitter to transmit a message, wherein the message indicates that the other device is selected as the proxy network address translation device for the computing device.

In some embodiments, the performance metric includes signal strength, a number of hops, processing power, connection reliability, or duty cycle.

In some embodiments, the method, computing device, and computer-program product described above may further include instructions which when executed on the one or more data processors, cause the one or more processors to perform operations including: determining whether the other device has an existing connection to the common network service provider; and determining that the other device is selected for operating as the proxy network address translation device for the computing device when the other device has an existing connection to the common network service provider.

In some embodiments, the method, computing device, and computer-program product described above may further include instructions which when executed on the one or more data processors, cause the one or more processors to cause the transmitter to transmit a request message to the one or more devices, wherein the request message includes a request for each of the one or more devices to send the performance metric.

In some embodiments, the performance metric of one or more devices is periodically received.

According to another example, a gateway device may be provided that includes one or more data processors, and a receiver configured to receive a communication, wherein the communication includes an indication that the gateway device is selected for operating as a proxy network address translation device for one or more devices on a local network, and wherein the one or more devices share a common network service provider. The gateway device further includes a non-transitory machine-readable storage medium containing instructions which when executed on the one or more data processors, cause the one or more processors to perform operations including: determining that the gateway device is selected for operating as a proxy network address translation device for the one or more devices that share the common network service provider, wherein determining that the gateway device is selected is based on the received communication; and aggregating network address translation traversal for the one or more devices that share the common network service provider, wherein aggregating network address translation traversal includes establishing a single network address translation connection with the common network service provider, and wherein communications of the one or more devices are communicated over the single network address translation connection. The gateway device further includes a transmitter configured to transmit communications of the one or more devices, wherein the communications of the one or more devices are transmitted over the single network address translation connection with the common network service provider.

In some embodiments, a computer-implemented method may be provided that includes receiving, at a gateway device, a communication, wherein the communication includes an indication that the gateway device is selected for operating as a proxy network address translation device for one or more devices on a local network, and wherein the one or more devices share a common network service provider. The method further includes determining that the gateway device is selected for operating as a proxy network address translation device for the one or more devices that share the common network service provider, wherein determining that the gateway device is selected is based on the received communication. The method further includes aggregating network address translation traversal for the one or more devices that share the common network service provider, wherein aggregating network address translation traversal includes establishing a single network address translation connection with the common network service provider, and wherein communications of the one or more devices are communicated over the single network address translation connection. The method further includes transmitting communications of the one or more devices, wherein the communications of the one or more devices are transmitted over the single network address translation connection with the common network service provider.

In some embodiments, a computer-program product tangibly embodied in a non-transitory machine-readable storage medium of a gateway device may be provided. The computer-program product may include instructions configured to cause one or more data processors to: receive a communication, wherein the communication includes an indication that the gateway device is selected for operating as a proxy network address translation device for one or more devices on a local network, and wherein the one or more devices share a common network service provider; determine that the gateway device is selected for operating as a proxy network address translation device for the one or more devices that share the common network service provider, wherein determining that the gateway device is selected is based on the received communication; aggregate network address translation traversal for the one or more devices that share the common network service provider, wherein aggregating network address translation traversal includes establishing a single network address translation connection with the common network service provider, and wherein communications of the one or more devices are communicated over the single network address translation connection; and transmit communications of the one or more devices, wherein the communications of the one or more devices are transmitted over the single network address translation connection with the common network service provider.

In some embodiments, the gateway device is selected for operating as the proxy network address translation device for one or more devices based on a comparison of a performance metric of the gateway device with a performance metric of the one or more devices.

In some embodiments, the performance metric includes signal strength, a number of hops, processing power, connection reliability, or duty cycle.

In some embodiments, the receiver is configured to receive a network communication, wherein the network communication includes a unique identifier assigned to a destination device for the network communication, and wherein the network communication is received over the single network address translation connection with the common network service provider. The method, computing device, and computer-program product described above may further include instructions which when executed on the one or more data processors, cause the one or more processors to determine the destination device for the network communication, wherein the destination device is determined by comparing the unique identifier to a table of unique identifiers assigned to the one or more devices.

According to at least one example of monitoring of networks, methods are described for identifying, locating and/or improving network deficiencies. In embodiments, the methods are implemented on a computer or a device including one or more data processors. In a specific embodiment, a method comprises: receiving, such as at a computing device, network connectivity status information for a plurality of network devices distributed across a plurality of remote networks; identifying a network deficiency using the network connectivity status information; identifying a location of the network deficiency using the network connectivity status information; and transmitting a notification of the network deficiency including the location of the network deficiency, wherein when the notification is received, the notification is used to improve the network deficiency. Optionally, the location of the network deficiency includes an extent of the network deficiency, such as a number or distribution of network devices impacted by the network deficiency. In one embodiment, the computing device is located at one of the remote networks. In other embodiments, the computing device is located on a network remote from the remote networks.

In various embodiments, network connectivity status information includes, but is not limited to, a list of open connections, a list of recently closed connections, a connection with one or more network devices or servers, a connectivity with one or more local area networks, a connectivity with one or more remote networks, a connectivity with one or more network appliances, such as a gateway, firewall or router, a connection log, a network transceiver operational status, and the like.

In some embodiments, the notification includes instructions for improving the network deficiency. Optionally, a method of this aspect includes generating instructions for improving the network deficiency. For example, the instructions are, optionally, to reset, update or disable a malfunctioning network device. In embodiments, when the instructions are received at a remote network that includes the network deficiency the instructions are performed.

In some embodiments, the method further includes receiving system status information for one or more service providers. In some examples, identifying the network deficiency includes using the system status information. In some examples, identifying the location of the network deficiency includes using the system status information. In some examples, identifying the network deficiency and identifying the location of the network deficiency includes using the system status information. In some embodiments, identifying the network deficiency includes identifying a pattern in the network connectivity status information, such as a routine or periodic disconnection of one or more network devices. Alternatively or additionally, identifying the location of the network deficiency includes identifying a pattern in the network connectivity status information, such as a routine or periodic disconnection of one or more network devices.

In some embodiments, system status information includes, but is not limited to, an accessibility of a system or network to a cloud server, a power outage or lack thereof, a network outage or lack thereof, a service outage or lack thereof, an internet outage or lack thereof, a network congestion or lack thereof, a system deficiency, etc.

In various embodiments, the network deficiency is investigated, such as by sending signals to one or more remote networks that include or are impacted by the deficiency. In one embodiment, for example, the method further includes: transmitting a query relating to the network deficiency; and receiving a response or detecting a lack of response to the query. In embodiments, for example, identifying the location of the network deficiency includes using the response or lack of response to the query. In an exemplary embodiment, the query requests information from one or more network devices on a remote network that includes the network deficiency.

According to another example of monitoring of networks, another method comprises: determining, such as by a computing device associated with a local area network, a loss of service provider connectivity at a network device associated with the local area network; transmitting a query requesting network connectivity status information for one or more other network devices associated with the local area network, wherein the network connectivity status information includes service provider connectivity and local area network connectivity; receiving the network connectivity status information in response to the query; analyzing the network connectivity status information; and generating instructions for restoring connectivity between the network device and the service provider based on the analysis. In some embodiments, the method further comprises transmitting a notification of the instructions or of the loss of service provider connectivity. In a specific embodiment, the network device having lost service provider connectivity is the computing device. Optionally, analyzing the network connectivity status information includes identifying a pattern in the network connectivity status information indicative of a network deficiency.

In some embodiments, the method further comprises performing the instructions for restoring connectivity between the network device and the service provider. Optionally, some methods of this aspect further comprise transmitting the instructions for restoring service provider connectivity. For example, when the instructions are received, the instructions are performed to restore connectivity between the network device and the service provider. In various embodiments, the computing device restores its own connectivity with the service provider and/or the local area network. In other embodiments, the computing device restores the connectivity of another network device associated with the local area network with the service provider and/or the local area network.

In some embodiments, analyzing the network connectivity status information includes determining a cause for the loss of service provider connectivity. Determining a cause for the loss of service provider connectivity is advantageous, for example, as knowing this information can simplify restoring the connectivity, such as by rebooting, resetting or power cycling a minimal number of devices. In some embodiments, the cause for the loss of service provider connectivity at the network device is a malfunction of the network device or a loss of network connectivity of the network device with a network gateway configured to provide connectivity to the local area network. Optionally, the instructions include rebooting or updating the network device or one or more other network devices, such as a network gateway, or wireless base station. In other embodiments, the cause for the loss of service provider connectivity at the network device is a malfunction at a network gateway configured to provide connectivity to the local area network or a loss of network connectivity of the network device with the network gateway. Optionally, the instructions include rebooting or updating the network gateway. In other embodiments, the cause for the loss of service provider connectivity at the network device is a loss of service provider connectivity at a network gateway configured to provide service provider connectivity to the local area network. Optionally, the instructions include rebooting a modem or the network gateway.

In some embodiments, the method further includes determining that the network device has lost connectivity with the local area network. In such embodiments, knowing this information can be useful for establishing how the network device is to proceed to reestablish connectivity to the service provider, for example. For example in one embodiment, the instructions include establishing an off-network connection with one or more of the other network devices associated with the local area network. Establishing off-network connections is useful, in embodiments, for exchanging connectivity status information, such as when the local area network is down. In other embodiments, the off-network connection can be used to relay communications to the service provider, such as when the off-network connection is established with another device that still has connectivity with the service provider. For example, in one embodiment, the instructions include relaying communications to the service provider using the off-network connection.

In another aspect, provided are systems and devices for monitoring networks. The systems and devices are useful for performing the methods for monitoring networks described herein. In one example embodiment, a system comprises one or more data processors and a non-transitory computer-readable storage medium containing instructions. The instructions, which when executed on one or more data processors, cause the one or more data processors to perform operations including: receiving network connectivity status information for a plurality of network devices distributed across a plurality of remote networks; identifying a network deficiency using the network connectivity status information; identifying a location of the network deficiency using the network connectivity status information; and transmitting a notification of the network deficiency including the location of the network deficiency. In another example embodiment, the instructions, which when executed on the one or more data processors, cause the one or more data processors to perform operations including: determining a loss of service provider connectivity at a network device associated with a local area network; transmitting a query requesting network connectivity status information for one or more other network devices associated with the local area network, wherein the network connectivity status information includes service provider connectivity and local area network connectivity; receiving the network connectivity status information in response to the query; analyzing the network connectivity status information; and generating restoration instructions for restoring connectivity between the network device and the service provider based on the analysis.

In another aspect, provided are computer program products for monitoring networks. The computer program products include instructions configured to cause a computing device to perform the methods of monitoring networks described herein. In an example embodiment, a computer-program product of this aspect is tangibly embodied in a non-transitory machine-readable storage medium and including instructions configured to cause a computing device to perform a method. In one embodiment, the instructions are configured to cause the computing device to: receive network connectivity status information for a plurality of network devices distributed across a plurality of remote networks; identify a network deficiency using the network connectivity status information; identify a location of the network deficiency using the network connectivity status information; and transmit a notification of the network deficiency including the location of the network deficiency. In another example embodiment, the instructions are configured to cause the computing device to: determine a loss of service provider connectivity at a network device associated with a local area network; transmit a query requesting network connectivity status information for one or more other network devices associated with the local area network, wherein the network connectivity status information includes service provider connectivity and local area network connectivity; receive the network connectivity status information in response to the query; analyze the network connectivity status information; and generate restoration instructions for restoring connectivity between the network device and the service provider based on the analysis.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present disclosure are described in detail below with reference to the following drawing figures:

FIG. 5 is a flowchart illustrating an embodiment of a process of operating a computing device as a proxy network address translation device, in accordance with some embodiments.

FIG. 6 is a flowchart illustrating an embodiment of a process of selecting a proxy network address translation device, in accordance with some embodiments.

DETAILED DESCRIPTION

Figure 1:
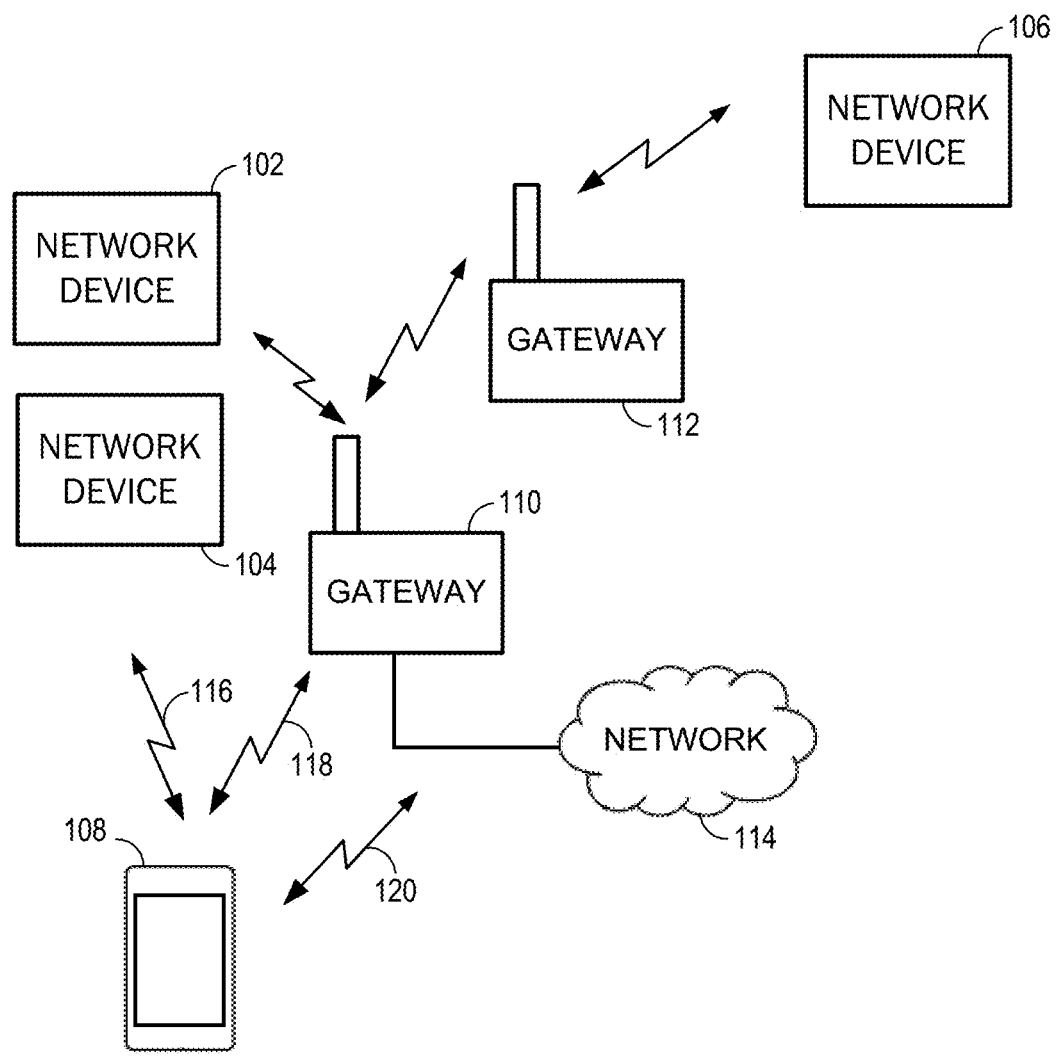
FIG. 1 is an illustration of an example of a network environment, in accordance with some embodiments.

In the following description, for the purposes of explanation, specific details are set forth in order to provide a thorough understanding of embodiments of the disclosure. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A network may be set up to provide an access device user with access to various devices connected to the network. For example, a network may include one or more network devices that provide a user with the ability to remotely configure or control the network devices themselves or one or more electronic devices (e.g., appliances) connected to the network devices. The electronic devices may be located within an environment or a venue that can support the network. An environment or a venue can include, for example, a home, an office, a business, an automobile, a park, an industrial or commercial plant, or the like. A network may include one or more gateways that allow client devices (e.g., network devices, access devices, or the like) to access the network by providing wired connections and/or wireless connections using radio frequency channels in one or more frequency bands. The one or more gateways may also provide the client devices with access to one or more external networks, such as a cloud network, the Internet, and/or other wide area networks.

A local area network, such as a user's home local area network, can include multiple network devices that provide various functionalities. Network devices may be accessed and controlled using an access device and/or one or more network gateways. One or more gateways in the local area network may be designated as a primary gateway that provides the local area network with access to an external network. The local area network can also extend outside of a venue, such as a user's home, and may include network devices located outside of the venue. For instance, the local area network can include network devices such as exterior motion sensors, exterior lighting (e.g., porch lights, walkway lights, security lights, or the like), garage door openers, sprinkler systems, or other network devices that are exterior to the venue. It is desirable for a user to be able to access the network devices while located within the local area network and also while located remotely from the local area network. For example, a user may access the network devices using an access device within the local area network or remotely from the local area network.

A network device within the local area network may pair with or connect to a gateway, and may obtain credentials from the gateway. For example, when the network device is powered on, a list of gateways that are detected by the network device may be displayed on an access device (e.g., via an application, program, or the like installed on and executed by the access device). In some embodiments, only a single gateway is included in the local area network (e.g., any other displayed gateways may be part of other local area networks). For example, the single gateway may include a router. In such embodiments, only the single gateway may be displayed (e.g., when only the single gateway is detected by the network device). In some embodiments, multiple gateways may be located in the local area network (e.g., a router, a range extending device, or the like), and may be displayed. For example, a router and a range extender (or multiple range extenders) may be part of the local area network. A user may select one of the gateways as the gateway with which the network device is to pair, and may enter login information for accessing the gateway. The login information may be the same information that was originally set up for accessing the gateway (e.g., a network user name and password, a network security key, or any other appropriate login information). The access device may send the login information to the network device, and the network device may use the login information to pair with the gateway. The network device may then obtain the credentials from the gateway. The credentials may include a service set identification (SSID) of the local area network, a media access control (MAC) address of the gateway, and/or the like. The network device may transmit the credentials to a server of a wide area network, such as a network server. In some embodiments, the network device may also send to the server information relating to the network device (e.g., MAC address, serial number, or the like) and/or information relating to the access device (e.g., MAC address, serial number, application unique identifier, or the like).

The server may register the gateway as a logical network, and may assign the first logical network a network identifier (ID). The server may further generate a set of security keys, which may include one or more security keys. For example, the server may generate a unique key for the network device and a separate unique key for the access device. The server may associate the network device and the access device with the logical network by storing the network ID and the set of security keys in a record or profile. The server may then transmit the network ID and the set of security keys to the network device. The network device may store the network ID and its unique security key. The network device may also send the network ID and the access device's unique security key to the access device. In some embodiments, the server may transmit the network ID and the access device's security key directly to the access device. The network device and the access device may then communicate with the cloud server using the network ID and the unique key generated for each device. Each network device and access device may also be assigned a unique identifier (e.g., a universally unique identifier (UUID), a unique device identifier (UDID), globally unique identifier (GUID), or the like) by the cloud server that is separate from the network ID and the unique security key of each device. Accordingly, the access device may perform accountless authentication to allow the user to remotely access the network device via the network without logging in each time access is requested. Further details relating to an accountless authentication process are described below. Also, the network device can communicate with the server regarding the logical network.

FIG. 1 illustrates an example of a local area network 100. The local area network 100 includes network device 102, network device 104, and network device 106. In some embodiments, any of the network devices 102, 104, 106 may include an Internet of Things (IoT) device. As used herein, an IoT device is a device that includes sensing and/or control functionality as well as a WiFi™ transceiver radio or interface, a Bluetooth™ transceiver radio or interface, a Zigbee™ transceiver radio or interface, an Ultra-Wideband (UWB) transceiver radio or interface, a WiFi-Direct transceiver radio or interface, a Bluetooth™ Low Energy (BLE) transceiver radio or interface, an infrared (IR) transceiver, and/or any other wireless network transceiver radio or interface that allows the IoT device to communicate with a wide area network and with one or more other devices. In some embodiments, an IoT device does not include a cellular network transceiver radio or interface, and thus may not be configured to directly communicate with a cellular network. In some embodiments, an IoT device may include a cellular transceiver radio, and may be configured to communicate with a cellular network using the cellular network transceiver radio. The network devices 102, 104, 106, as IoT devices or other devices, may include automation network devices that allow a user to access, control, and/or configure various appliances, devices, or tools located within an environment or venue (e.g., a television, radio, light, fan, humidifier, sensor, microwave, iron, a tool, a manufacturing device, a printer, a computer, and/or the like), or outside of the venue (e.g., exterior motion sensors, exterior lighting, garage door openers, sprinkler systems, or the like). For example, network device 102 may include a home automation switch that may be coupled with a home appliance. In some embodiments, network devices 102, 104, 106 may be used in various environments or venues, such as a business, a school, an establishment, a park, an industrial or commercial plant, or any place that can support the local area network 100 to enable communication with network devices 102, 104, 106. For example, a network device can allow a user to access, control, and/or configure devices, such as office-related devices (e.g., copy machine, printer, fax machine, or the like), audio and/or video related devices (e.g., a receiver, a speaker, a projector, a DVD player, a television, or the like), media-playback devices (e.g., a compact disc player, a CD player, or the like), computing devices (e.g., a home computer, a laptop computer, a tablet, a personal digital assistant (PDA), a computing device, a wearable device, or the like), lighting devices (e.g., a lamp, recessed lighting, or the like), devices associated with a security system, devices associated with an alarm system, devices that can be operated in an automobile (e.g., radio devices, navigation devices), and/or the like.

A user may communicate with the network devices 102, 104, 106 using an access device 108. The access device 108 may include any human-to-machine interface with network connection capability that allows access to a network. For example, the access device 108 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., a television, a refrigerator, a security system, a game console, a browser, or the like), a speech or gesture interface (e.g., a Kinect™ sensor, a Wiimote™, or the like), an IoT device interface (e.g., an Internet enabled device such as a wall switch, a control interface, or other suitable interface), or the like. In some embodiments, the access device 108 may include a cellular or other broadband network transceiver radio or interface, and may be configured to communicate with a cellular or other broadband network using the cellular or broadband network transceiver radio. In some embodiments, the access device 108 may not include a cellular network transceiver radio or interface. While only a single access device 108 is shown in FIG. 1, one of ordinary skill in the art will appreciate that multiple access devices may communicate with the network devices 102, 104, 106. The user may interact with the network devices 102, 104, or 106 using an application, a web browser, a proprietary program, or any other program executed and operated by the access device 108. In some embodiments, the access device 108 may communicate directly with the network devices 102, 104, 106 (e.g., communication signal 116). For example, the access device 108 may communicate directly with network device 102, 104, 106 using Zigbee™ signals, Bluetooth™ signals, WiFi™ signals, infrared (IR) signals, UWB signals, WiFi-Direct signals, BLE signals, sound frequency signals, or the like. In some embodiments, the access device 108 may communicate with the network devices 102, 104, 106 via the gateways 110, 112 (e.g., communication signal 118) and/or the network 114 (e.g., communication signal 120). The network 114 can include a shared remote network, such as a network.

The local area network 100 may include a wireless network, a wired network, or a combination of a wired and wireless network. A wireless network may include any wireless interface or combination of wireless interfaces (e.g., Zigbee™, Bluetooth™, WiFi™, IR, UWB, WiFi-Direct, BLE, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various routers, access points, bridges, gateways, or the like, to connect devices in the local area network 100. For example, the local area network may include gateway 110 and gateway 112. Gateway 110 or 112 can provide communication capabilities to network devices 102, 104, 106 and/or access device 108 via radio signals in order to provide communication, location, and/or other services to the devices. The gateway 110 is directly connected to the external network 114 and may provide other gateways and devices in the local area network with access to the external network 114. The gateway 110 may be designated as a primary gateway. While two gateways 110 and 112 are shown in FIG. 1, one of ordinary skill in the art will appreciate that any number of gateways may be present within the local area network 100.

The network access provided by gateway 110 and gateway 112 may be of any type of network familiar to those skilled in the art that can support data communications using any of a variety of commercially-available protocols. For example, gateways 110, 112 may provide wireless communication capabilities for the local area network 100 using particular communications protocols, such as WiFi™ (e.g., IEEE 802.11 family standards, or other wireless communication technologies, or any combination thereof). Using the communications protocol(s), the gateways 110, 112 may provide radio frequencies on which wireless enabled devices in the local area network 100 can communicate. A gateway may also be referred to as a base station, an access point, Node B, Evolved Node B (eNodeB), access point base station, a Femtocell, home base station, home Node B, home eNodeB, or the like.

The gateways 110, 112 may include a router, a modem, a range extending device, and/or any other device that provides network access among one or more computing devices and/or external networks. For example, gateway 110 may include a router or access point, and gateway 112 may include a range extending device. Examples of range extending devices may include a wireless range extender, a wireless repeater, or the like.

A router gateway may include access point and router functionality, and may further include an Ethernet switch and/or a modem. For example, a router gateway may receive and forward data packets among different networks. When a data packet is received, the router gateway may read identification information (e.g., a media access control (MAC) address) in the packet to determine the intended destination for the packet. The router gateway may then access information in a routing table or routing policy, and may direct the packet to the next network or device in the transmission path of the packet. The data packet may be forwarded from one gateway to another through the computer networks until the packet is received at the intended destination.

A range extending gateway may be used to improve signal range and strength within a local area network. The range extending gateway may receive an existing signal from a router gateway or other gateway and may rebroadcast the signal to create an additional logical network. For example, a range extending gateway may extend the network coverage of the router gateway when two or more devices on the local area network need to be connected with one another, but the distance between one of the devices and the router gateway is too far for a connection to be established using the resources from the router gateway. As a result, devices outside of the coverage area of the router gateway may be able to connect through the repeated network provided by the range extending gateway. The router gateway and range extending gateway may exchange information about destination addresses using a dynamic routing protocol.

The network devices 102, 104, 106 and access device 108 can transmit and receive signals using one or more channels of various frequency bands provided by the gateways 110 and/or 112. One of ordinary skill in the art will appreciate that any available frequency band, including those that are currently in use or that may become available at a future date, may be used to transmit and receive communications according to embodiments described herein. In some examples, the network devices 102, 104, 106, the access device 108, and the gateways 110, 112 may exchange communications using channels of different WiFi™ frequency bands. For example, different channels available on a 2.4 gigahertz (GHz) WiFi™ frequency band that spans from 2.412 GHz to 2.484 GHz may be used. As another example, different channels available on a 5 GHz WiFi frequency band that spans from 4.915 GHz to 5.825 GHz may be used. Other examples of frequency bands that may be used include a 3.6 GHz frequency band (e.g., from 3.655 GHz to 3.695 GHz), a 4.9 GHz frequency band (e.g., from 4.940 GHz to 4.990 GHz), a 5.9 GHz frequency band (e.g., from 5.850 GHz to 5.925 GHz), or the like. Yet other examples of frequency bands that may be used include tremendously low frequency bands (e.g., less than 3 Hz), extremely low frequency bands (e.g., 3 Hz-30 Hz), super low frequency bands (e.g., 30 Hz-300 Hz), ultra-low frequency bands (e.g., 300 Hz-3000 Hz), very low frequency bands (e.g., 3 KHz-30 KHz), low frequency bands (e.g., 30 KHz-300 KHz), medium frequency bands (e.g., 300 KHz-3000 KHz), high frequency bands (e.g., 3 MHz-30 MHz), very high frequency bands (e.g., 30 MHz-300 MHz), ultra high frequency bands (e.g., 300 MHz-3000 MHz), super high frequency bands (e.g., 3 GHz-30 GHz, including WiFi bands), extremely high frequency bands (e.g., 30 GHz-300 GHz), or terahertz or tremendously high frequency bands (e.g., 300 GHz-3000 GHz).

Some or all of the channels may be available for use in a network. For example, channels 1-11 of the 2.4 GHz frequency may be available for use in a local area network. As another example, channels 36, 40, 44, 48, 52, 56, 60, 64, 100, 104, 108, 112, 116, 132, 136, 140, 149, 153, 157, 161, and 161 of the 5 GHz frequency band may be available for use in a local area network. One of ordinary skill in the art will appreciate that any combination of the channels available on any of the frequency bands may be available for use in a network. The channels that are available for use may be regulated by the country in which the network is located.

The gateways 110 and 112 may also provide the access device 108 and the network devices 102, 104, 106 with access to one or more external networks, such as the network 114, the Internet, and/or other wide area networks. In some embodiments, the network devices 102, 104, 106 may connect directly to the network 114, for example, using broadband network access such as a cellular network. The network 114 may include a cloud network or another type of shared network with one or more infrastructure systems that provide cloud services. An infrastructure system may be operated by a service provider. In certain embodiments, services provided by the network 114 may include a host of services that are made available to users of the infrastructure system on demand, such as registration and access control of network devices 102, 104, 106. Services provided by the infrastructure system can dynamically scale to meet the needs of its users. The network 114 may comprise one or more computers, servers, and/or systems. In some embodiments, the computers, servers, and/or systems that make up the network 114 are different from the user's own on-premises computers, servers, and/or systems. For example, the network 114 may host an application, and a user may, via a communication network such as the Internet, on demand, order and use the application.

In some embodiments, the network 114 may host a Network Address Translation (NAT) Traversal application in order to establish a secure connection between a service provider of the network 114 and one or more of the network devices 102, 104, 106 and/or the access device 108. A separate secure connection may be established by each network device 102, 104, 106 for communicating between each network device 102, 104, 106 and the network 114. A secure connection may also be established by the access device 108 for exchanging communications with the network 114. In some examples, the secure connection may include a secure Transmission Control Protocol (TCP) connection. The gateway 110 may provide NAT services for mapping ports and private IP addresses of the network devices 102, 104, 106 and the access device 108 to one or more public IP addresses and/or ports. The gateway 110 may provide the public IP addresses to the network 114. Network 114 servers may direct communications that are destined for the network devices 102, 104, 106 and access device 108 to the public IP addresses. In some embodiments, each secure connection may be kept open for an indefinite period of time so that the network 114 can initiate communications with each respective network device 102, 104, 106 or the access device 108 at any time. Various protocols may be used to establish a secure, indefinite connection between each device 102, 104, 106, 108 and the network 114. Protocols may include Session Traversal Utilities for NAT (STUN), Traversal Using Relay NAT (TURN), Interactive Connectivity Establishment (ICE), a combination thereof, or any other appropriate NAT traversal protocol. Using these protocols, pinholes are created in the NAT of the gateway 110 that allow communications to pass from the network 114 to the network devices 102, 104, 106 and the access device 108. Further details relating to network address translation will be discussed with reference to FIGS. 2-7.

In some cases, communications between the network 114 and the network devices 102, 104, 106 and/or the access device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the network 114 may be conducted over the TCP connection, and communications initiated by a network device may be conducted over a HTTP or HTTPS connection. In certain embodiments, the network 114 may include a suite of applications, middleware, and database service offerings that are delivered to a customer in a self-service, subscription-based, elastically scalable, reliable, highly available, and secure manner.

It should be appreciated that the local area network 100 may have other components than those depicted. Further, the embodiment shown in the figure is only one example of a local area network that may incorporate an embodiment of the disclosure. In some other embodiments, local area network 100 may have more or fewer components than shown in the figure, may combine two or more components, or may have a different configuration or arrangement of components.

Upon being powered on or reset, network devices may be registered with an external network (e.g., network 114) and associated with a logical network within the local area network 100. Details relating to registration of network devices are described below with respect to FIG. 18.

Figure 2:
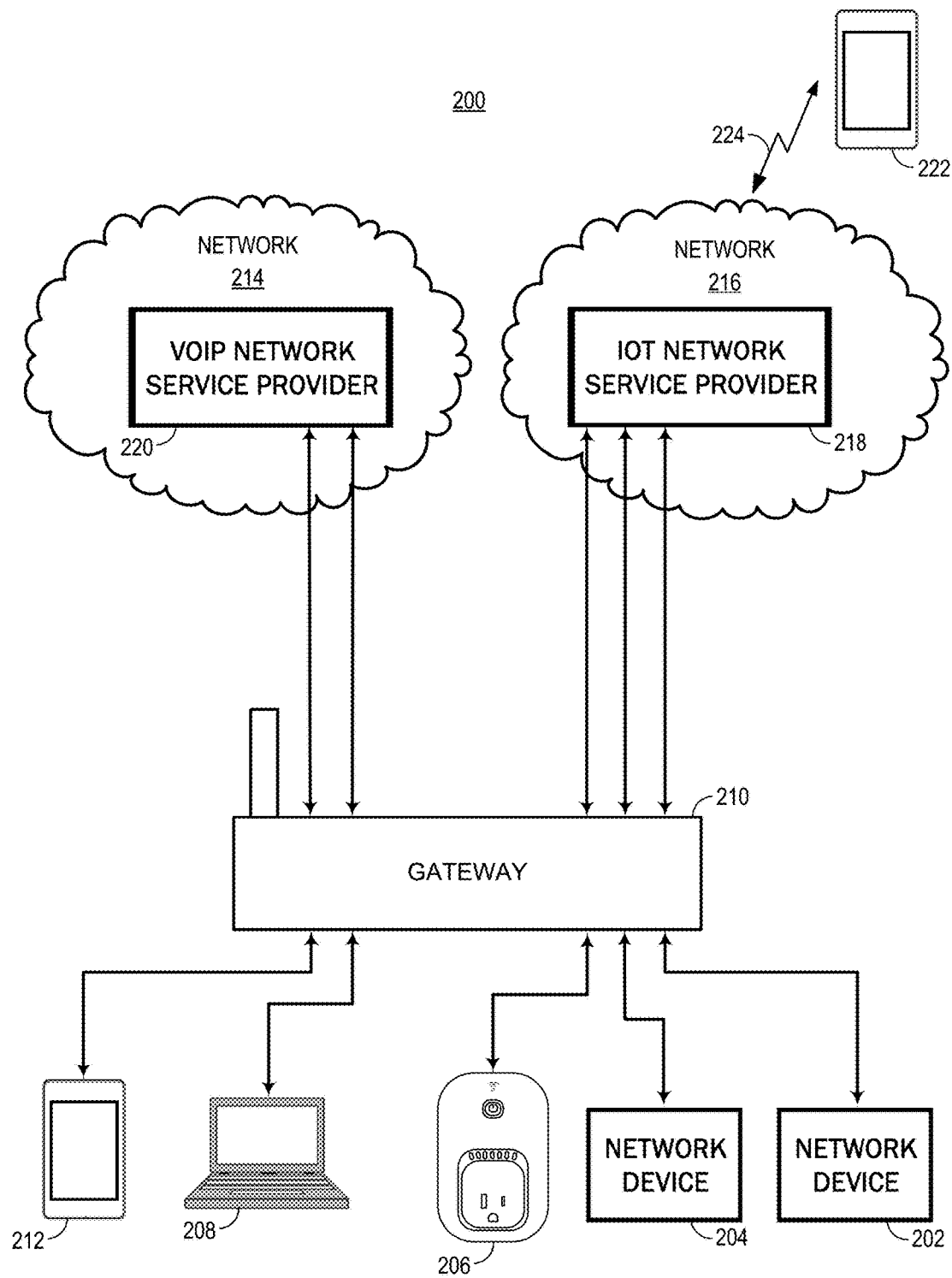
FIG. 2 is an illustration of another example of a network environment, in accordance with some embodiments.

As previously noted, techniques and systems are described herein for operating a device as a proxy network address translation device for other devices connected to a network. A device acting as a proxy network address translation device may be referred to herein as a proxy device. FIG. 2 illustrates an example of a network 200. Similar to the local area network 100 described above, the network 200 includes network devices 202, 204, 206, access devices 208, 212, gateway 210, and external networks 214, 216. Also illustrated in FIG. 2 is an access device 222 that can connect to devices on the network 200 from a remote location that is outside of the range of signals provided by the gateway 210. The gateway 210, the network devices 202, 204, 206, the access devices 208, 212, 222, and the external networks 214, 216 may be similar and have the same functionalities and capabilities as the gateway 110 or 112, the network devices 102, 104, or 106, the access device 108, and the external network 114 described above with respect to FIG. 1. It should be appreciated that the network 200 may have other components than those depicted. Further, the embodiment shown in the figure is only one example of a network that may incorporate an embodiment of the disclosure. In some other embodiments, network 200 may have more or fewer components than shown in the figure, may combine two or more components, or may have a different configuration or arrangement of components. For example, while a certain number of network devices, access devices, and gateways are shown in FIG. 2, one of ordinary skill in the art will appreciate that any number of network devices, access devices, and gateways may be included in the network 200.

Network device 206 may include an automation switch that a user can remotely access, configure, and control. The network device 206 also allows a user to remotely access, configure, and control any electronic device that can be plugged into the network device 206. Network devices 202 and 204 may include any type of network device that a user can remotely access, configure, and control, such as a network-connected video camera, a network-connected appliance, a network-connected light, or any other network-connected device. The network devices 202, 204, 206 may share a common remote network service provider on a shared network (e.g., a cloud network offering cloud services, remote local area networks exchanging and sharing communications, or other suitable shared network). In one illustrative example, the network devices 202, 204, 206 may be registered with and receive services from the Internet of Things (IoT) network service provider 218. The network 216 may include one or more network infrastructure systems that provide the services. The infrastructure system of the network 216 is operated by the IoT network service provider 218, and may include one or more servers. The IoT network service provider 218 may provide various services to registered devices, such as registration (e.g., registration as described with respect to FIG. 8 below), feature customization, information storage, application support, firmware and other software maintenance, message routing to other registered devices, or the like. The IoT network service provider 218 may also provide registered devices with the ability to remotely access, configure, and control other registered devices. For example, a user may operate the access device 222 to access one or more of the network devices 202, 204, 206 by sending a message via signal 224 to the IoT network service provider 218. The IoT network service provider 218 may receive and process the message, and forward the necessary information to the destination device (e.g., network device 202, 204, 206) according to the contents of the message. In some embodiments, the network devices 202, 204, or 206 may share more than one common network service provider.

Access devices 208 and 212 may include any type of access device that can be used to access devices on the network 200, including one or more of the network devices 202, 204, 206. For example, similar to the access device 108 described above, access devices 208 and 212 may include any human-to-machine interface with network connection capability that allows access to the network 200. The access devices 208 and 212 may also share a common network service provider. In one illustrative example, the access devices 208 and 212 may be registered with and receive services from the voice-over-Internet-Protocol (VoIP) network service provider 220. The network 214 may include one or more infrastructure systems that provide the VoIP services. The infrastructure system of the network 214 is operated by the VoIP network service provider 220, and may include one or more servers. The VoIP network service provider 220 may provide the access devices 208 and 212 with the ability to connect to other devices anywhere in the world via the Internet. In some embodiments, the access devices 208 and 212 may share more than one common network service provider.

One of ordinary skill in the art will appreciate that the techniques described herein are not limited to any particular network service provider or service, and that these techniques apply to any network service provider that provides shared network services other than VoIP or IoT. For example, other network service providers may include providers of security services, media services (e.g., video and/or audio services), or any other service that can be provided over a wired or wireless network to network devices and/or access devices.

In some embodiments, the network 200 may include a local area network in which the network devices 202, 204, 206 and the access devices 208, 212 communicate with one another through the gateway 210 using wired and wireless connections (e.g., using WiFi™ communication protocols) or communicate with one another directly using one or more direct communication protocols (e.g., UPnP, Bluetooth™, Zigbee™, UWB, WiFi-Direct, BLE, sound frequencies, IR frequencies, and/or the like). In some embodiments, the network 200 may include a mesh network, in which two or more of the network devices 202, 204, 206, the access devices 208, 212, and/or the gateway 210 may operate as nodes of the mesh network and may route communications to different devices in the network 200. For example, the network devices 202, 204, 206, the access devices 208, 212, and/or the gateway 210 may be programmed with a dynamic routing protocol (e.g., using programs, software, or the like) that enables the devices to interact within the network 200. In some examples, a dynamic routing protocol may include the language a node of a mesh network communicates with other nodes to communicate information about the reachability and status of networks. The dynamic routing protocol may be used to determine routes that are stored in routing tables within each node, and also to update the routing tables stored by the nodes. In some cases, information may be communicated across the network 200 from node to node (device to device) by hopping wirelessly from one mesh node to the next. A connection between adjacent nodes or gateways may be referred to herein as a hop. Each node may discover and track neighboring nodes using the dynamic routing protocol. For example, any of the devices 202, 204, 206, 208, and/or 212 that are nodes to a mesh network may use the dynamic routing protocol to exchange information about networks with which they are connected, information about destination addresses seen in received communication packets or frames, and other appropriate information. The nodes may be configured to automatically select an appropriate or best path through the network 200 (e.g., the quickest path, most reliable path, less congested path, a combination thereof, or the like) using the dynamic routing protocol. For example, for a destination device located equidistant from two nodes, the two nodes may select the node that provides the strongest signal to the destination device. In some embodiments, the dynamic routing protocol may be used to determine a next-best path if a determined best path to a destination becomes unusable. In some embodiments, a gateway (e.g., gateway 210 or other gateway not shown in FIG. 2) may be programmed with the dynamic routing protocol and may be able to select an appropriate or best path through the network 200. As one example of a routing protocol, the devices 202, 204, 206, 208, 212 and/or the gateway 210 may be configured to operate according to a Hybrid Wireless Mesh Protocol (HWMP) defined in IEEE 802.11s. One of ordinary skill in the art will appreciate that any other appropriate routing protocol may be used.

Secure connections may be established between the network devices 202, 204, 206 and the IoT network service provider 218. Secure connections may also be established between the access devices 208, 212 and the VoIP network service provider 220. The networks 214 and 216 may host NAT Traversal applications used to establish the secure connections. As illustrated in FIG. 2, a separate secure connection is established for each network device 202, 204, 206 with the gateway 210 and the IoT network service provider 218. A separate connection is also established for each access device 208 and 212 with the gateway 210 and the VoIP network service provider 220. In some examples, the secure connections may include secure TCP connections. Each secure connection established for the network devices 202, 204, 206 and the access devices 208, 212 may be referred to herein as a network address translation connection.

The gateway 210 may provide network address translation (NAT) services for the network devices 202, 204, 206 and access devices 208, 212. The gateway 210 may perform various types of NAT, including static NAT, dynamic NAT, overloading, overlapping, or any other available NAT service. For example, the gateway 210 may perform multiplexing to maintain the different secure connections using different TCP or user datagram protocol (UDP) ports. Communications transmitted by the network devices 202, 204, 206 and the access devices 208, 212 may include IP packets. One of ordinary skill in the art will appreciate that the communications may include other types of packets. Each IP packet may include a source address, a source port, a destination address, and a destination port. The source address includes the private IP address of the device from which the communication originated. The source port includes the TCP or UDP port number assigned to the packet by the originating device. The destination address includes the IP address of the device to which the communication is destined to be received. The destination port includes the TCP or UDP number that the originating device is requesting be opened. Upon receiving a packet, the gateway 210 may map private IP addresses of each of the network devices 202, 204, 206 and the access devices 208, 212 to one or more public IP addresses maintained by the gateway 210. The one or more public IP addresses may be assigned to the gateway 210 (e.g., by an administrator or assignor of IP addresses) and may be unique to that gateway 210. The gateway 210 may also map the ports of each of the network devices 202, 204, 206 and the access devices 208, 212 to TCP or UDP ports of the gateway 210.

In one example, the gateway 210 may receive a communication with an IP packet from the network device 202. The gateway 210 may save a private source IP address and source port number of the network device 202 to an address translation table. The gateway 210 may then replace the source IP address of the network device 202 in the packet with the gateway's 210 IP address, and may also replace the source port of the network device 202 in the packet with the port number that matches the spot in the address translation table at which the gateway 210 saved the network device's 202 address information. The address translation table includes a mapping of the IP address and port number of the network device 202 with the IP address of the gateway 210. The gateway 210 can then send the packet to the network 216. When the network 216 responds or sends a packet back to the network device 202, the gateway 210 will receive the packet because its IP address is in the packet that was sent to the network 216. The gateway 210 can refer to the destination port and/or the destination address in the received packet and identify the appropriate mapping in the address translation table to determine which device on the network 200 to which the packet is destined. The gateway 210 may replace the destination address and destination port (which are those of the gateway 210) in the packet with the private IP address and port of the network device 202, which are saved in the address translation table, before sending the packet to the network device 202. The gateway 210 can then send the packet to the network device 202.

In some embodiments, each secure connection may be kept open for an indefinite period of time. An indefinite secure connection established by a device with a network service provider may be referred to herein as a long-duration session. Long-duration sessions are desirable so that the network service providers 218 and 220 can initiate communications with the network devices 202, 204, 206 or access devices 208, 212 at any time. For example, in the event the access device 222 sends a communication destined for the network device 202 to the network 216, but the secure connection established between the network 216 and the network device 202 was closed (e.g., timed out or otherwise terminated), the network 216 would be unable to send the communication to the network device 202. This is because the gateway 210 removes an entry for each secure connection from the address translation table when each connection is closed, and thus is unable to route the communication to the network device 202. Various protocols may be used to establish a secure long-duration session for each device 102, 104, 106, 208, 212 and the networks 214 and 216. Such protocols may include Session Traversal Utilities for NAT (STUN), Traversal Using Relay NAT (TURN), Interactive Connectivity Establishment (ICE), a combination of two or more of STUN, TURN, and ICE, or any other appropriate NAT traversal protocol. Using these protocols, pinholes are created in a firewall of the gateway 210 that allow communications originating from the networks 214 and 216 to pass to the network devices 202, 204, 206 and the access devices 208, 212.

As illustrated in FIG. 2, the gateway 210 maintains a separate secure connection with a network service provider 218 or 220 for each device that requests services from a network service provider 218 or 220. As a result, multiple dedicated connections are established and maintained between the gateway 210 and the network service providers 218 and 220 for each device 202, 204, 206, 208, and 212. Maintaining such a large number of dedicated NAT connections adds unnecessary load and networking overhead to the gateway 210 and the network service providers 218 and 220. Accordingly, techniques and systems are described herein that reduce the number of network address translation connections that are maintained by the gateway 210 and the network service providers 218 and 220.

Figure 3:
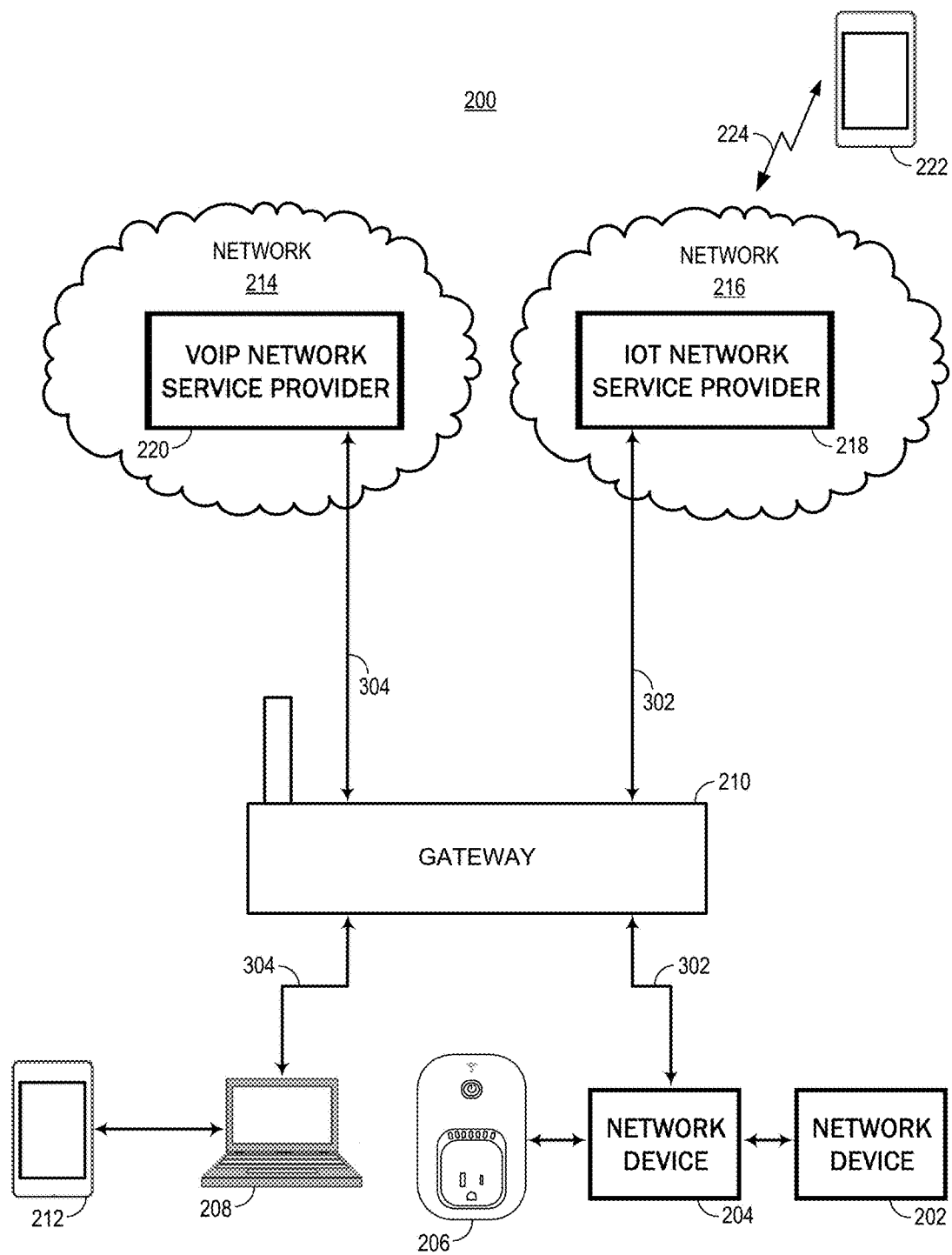
FIG. 3 is an illustration of an example of a network environment including a proxy network address translation device, in accordance with some embodiments.

FIG. 3 illustrates an example of the network 200 with network device 204 and access device 208 operating as proxy network address translation devices for other devices in the network 200. The network device 204 operates as a proxy network address translation device for network devices 202 and 206, and the access device 208 operates as a proxy network address translation device for the access device 212. One of ordinary skill in the art will appreciate that the example illustrated in FIG. 3 is illustrative, and that any device on the network 200 may operate as a proxy network address translation device for any other device on the network 200. In some embodiments, a device may act as a proxy network address translation device for one or more other devices that share a common network service provider with the proxy device.

In some embodiments, a promotion process may be performed by the different devices on the network 200 in order to select a proxy device from among the devices. In some examples, all devices on a network may perform the promotion process and may select a proxy device from among the devices. In some examples, devices that share a common network service provider may perform a promotion process to select a proxy device from among the devices sharing the common service provider. In one example, the network devices 202, 204, and 206, which share the IoT network service provider 218, may perform a promotion process in order to determine which device 202, 204, or 206 will act as a the proxy network address translation device. The network devices 202, 204, 206 can exchange performance metrics that can be used to determine which network device 202, 204, 206 will be selected as the proxy device. Performance metrics may include signal strength of network signals received by the network device 202, 204, or 206 (e.g., from other devices on the network 200, such as other network devices 202, 204, or 206, access devices 208 or 212, or gateway 210), a number of hops from the network device 202, 204, or 206 to the gateway 210, processing power, connection reliability, duty cycle, or any other relevant metric that can be used to compare network performance of each network device 202, 204, or 206. Connection reliability is a metric that depends on a type of the particular network device 202, 204, 206. For example, some types of network devices may have less reliable connections as compared to other types of network devices, which may be due to transceiver radio performance, mobility of the device that may cause the device to occasionally move out of range of network signals, or the like. Duty cycle is a metric that indicates how often the network device 202, 204, 206 powers off. For example, network devices 202, 204, or 206 may periodically power on and off for various reasons, such as to save battery power, to periodically receive messages, or the like. The performance metric relating to the number of hops from the gateway 210 may only be included in embodiments in which the network devices 202, 204, or 206 operate as nodes of a mesh network.

The network devices 202, 204, 206 may transmit each of their performance metrics to the other network devices 202, 204, or 206. For example, network devices 204 and 206 may transmit their performance metrics to network device 202, network devices 202 and 206 may transmit their performance metrics to network device 204, and network devices 202 and 204 may transmit their performance metrics to network device 206. Each of the network devices 202, 204, 206 may compare its own performance metrics with the performance metrics received from the other network devices 202, 204, 206. For example, each network device 202, 204, 206 may compare its signal strength to the signal strength of the other network devices 202, 204, 206. In another example, each network device 202, 204, 206 may compare its number of hops from the gateway 210 to the number of hops of the other network devices 202, 204, 206 in the event the devices 202, 204, 206 operate in a mesh network. In other examples, processing power, connection reliability, duty cycle, or other performance metrics of the network devices 202, 204, 206 may be compared to that of the other network devices 202, 204, 206. In some embodiments, a combination of any of the aforementioned performance metrics may be compared and used to select a proxy network address translation device. In some examples, the performance metrics may be weighted based on importance, and a combined performance metric comparison result may be determined and used to select a proxy device. For example, signal strength may be weighted higher than processing power. One of ordinary sill in the art will appreciate that any performance metric may be weighted higher or lower than another performance metric depending on preferences of a network administrator, manufacturer of the network devices 202, 204, 206, or the like.

Based on the performance metric comparison, the network device 202, 204, or 206 that has the best performance metrics may be promoted or selected to operate as the proxy network address translation device. In the example illustrated in FIG. 3, the network device 204 is selected as the proxy device. The network device 204 is selected based on one or more of its performance metrics outperforming the performance metrics of the other network devices 202 and 206. In some embodiments, once the network device 204 determines that its performance metrics outperform those of the network devices 202 and 206 and should be selected as the proxy network address translation device, the network device 204 may send a query to the other network devices 202 and 206 requesting that it be selected as the proxy device. The network devices 202 and 206 may reply with a response confirming that the network device 204 is selected as the proxy device based on their comparison of the performance metrics. In some embodiments, once the network devices 202 and 206 determine that the network device 204 has better performance metrics than them and should be selected as the proxy device, the network devices 202 and 206 may transmit a message to the network device 204 indicating or verifying that it has been selected as the proxy device. In such embodiments, the network device 204 may not need to send the query to the network devices 202 and 206 to confirm its selection as the proxy device.

In some embodiments, when selecting a proxy device, the network devices 202, 204, 206 may also take into account whether any of the network devices 202, 204, 206 have an existing secure connection established with the IoT network service provider 218 through the gateway 210. For example, when performing the promotion process, the network devices 202, 204, 206 may determine that the network device 204 already has an existing connection with the IoT network service provider 218, and that the network devices 202 and 206 do not have an existing connection. In such an example, the network devices 202, 204, 206 may determine that the network device 204 should be selected as the proxy network address translation device. Such embodiments lead to better network efficiency by not requiring the network device 204 to tear down its secure connection and the other network devices 202 and 206 to establish a secure connection in the event one of the network devices 202 or 206 were selected as the proxy device based on performance metric comparison. In some embodiments, the network devices 202, 204, 206 may not perform a performance metrics comparison in the event only one of the devices 202, 204, or 206 already has an existing secure connection established when a proxy device is being selected. In some embodiments, the network devices 202, 204, 206 may also compare the performance metrics even when only one of the network devices 202, 204, or 206 has an existing connection already established and the other network devices 202, 204, or 206 do not. In some embodiments, when two or more of the network devices 202, 204, or 206 has an existing secure connection already established when the network devices 202, 204, 206 are selecting a proxy device, the network devices 202, 204, 206 may perform the performance metrics comparison to determine which device 202, 204, 206 should be selected as the proxy device.

The same promotion process as that described above may be performed by the access devices 208 and 212 when selecting the access device 208 as the proxy network address translation device. The access devices 208 and 212 may also take into account the existence or non-existence of a secure connection with the VoIP network service provider 220 through the gateway 210, as described above.

Once selected as the proxy network address translation device, the proxy network device 204 can aggregate network address translation traversal for itself and the other network devices 202 and 206. For example, the network device 204 may establish a single secure network address translation connection 302 for all of the network devices 202, 204, and 206. The network device 204 can use any of the network address translation techniques described above to establish the single network address translation connection 302, such as STUN, TURN, ICE, a combination of two or more of STUN, TURN, and ICE, or any other appropriate NAT traversal protocol. In some embodiments in which the network device 204 already has an existing network address translation connection established, the existing connection may be used as the single secure network address translation connection 302. In some embodiments in which one or more of the network devices 202 and 206 have an existing network address translation connection established, the existing connections may be terminated so that only the network device 202 has a network address translation connection established with the IoT network service provider 218. Similarly, the proxy access device 208 can aggregate network address translation traversal for itself and the other access device 212 by creating a single network address translation connection 304 using the same techniques as those used by the proxy network device 204.

Once the network device 204 is established as the proxy network address translation device, the other network devices 202 and 206 send all communications destined for the IoT network service provider 218 to the proxy network device 204. The access device 212 may also transmit all communications destined for the VoIP network service provider 220 to the proxy access device 208. Upon receiving the communications, the network device 204 and access device 208 may send the communications to the gateway 210 over their respective network address translation connections 302 and 304. The gateway 210 can then perform one or more of the NAT services described above (e.g., dynamic NAT, overloading, or any other NAT service) to route the communications to the network service providers 218 and 220 over the network address translation connections 302 and 304, respectively. The gateway 210 may receive communications from the network service providers 218 and 220 over the network address translation connections 302 and 304. The communications may be destined for one or more of the network devices 202, 204, 206 or the access devices 208, 212. Because only a single network address translation connection 302 is established for the network devices 202, 204, 206, the gateway 210 sends all communications destined for one of the network devices 202, 204, 206 to the proxy network device 204 over the single connection 302. The proxy network device 204 can then determine to whom the communication is destined. In the event a communication is destined for one of the network devices 202 or 206, the proxy network device 204 may send the communication to the appropriate network device 202 or 206. When a communication is destined for the proxy network device 204, the network device 204 can further process the communication and act accordingly. Similarly, the gateway 210 sends all communications that are destined for the access devices 208 and 212 to the proxy access device 208 over the connection 304. The proxy access device 208 can then determine to whom the communications are destined.

In some embodiments, the proxy network device 204 maintains a table of unique identifiers assigned to devices for which it is operating as a proxy network address translation device. The proxy access device 208 may also maintain a table of unique identifiers of devices for which it is operating as a proxy device. A unique identifier may include a media access control (MAC) address, a universally unique identifier (UUID), a globally unique identifier (GUID), a unique device identifier (UDID), or any other identifier that is unique to a device. The table of unique identifiers can be used when communications are received from the network service providers 218 and 220 that are destined for one or more of the network devices 202, 204, 206 or the access devices 208, 212. For example, a communication may include an identifier of the device to which the communication is destined, which may be referred to herein as a destination address. The proxy network device 204, for example, may receive a communication and may determine the destination address that is included in the communication. The proxy network device 204 may then compare the destination address to the table of unique identifiers to determine which device the destination address belongs. In some embodiments, the destination address may be the same as the unique identifier. In some embodiments, the destination address may be a different value than the unique identifier. For example, the destination address may be a MAC address, and the unique identifier in the table may be a UUID, a GUID, a UDID, or any other identifier that is unique to a device. The table of unique identifiers may include a mapping between the destination address and the unique identifier.

In some embodiments, a proxy network address translation device may become unfit for operating as the proxy device. For example, the performance metrics of a proxy device (e.g., network device 204 or access device 208) may degrade to a point that is insufficient for supporting a secure network address translation connection. As another example, a network device or access device operating as a proxy device may be turned off or otherwise removed from the network 200. In such embodiments, the promotion process described above may be performed again to determine a new proxy network address translation device.

In some embodiments, the network devices 202, 204, 206 may periodically exchange performance metrics so that the promotion process can be performed on a periodic basis. Such embodiments allow the best network device 202, 204, or 206 to operate as the proxy network address translation device. In some embodiments, each of the network devices 202, 204, 206 may transmit a request message to the other network devices 202, 204, 206 requesting the performance metrics of each network device 202, 204, 206. For example, a network device 202, 204, 206 may send the request when it is first connected to the network 200 so that an updated promotion process may be performed. As another example, the proxy network device 204 may determine that one or more of its performance metrics have fallen below a threshold value, and may transmit a request to the other network devices 202 and 206 for them to send their performance metrics to the network device 204. The network device 204 may also send its performance metrics to the network devices 202 and 206 along with the request. The network devices 202, 204, 206 may then perform the promotion process described above to determine whether the proxy device should change. In some embodiments, a new device is selected as the proxy device only when the existing proxy device is unable to operate as the proxy device. Such embodiments may be desired when tearing down the network address translation connection and establishing a new one is more time consuming and inefficient than continuing to use the connection of the existing proxy device even when the connection is degraded compared to other possible device connections. Similar techniques may also be used by the access devices 208 and 212 to determine whether to change the proxy device.

Using the above-described techniques, a single network address translation connection 302 is established with the network service provider 218 for all of the network devices 202, 204, and 206. Similarly, a single network address translation connection 304 is established with the network service provider 220 for the access devices 208 and 212. Accordingly, by selecting the network device 204 and the access device 208 to operate as proxy network address translation devices for other devices, the number of network address translation connections with the gateway 210 and to the network service providers 218 and 220 is reduced by the number of devices that use the network device 204 and access device 208 as proxy devices to communicate with the gateway 210 and the network service providers 218 and 220. Using proxy network address translation devices thus reduces the number of network address translation connections that need to be maintained by the gateway 210 and the network service providers 218 and 220.

Figure 4:
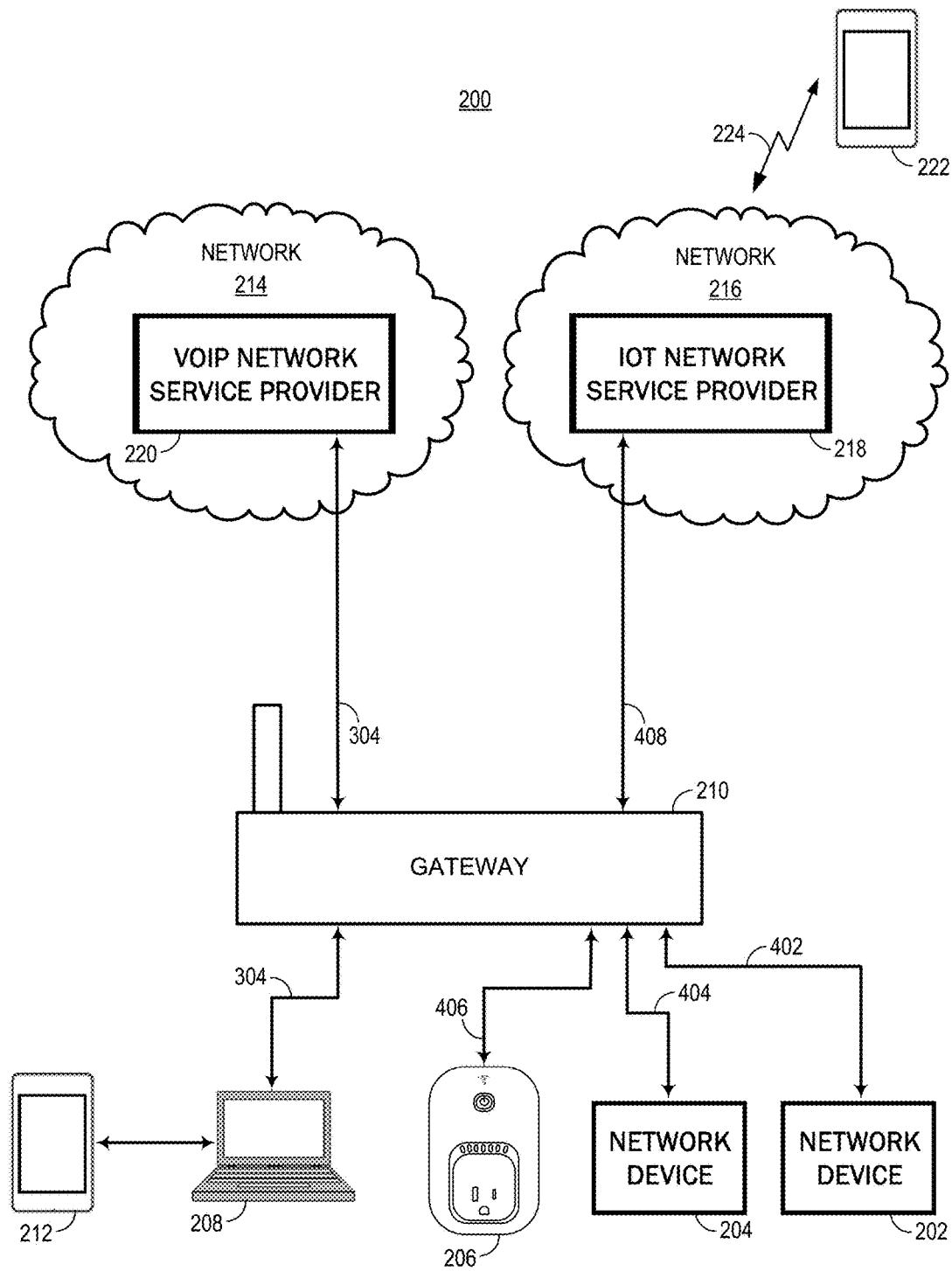
FIG. 4 is an illustration of another example of a network environment including a proxy network address translation device, in accordance with some embodiments.

FIG. 4 illustrates an example of the network 200 with the gateway 210 operating as proxy network address translation devices for other devices in the network 200. In some embodiments, as illustrated in FIG. 4, the gateway 210 may perform network address translation proxy services for only a select group of devices on the network 200 that share a common network service provider, and may establish a single network address translation connection for that group of devices. For example, each of the network devices 202, 204, 206 may establish separate connections 402, 404, 406 with the gateway 210. The gateway 210 may aggregate network address translation traversal for the network devices 202, 204, 206 by establishing a single network address translation connection 408 with the IoT network service provider 218 for the network devices 202, 204, and 206. In such embodiments, similar to the embodiments described for FIG. 3, the access device 208 may operate as a proxy network address translation device for itself and the access device 212, and may establish a single network address translation connection 304 with the VoIP network service provider 220 via the gateway 210.

In some embodiments, the gateway 210 may also perform network address translation proxy services for the access devices 208 and 212. In such embodiments, each of the access devices 208 and 212 may connect to the gateway 210, and the gateway 210 may establish a single network address translation connection with the VoIP network service provider 220 for the access devices 208 and 212.

A similar promotion process as that described with respect to FIG. 3 may be performed by the network devices 202, 204, 206. When performing the promotion process, the network devices 202, 204, 206 can determine that the gateway 210 is capable of operating as a proxy network address translation device for the network devices 202, 204, 206. Upon making such a determination, the network devices 202, 204, 206 may promote or select the gateway 210 as the proxy device, and may each send signals to the gateway 210 indicating that the gateway 210 is to act as a proxy network address translation device for the network devices 202, 204, 206. In some embodiments, when the gateway 210 initially connects with the network devices 202, 204, 206, the gateway 210 may send signals to the devices 202, 204, 206 indicating that it will act a proxy network address translation device for them. The network devices 202, 204, 206 may reply with a response confirming that the gateway 210 can act as a proxy device for them. In such embodiments, a promotion process is not required unless the gateway 210 becomes unable to operate as the proxy device.

The gateway 210 operating as the proxy device for network devices 202, 204, 206 may receive all communications from the IoT network service provider 218 that are destined for the network devices 202, 204, 206. The proxy gateway 210 can determine to whom the communications are destined, and can then send the communication to the appropriate network device 202, 204, or 206. In some embodiments, the proxy gateway 210 may maintain a table of unique identifiers assigned to devices for which it is operating as a proxy network address translation device, as described above with respect to FIG. 3. In some cases, the table of unique identifiers may be included in the gateway's 210 address translation table. In some cases, the table of unique identifiers may be maintained in a separate table from the address translation table. The table of unique identifiers may be used to determine to which network device 202, 204, 206 to send communications that are received from the IoT network service provider 218, as described above. Similar techniques may be used by the proxy gateway 210 in embodiments in which it operates as a proxy device for access devices 208 and 212.

FIG. 5 illustrates an embodiment of a process 500 of operating a computing device as a proxy network address translation device. In some aspects, the process 500 may be performed by a computing device, such as a network device 102, 104, 106, 202, 204, or 206, or an access device 108, 208, or 212, shown in FIGS. 1-4. While specific examples may be given of a client device, such as network device or access device, performing the process 500, one of ordinary skill in the art will appreciate that other devices may perform the process 500.

Process 500 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 500 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

At 502, the process 500 includes receiving, by a computing device, a communication. The communication includes a performance metric of one or more devices on a local network. The computing device and the one or more devices share a common network service provider. As one example, the computing device may include network device 204, the one or more devices may include network devices 202 and 206, and the common network service provider may include the IoT network service provider 218. The communication may be received by the network device 204 from either the network device 202 or the network device 206. As another example, the computing device may include access device 208, the one or more devices may include access device 212, and the common network service provider may include the VoIP network service provider 220. The communication may be received by the access device 208 from the access device 212. In some embodiments, more than one performance metric of the one or more devices may be received. One of ordinary skill in the art will appreciate that the common network service provider may include any network service provider that provides network services.

At 504, the process 500 includes determining that the computing device is selected for operating as a proxy network address translation device for the one or more devices that share the common network service provider, wherein determining that the computing device is selected is based on the performance metric. In some embodiments, the process 500 may include comparing a performance metric of the computing device with the received performance metric of the one or more devices, and determining that the computing device is selected for operating as the proxy network address translation device for the one or more devices when the performance metric of the computing device outperforms the performance metric of the one or more devices. In some embodiments, the performance metric may include signal strength, a number of hops, processing power, connection reliability, duty cycle, a combination thereof, or any other relevant metric that can be used to compare network performance of devices, as described with respect to FIG. 3.

In some embodiments, the process 500 includes determining whether the computing device has an existing connection to the common network service provider, and determining that the computing device is selected for operating as the proxy network address translation device for the one or more devices when the computing device has an existing connection to the common network service provider. In some embodiments, as described above with respect to FIG. 3, the computing device may not further compare performance metrics in the event the computing device has an existing connection to the common network service provider. In some embodiments, the computing device may also compare the performance metrics even when the computing device has an existing connection to the common network service provider.

In some embodiments, the process 500 includes causing the transmitter to transmit a request message to the one or more devices, wherein the request message includes a request for each of the one or more devices to send the performance metric. For example, the computing device may transmit the request message upon connecting to the local network. As another example, the computing device may transmit the request message upon detecting that one or more of its performance metrics fall below a certain threshold level. In some embodiments, the performance metric of one or more devices is periodically received from the one or more devices. As described above with respect to FIG. 3, a promotion process may be performed each time the performance metric is received from the one or more devices.

In some embodiments, the process 500 includes causing the transmitter to transmit a query, wherein the query includes a request for selection of the computing device as the proxy network address translation device for the one or more devices. In some embodiments, the process 500 includes receiving a response to the query indicating that the computing device is selected as the proxy network address translation device for the one or more device. In some embodiments, the computing device may receive a message from the one or more devices indicating that the computing device has been selected as the proxy network address translation device. In such embodiments, the message may be received by the computing device without requiring the computing device to send a query. For example, the one or more devices may transmit the message upon determining that the computing device should be selected as the proxy network address translation device.

At 506, the process 500 includes aggregating network address translation traversal for the one or more devices that share the common network service provider. Aggregating the network address translation traversal includes establishing a single network address translation connection with the common network service provider, and communications of the one or more devices are communicated over the single network address translation connection. Using FIG. 3 as an example, the network device 204 establishes the single network address translation connection 302 for the all of the network devices 202, 204, and 206. The computing device may use any of the network address translation techniques described above to establish the single network address translation connection. For example, techniques such as STUN, TURN, ICE, a combination of two or more of STUN, TURN, and ICE, or any other appropriate NAT traversal protocol may be used to establish the single network address translation connection.

At 508, the process 500 includes causing a transmitter to transmit communications of the one or more devices, wherein the communications of the one or more devices are transmitted over the single network address translation connection with the common network service provider. For example, the computing device may receive a communication from a device for which it is operating as a proxy device. The computing device may transmit the communication over the single network address translation connection to a gateway. The gateway may perform network address translation and may then send the communication to the common network service provider, as described above with respect to FIG. 3.

In some embodiments, the process 500 further includes receiving a network communication, wherein the network communication includes a unique identifier assigned to a destination device for the network communication, and wherein the network communication is received over the single network address translation connection with the common network service provider. The process 500 further includes determining the destination device for the network communication, wherein the destination device is determined by comparing the unique identifier to a table of unique identifiers assigned to the computing device and the one or more devices. For example, the computing device may maintain a table of unique identifiers assigned to devices for which it is operating as a proxy network address translation device. The computing device may refer to the table anytime it receives a communication from the common network service provider. The communications may include a destination address, which can be cross-referenced with the table to determine the destination device to which each communication is intended.

FIG. 6 illustrates an embodiment of a process 600 of selecting a proxy network address translation device. In some aspects, the process 600 may be performed by a computing device, such as a network device 102, 104, 106, 202, 204, or 206, or an access device 108, 208, or 212, shown in FIGS. 1-4. While specific examples may be given of a client device, such as network device or access device, performing the process 600, one of ordinary skill in the art will appreciate that other devices may perform the process 600.

Process 600 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

At 602, the process 600 includes receiving, by a computing device, a first communication. The first communication includes a performance metric of one or more devices on a local network. The computing device and the one or more devices share a common network service provider. As one example, the computing device may include network device 202, the one or more devices may include network devices 204 and 206, and the common network service provider may include the IoT network service provider 218. The communication may be received by the network device 202 from either the network device 204 or the network device 206. As another example, the computing device may include access device 212, the one or more devices may include access device 208, and the common network service provider may include the VoIP network service provider 220. The communication may be received by the access device 212 from the access device 208. In some embodiments, more than one performance metric of the one or more devices may be received. One of ordinary skill in the art will appreciate that the common network service provider may include any network service provider that provides network services.

At 604, the process 600 includes determining that another device is selected for operating as a proxy network address translation device for the computing device, wherein determining that the computing device is selected is based on the performance metric. In some embodiments, the process 600 may include comparing a performance metric of the computing device with the received performance metric of the one or more devices, and determining that the other device is selected for operating as the proxy network address translation device for the computing device when the performance metric of the computing device is outperformed by the performance metric of the other device. In some embodiments, the performance metric may include signal strength, a number of hops, processing power, connection reliability, duty cycle, a combination thereof, or any other relevant metric that can be used to compare network performance of devices, as described with respect to FIG. 3.

In some embodiments, the process 600 may further include receiving a query. The query includes a request for selection of the other device as the proxy network address translation device for the computing device. The query may be transmitted by the other device in response to the other device determining that it should be selected as the proxy network address translation device. The process 600 may further include transmitting a response to the query. The response may be transmitted to the other device, and indicates that the other device is selected as the proxy network address translation device for the computing device.

In some embodiments, the process 600 may further include causing the transmitter to transmit a message. The message indicates that the other device is selected as the proxy network address translation device for the computing device. The message may be sent in response to the determination that the other device is selected for operating as the proxy network address translation device. The message may be sent even when a query is not received from the other device requesting that the other device be selected as the proxy network address translation device.

In some embodiments, the process 600 may further include determining whether the other device has an existing connection to the common network service provider, and determining that the other device is selected for operating as the proxy network address translation device for the computing device when the other device has an existing connection to the common network service provider. In some embodiments, as described above with respect to FIG. 3, the computing device may not further compare performance metrics in the event the other device has an existing connection to the common network service provider. In some embodiments, the computing device may also compare the performance metrics even when the other device has an existing connection to the common network service provider.

In some embodiments, the process 600 may include causing the transmitter to transmit a request message to the one or more devices, wherein the request message includes a request for each of the one or more devices to send the performance metric. For example, the computing device may transmit the request message upon connecting to the local network. In some embodiments, the performance metric of one or more devices is periodically received. As described above with respect to FIG. 3, a promotion process may be performed each time the performance metric is received from the one or more devices.

At 606, the process 600 includes causing a transmitter to transmit a second communication destined for the common network service provider, wherein the second communication is transmitted over a connection with the other device, and wherein the second communication is communicated to the common network service provider by the other device. For example, the computing device may send the second communication to the other device that is operating as the proxy network address translation device. The other device may aggregate network address translation traversal for itself and for the computing device by establishing a single network address translation connection with the common network service provider. The other device may then communicate the second communication over the single network address translation connection to a gateway. The gateway may perform network address translation and may then send the communication to the common network service provider, as described above with respect to FIG. 3.

In some embodiments, the process 600 may include receiving a communication over the connection with the other device. For example, the other device operating as the proxy device may receive a network communication over the single network address translation connection with the common network service provider. The communication may include a unique identifier assigned to the computing device, indicating that the computing device is the destination device for the communication. The other device may determine that the computing device is the destination device for the communication by comparing the unique identifier to a table of unique identifiers assigned to the computing device and the other devices. The other device may then send the communication to the computing device over the connection.

Figure 7:
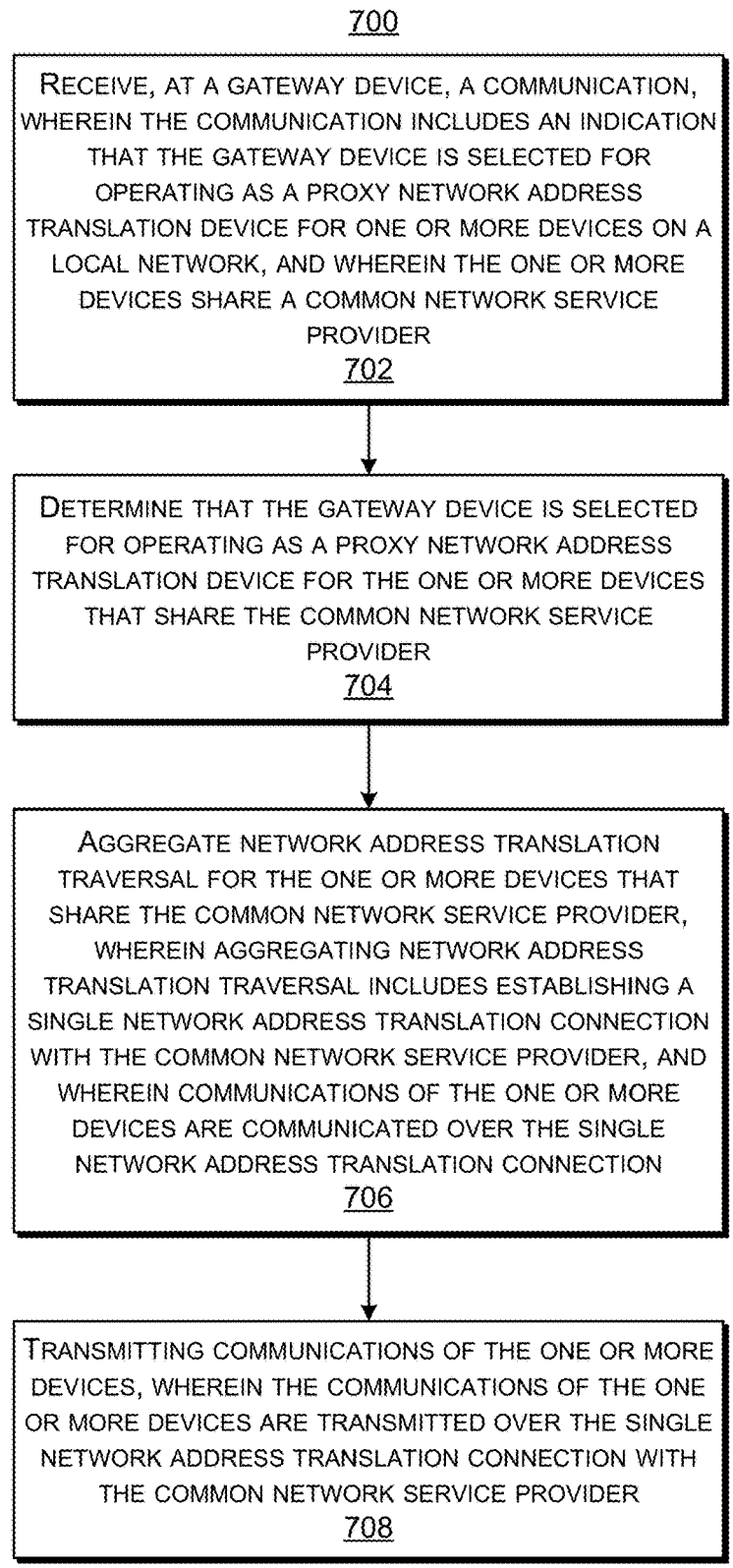
FIG. 7 is a flowchart illustrating an embodiment of a process of operating a gateway device as a proxy network address translation device, in accordance with some embodiments.

FIG. 7 illustrates an embodiment of a process 700 of operating a gateway device as a proxy network address translation device. In some aspects, the process 700 may be performed by a gateway device, such as a gateway device 110, 112, or 210, shown in FIGS. 1-4. While specific examples may be given of a gateway device performing the process 700, one of ordinary skill in the art will appreciate that other devices may perform the process 700.

Process 700 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

At 702, the process 700 includes receiving, at a gateway device, a communication. The communication includes an indication that the gateway device is selected for operating as a proxy network address translation device for one or more devices on a local network. The one or more devices share a common network service provider. As one example, the gateway device may include the gateway 210, the one or more devices may include network devices 202, 204, and 206, and the common network service provider may include the IoT network service provider 218. As another example, the gateway device may include the gateway 210, the one or more devices may include access devices 208 and 212, and the common network service provider may include the VoIP network service provider 220. One of ordinary skill in the art will appreciate that the common network service provider may include any network service provider that provides network services.

At 704, the process 700 includes determining that the gateway device is selected for operating as a proxy network address translation device for the one or more devices that share the common network service provider, wherein determining that the gateway device is selected is based on the received communication. For example, while performing a promotion process, the one or more devices may determine that the gateway device is capable of operating as a proxy network address translation device for the one or more devices. Upon making such a determination, the one or more devices may send the communication to the gateway device indicating that the gateway device is to operate as the proxy network address translation device for the one or more devices. In another example, when the gateway device initially connects with the one or more devices, the gateway device may send signals to the devices indicating that it will act a proxy network address translation device for them. The one or more devices may reply with the communication confirming that the gateway device can act as a proxy device for them.

At 706, the process 700 includes aggregating network address translation traversal for the one or more devices that share the common network service provider, wherein aggregating network address translation traversal includes establishing a single network address translation connection with the common network service provider. Communications of the one or more devices are then communicated over the single network address translation connection. At 708, the process 700 includes transmitting communications of the one or more devices, wherein the communications of the one or more devices are transmitted over the single network address translation connection with the common network service provider.

Using one or more of the network configurations illustrated in FIGS. 3-4, and using the processes 500, 600, and 700, a single network address translation connection can be established for multiple devices on network. By operating one or more devices as proxies for other devices, the number of network address translation connections that must be maintained by the gateway and a network service provider is greatly reduced.

As previously noted, further techniques and systems are described herein for monitoring networks for self-healing and notification, as well as for network disconnection identification and repair.

Figure 8:
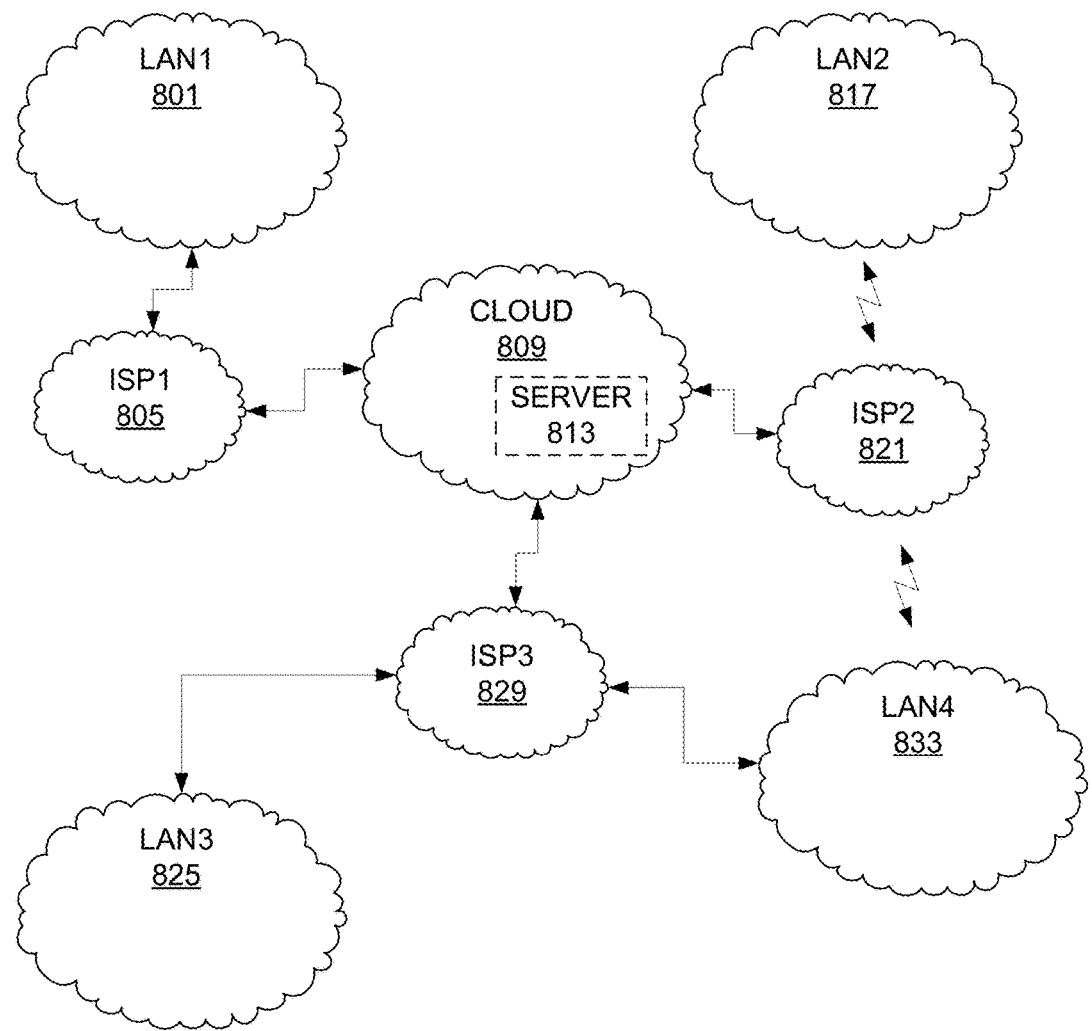
FIG. 8 is an illustration of an example of a wide area network environment, in accordance with some embodiments.

FIG. 8 illustrates a network embodiment including a first local area network (LAN1) 801, which connects to a first Internet service provider (ISP1) 805 that provides connectivity to the cloud 809. As illustrated, server 813 resides in a network referred to as cloud 809. Such a configuration masks the actual configuration and location of server 813, which is physically at another endpoint, similar to the configuration of LAN1 801, though the physical layout of the network connecting server 813 to the cloud is not of critical importance, other than the fact that server 813 can be accessed through the cloud 809. In one embodiment, the cloud 809 refers to the Internet. FIG. 8 further illustrates a second local area network (LAN2) 817 that wirelessly connects to a second service provider (ISP2) 821, which provides connectivity to the cloud 809 and server 813. A third local area network (LAN3) 825 connects to a third service provider (ISP3) 829, which provides connectivity to the cloud 809 and server 813. ISP3 829 further provides connectivity to a fourth local area network (LAN4) 833. As illustrated, LAN4 833 has redundant connections to the cloud 809 through ISP3 829 and, wirelessly, through ISP2 (821).

From the perspective of the server 813, each LAN is accessible through cloud 809 and the respective ISP. Generally, each LAN may contain one or more network devices, such as any of the network devices or described above and/or in any of the configurations described above. In some embodiments, a LAN may contain a network gateway which provides connectivity to additional network devices, such as wirelessly or over a wired connection, for example using an Ethernet connection. In a specific embodiment, a LAN uses a Network Address Translation (NAT) configuration, where all devices within the LAN share a single external network address and the devices are accessible only through the network gateway. In such a configuration, server 813 may not be able to initiate a communication with devices in the LAN without a specific port forwarding configuration established at the network gateway. Such a configuration is optionally setup in advance directly at the network gateway and may be permanent or temporary, such as according to a schedule. In general embodiments, however, a network device is only reachable within a LAN after it initiates a connection to the server 813 through the network gateway, which then automatically establishes a port forwarding configuration that allows the server 813 to communicate with the network device. This configuration is commonly employed in internet protocol version 4 (IPv4) networks. For advanced network configurations, such as networks employing internet protocol version 6 (IPv6), such a port forwarding configuration may not be necessary, as each device may be addressable using a unique address specific to only one device. The use of a port-forwarding configuration may be beneficial, even in IPv6 networks, if the network includes a firewall appliance between the ISP and the LAN.

In order to maintain an active connection with server 813, network devices within a LAN may periodically exchange signals with server 813 in order keep a port forwarding configuration active at a network gateway. In exemplary embodiments, server 813 maintains active connections with a plurality of network devices distributed across a plurality of networks. For example, in the configuration shown in FIG. 8, server 813 may maintain active connections with network devices in any or all of LAN1 801, LAN2 817, LAN3 825 and LAN4 833.

Figure 9:
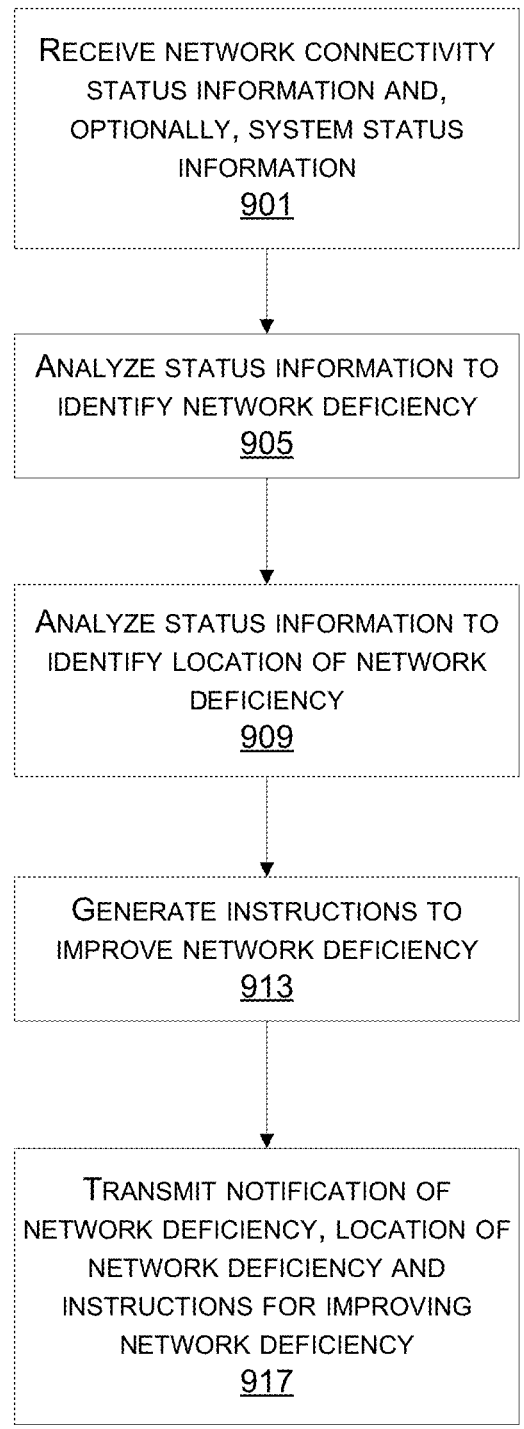
FIG. 9 provides a flowchart illustrating an embodiment of a process for identifying a network deficiency.

FIG. 9 provides an overview of an exemplary method embodiment. First, at 901, network connectivity status information and optionally system status information is received. In embodiments, network connectivity status includes LAN, internet or cloud connectivity for a plurality of network devices distributed across a plurality of networks, such as a plurality of local area networks. In embodiments, receiving network connectivity status information for network devices allows for determination when one or more network devices lose network connectivity, such as connectivity with one or more networks, such as a network or the internet or with one or more application service providers. In some embodiments, additional network status information is received, such as one or more of one or more of a time/date stamp, a network map, a network speed, a throughput, a network performance, a wide area network address, a local area network address, a MAC address, a device identifier, a connection type, a network connection status, a network robustness, a latency, a round-trip time, a one-way delay, a packet loss rate, a packet loss percentage, a number of network hops to the computing device, a route to the computing device, a list of open ports, a list of network connections, a connection uptime, a connection downtime, a connection log, a wireless network signal strength, a wireless network channel, a wireless network SSID, a network neighborhood fingerprint, a wireless signal strength, etc.

System status information optionally includes status information for one or more service providers, such as internet service providers, application service providers, network service providers, electrical utility systems and the like. In embodiments, obtaining system status information allows for identification of network deficiencies existing outside of a LAN that may impact the functionality of network devices within a LAN. For example, if status information for an internet service provider indicates an internet outage or malfunction at the internet service provider, network devices within a LAN may not be able to connect to an application service provider using a network connection that passes through the internet service provider experiencing an outage or malfunction. Similarly, if an application service provider is experiencing a system outage, network malfunction or other network deficiency, network devices that attempt to connect to the application service provider may be unable to do so. Further, if one or more electrical utility systems experience power outages, passage of information through networks serviced by those electrical utility systems may also experience difficulties. Receiving system status information of this nature advantageously allows for determination of such network deficiencies for further analysis, location determination and resolution.

At 905, the method illustrated in FIG. 9 analyzes the status information to identify a network deficiency. For example, as described above, the connectivity status of one or more network devices can indicate any of a number of network deficiencies. For example, network deficiencies that can be identified using the described methods include, but are not limited to, a network connection loss, network error, network congestion, a network breach, a network outage, a presence of malware, a network security risk, a power outage. In embodiments, a network deficiency can be full or partial; that is, the network deficiency can impact an entire network, such as all network devices on a LAN, or can impact only a portion of the network, such as one or more network devices on a LAN.

At 909, the status information is analyzed to identify a location of the network deficiency. Optionally, the status information is analyzed by identifying patterns the status information, by identifying a number of network devices having or lacking network connectivity or by comparing the status information with previously obtained status information. In embodiments, the location of a network deficiency is an identification of a device or network portion that is experiencing a network problem. Such analysis may indicate an event, such as a loss of wireless connectivity, loss of internet connectivity, a power outage, a network outage, an infection of a device with malware, etc. In embodiments, the location of a network deficiency is an identity of the network that is experiencing a network problem. For example, in one embodiment the location of a network deficiency is a single network device. In another embodiment, the location of a network deficiency is an internet service provider. In another embodiment, the location of a network deficiency is a portion of a LAN, such as the portion of a LAN that is accessed through an access point or range extender. In an exemplary embodiment, the location of a network deficiency includes an extent of the network deficiency, such as a number or identity of network devices experiencing problems. In embodiments, the extent of a network deficiency refers to a number of network devices impacted by the network deficiency or a number of remote networks impacted by the network deficiency.

At 913, instructions are generated for improving the network deficiency. Depending on the type of network deficiency, various solutions may be available for resolving or otherwise improving the network deficiency. For example, in the case of a malfunctioning network device, rebooting, resetting, cycling the power, updating a firmware or software or disabling the network device may resolve the issue. In the case of a network device losing connectivity with a network, such as a loss of wireless connectivity with a wireless network, rebooting, resetting, cycling the power or updating a firmware or software may resolve the issue. In certain embodiments, a network deficiency involving an infection of a device with malware may be resolved by rebooting, resetting, cycling the power, updating a firmware or software or disabling the network device.

At 917 a notification is transmitted, such as to provide a notification of the network deficiency, the location of the network deficiency and/or the instructions for improving the network deficiency. Such a notification is useful, for example, for informing a user of a network deficiency that may cause one or more network devices to operate in a non-optimal fashion. Such a notification may also be useful for providing a user with the instructions for resolving or improving the network deficiency, for example in the event the system is unable to automatically resolve or improve the network deficiency autonomously or without user intervention. In some embodiments, the notification is provided to a service provider and can be used by the service provider to troubleshoot or correct issues with the service provider's system or network. Optionally, receiving a notification including instructions results in a performance of the instructions by a device, such as by one or more network devices.

Figure 10:
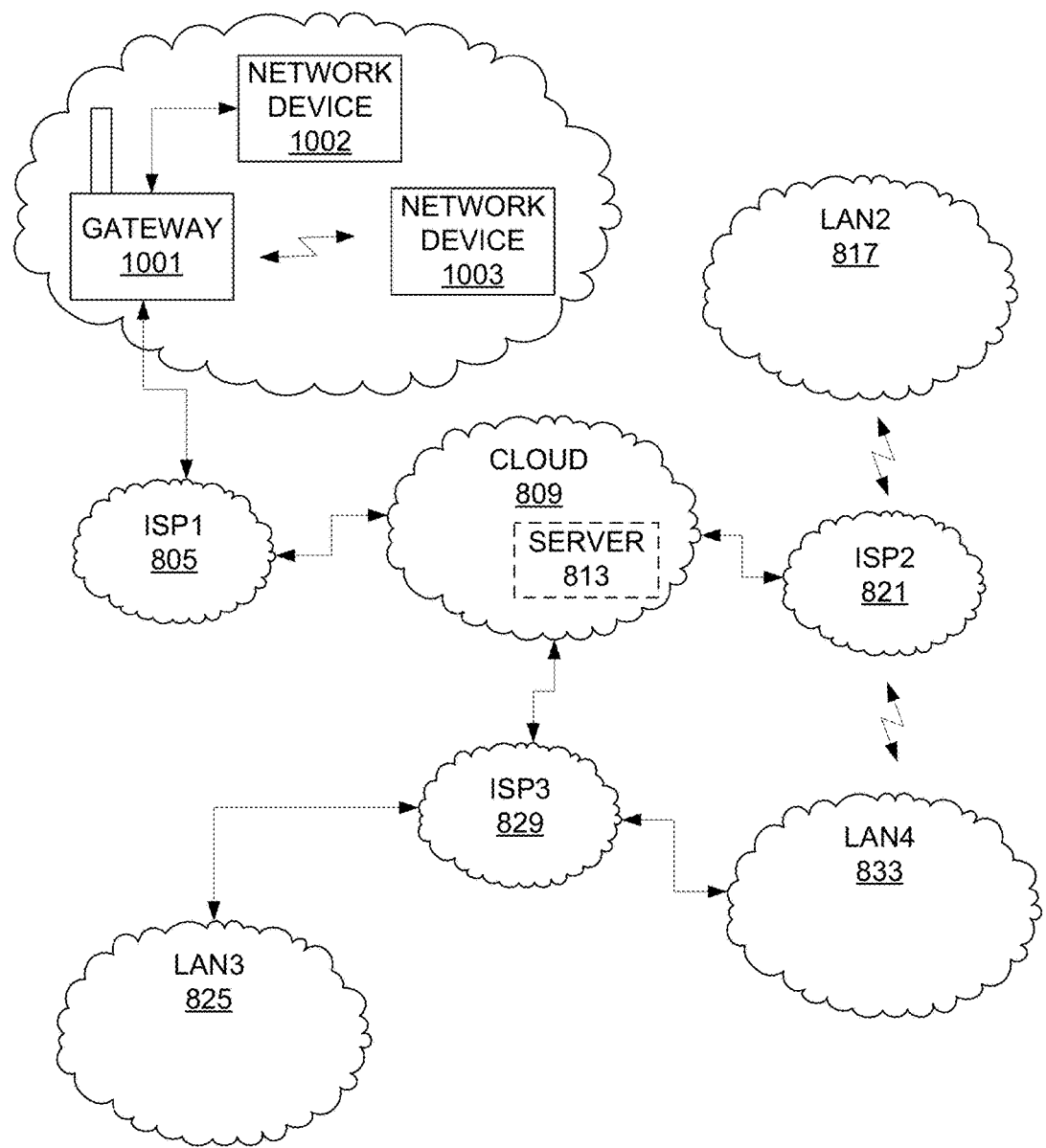
FIG. 10 is an illustration of an example of a wide area network environment, in accordance with some embodiments, showing detail of one local area network.

FIG. 10 provides an illustration of the network embodiment of FIG. 8, with an expanded view of LAN1 801. Here, LAN1 includes gateway 1001, network device 1002 and network device 1003. As illustrated, gateway 1001 provides for connectivity of the network devices 1002 and 1003 to ISP1 805. Additionally, network device 1002 connects to gateway 1001 over a wired connection, while network device 1003 connects wirelessly to gateway 1001. In this embodiment, server 813 receives network connectivity status information for gateway 1001, network device 1002 and network device 1003. Using this information, server 813 can determine the moment one or more of the gateway 1001 or network devices 1002 or 1003 lose connectivity to ISP1 805. Such information can, for example, be used to determine the location of a network deficiency. For example, if network device 1002 loses connectivity with server 813, the network deficiency may be located at network device 1002 itself, at gateway 1001 or in the wired link between network device 1002 and gateway 1001. Similarly, if network device 1003 loses connectivity with server 813, a network deficiency may be located at network device 1003 or at gateway 1001 or there may be interference or a weak wireless signal between network device 1003 and gateway 1001. If both network device 1002 and network device 1003 lose connectivity to server 813 but gateway 1001 still maintains connectivity with server 813, the most probable location for the network deficiency would be at gateway 1001, though it may be possible that both network device 1002 and 1003 are experiencing a malfunction or have lost power.

Figure 11:
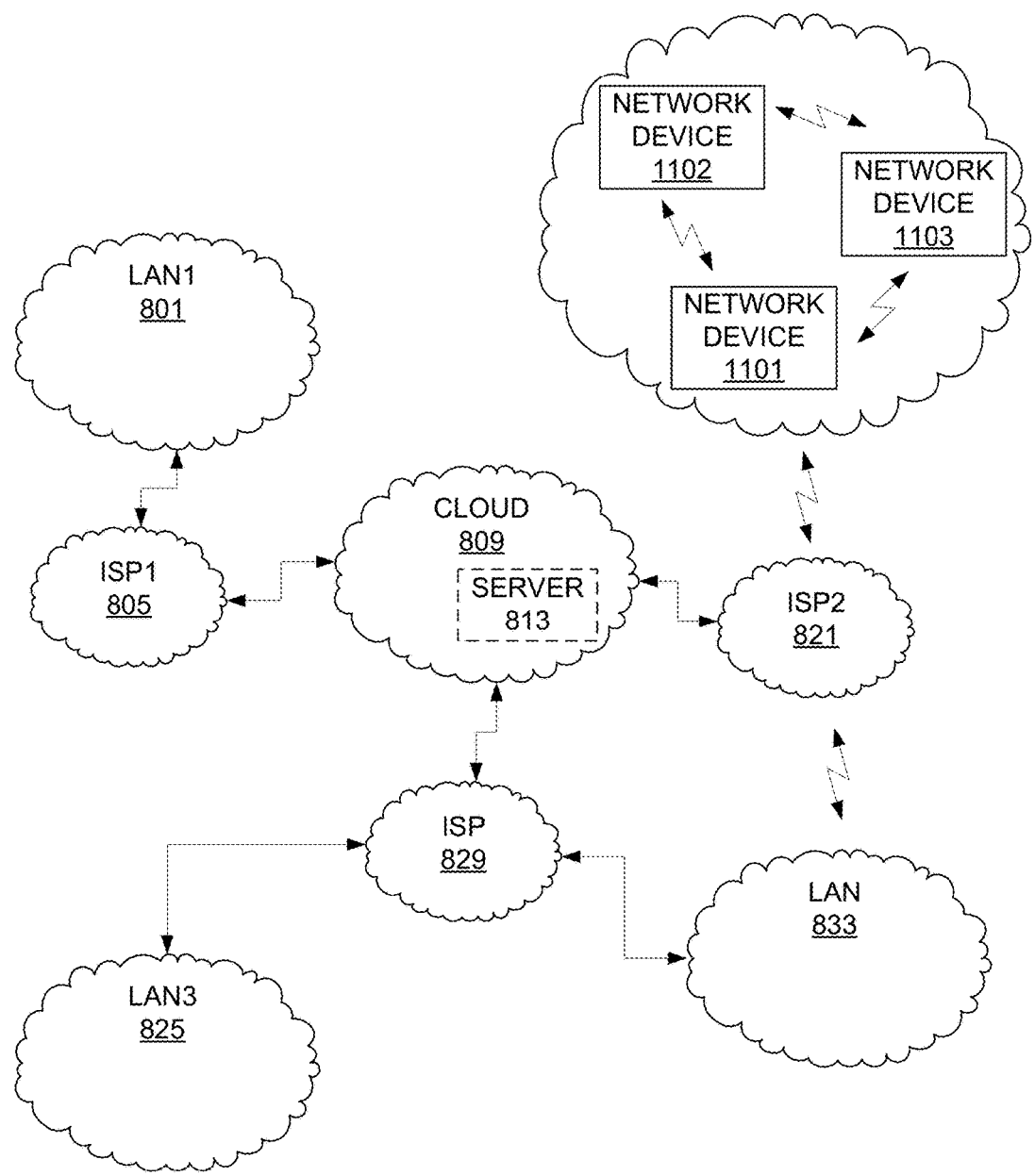
FIG. 11 is an illustration of an example of a wide area network environment, in accordance with some embodiments, showing detail of one local area network.

FIG. 11 provides an illustration of the network embodiment of FIG. 8, with an expanded view of LAN2 817. Here, LAN2 includes three network devices 1101, 1102 and 1103. Network devices 1101, 1102 and 1103 are shown in a wireless ad hoc or mesh network, where each network device is a node in the network. As illustrated, network device 1101 provides for connectivity of network devices 1102 and 1103 to ISP2 821. If network device 1101, for example, were to lose connectivity to ISP2 821 and if network devices 1102 and/or 1103 were properly configured and included appropriate hardware to do so, network devices 1102 and/or 1103 could fill the role of providing connectivity between the ad hoc network and ISP2 821. As another example, should the connectivity between network device 1102 and network device 1101 become lost, such as if the connection was weak or due to a malfunction at network device 1102 or network device 1101, network device 1103 could provide a communication pathway for the communications between network device 1102 and network device 1101, such as by playing the role of a network relay. In this embodiment, server 813 receives network connectivity status information for network devices 1101, 1102 and 1103. Using this information, server 813 can determine the moment one or more of network devices 1101, 1102 or 1103 lose connectivity to ISP2 821. Such information can, for example, be used to determine the location of a network deficiency.

Figure 12:
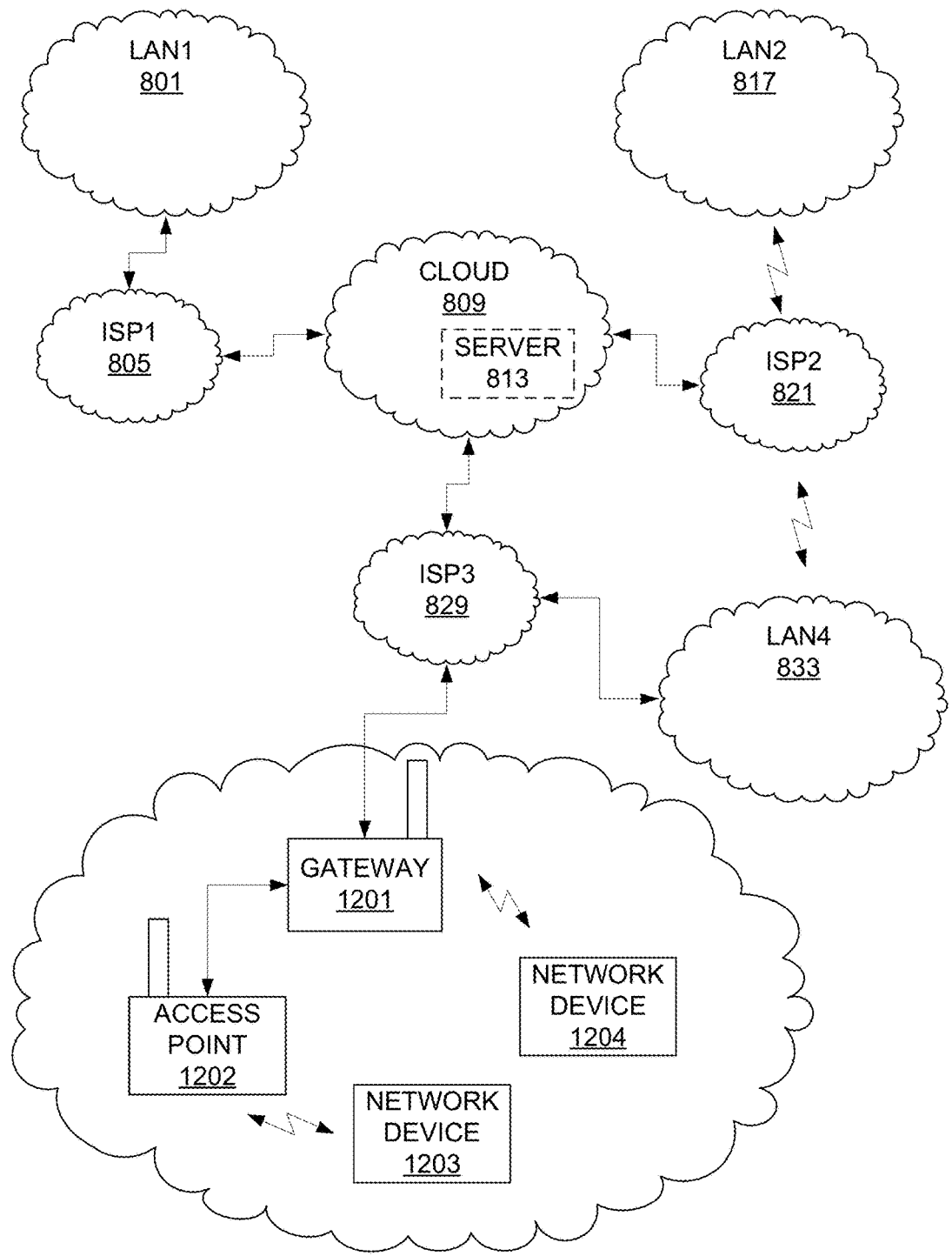
FIG. 12 is an illustration of an example of a wide area network environment, in accordance with some embodiments, showing detail of one local area network.

FIG. 12 provides an illustration of the network embodiment of FIG. 8, with an expanded view of LAN3 825. Here, LAN3 includes gateway 1201, access point 1202, network device 1203 and network device 1204. As illustrated, gateway 1201 provides for connectivity of all devices in LAN3 to ISP3 829. Additionally, the connection to LAN3 for network device 1203 is by way of access point 1202, while network device 1204 connects directly to gateway 1201. In this embodiment, server 813 receives network connectivity status information for one or more of gateway 1201, access point 1202, network device 1203 and network device 1204. Using this connectivity information, server 813 can determine a loss of connectivity of portions of or the entirety of LAN3. For example, should connectivity to only network device 1204 become lost, this may indicate a problem with network device 1204 or with the wireless transmitter of gateway 1201. Similarly, should connectivity to only network device 1203 become lost, this may indicate a problem with network device 1203 or with wireless access point 1202. In the event that it is determined that connectivity of both access point 1202 and network device 1203 is lost, this may indicate a problem with access point 1202. In exemplary embodiments, server 813 generates and transmits instructions to LAN3 to reset one or more network devices, such as upon determination of a network deficiency involving or impacting the network devices to be reset. Other instructions can be communicated, depending upon the type and extent of the network deficiency identified.

One feature to note, however, is that server 813 may not have information about the connectivity and orientation of devices within a local area network, and may only be able to probe for connectivity or loss of connectivity of one or more devices. Further, various network appliances, such as routers, gateways, firewalls, etc., may not be configured to communicate with server 813 and instead may play only their standard functional network role. Investigatory queries are optionally transmitted by the server to one or more network devices within a LAN in order to determine additional information about the devices, the network configuration and device orientation within the LAN. For example, server 813 may request information from one or more network devices regarding other devices on the network that they are aware of, such as which devices are detectable using one or more network discovery techniques. Additionally, for some embodiments, users may directly provide information about the devices and configuration of a LAN to server 813.

Viewed from the perspective of the LAN, however, the network devices may not have knowledge of or access to information about a system status of service providers that the devices make use of. For example, although the network communications of network devices 1203 and 1204 are transmitted through the network of ISP3 829, additional information about network deficiencies that impact such transmissions are not normally provided by ISP3 829 to network devices 1203 and 1204, such as network congestion, bandwidth limitations, partial outages, etc. In one embodiment, network devices 1203 and 1204 may only learn about a problem with aspects of ISP3 829 when connectivity to the cloud 809 is completely disrupted, for example, by determining that connectivity to cloud 809 is lost, that no problems exist within the LAN3 and that such service interruption is likely to originate from ISP3 829.

Nevertheless, network devices within a single LAN may be able to communicate with one another directly and discover and resolve or improve local network deficiencies within the LAN. A simple example of a network deficiency that can be identified within the LAN is a disconnection from a service provider, such as a cloud service provider like an internet service provider or an application service provider. Such a disconnection can be identified by an inability to communicate with the service provider over the normal network communications channels. For example, identifying a loss of overall internet connectivity is a straightforward way to identify a communications interruption between a network device and a service provider. Another example is identifying a loss of network connectivity to the local area network, as disconnection from a local area network may, if no failover connection is available, be the sole communication path for a network device to reach other devices, such as a service provider. In some embodiments, a failure of the service provider, such as an outage, may be the source of the disconnection.

Upon determination of a loss of service provider connectivity, network devices optionally communicate with one another to discover whether the connectivity loss is localized to a single device or whether the connectivity loss is more widespread. For example, a network device may transmit or receive a query for connectivity status information from one or more other network devices on the local area network, such as local network connectivity status information and service provider connectivity status information.

Determining this information may impact the methods that can be used to resolve the disconnection. For example, if service provider connectivity is lost at a single network device, that network device may probe itself to determine whether its connection to the local area network is operable or down, such as by determining whether its network transceiver is operable or whether the loss of connection originates outside of the device. If the connection to the local area network is determined to originate within the device, the device may undertake appropriate measures, such as rebooting, resetting, power cycling or updating itself, if possible, to attempt to reinitialize the connection to the local area network.

For some embodiments, one or more network devices connect to a local area network wirelessly. In situations where a wireless network device loses connectivity with a service provider, such as may occur by a lost connection with the local area network, the wireless device may attempt to establish an off-network communications channel with other wireless devices to determine if they, too, have lost connectivity with the service provider or local area network. In the event that the service provider connectivity loss is only at a subset of the devices on the local area network, the devices may establish or join a mesh or ad hoc network in order to continue transmissions to the service provider, with the devices that continue to have connectivity with the service provider playing the role of a network relay for devices that otherwise do not have connectivity with the service provider.

Such a situation may commonly occur in embodiments where a first wireless network device is far from or moved away from a wireless base station, such as a wireless gateway, range extender or access point, such that the signal strength is weak and a wireless link with the base station is lost. A second wireless network device, however, may still retain a strong connection with the wireless base station and be positioned at a physical location such that wireless transmission strength between the two wireless network devices is strong enough for the second wireless network device to establish or join an ad hoc or mesh network with the first wireless network device in order to relay local area network connectivity to the first wireless network device and reestablish connectivity with a service provider.

For some embodiments, the network devices may determine, for example by exchanging connectivity status information with one another, that the local network is operable but the network link to the service provider is disconnected at a local network gateway. In such a situation, a device may generate instructions that attempt to reconnect the network link to the service provider, such as by resetting, rebooting or power cycling the gateway or a modem that links the gateway to a network service provider, such as an internet modem providing connectivity to an internet service provider.

In another embodiment, the network devices may determine, for example, by exchanging connectivity status information with one another over off-network communications links, that the local network infrastructure is inoperable. For example, the devices may determine that an infrastructure WiFi network has disappeared. In this scenario, one or more devices may optionally generate instructions to reboot, reset or power cycle the network router, switch, hub, gateway or other device providing connectivity between devices on the local area network.

If configured appropriately using a network connected power switch, cycling the power on a malfunctioning device may be performed autonomously by a network device by sending a signal to the network connected power switch to cycle the power on the malfunctioning device. In this way, devices may attempt to self-heal network deficiencies and further investigate and analyze a network deficiency to determine whether user intervention is necessary.

In some embodiments, one or more devices may determine that a network deficiency cannot be self-healed, such as described above, and that user intervention may be required, such as to manually cycle the power or reset a malfunctioning network device or network link. In an exemplary embodiment, one or more devices will communicate with one another and attempt to self-heal a network deficiency before generating a notification to a user of the network deficiency. In some embodiments, a notification of the network deficiency is generated and transmitted, such as to an access device or to one or more other network devices. For embodiments where user intervention may be required, a notification optionally includes instructions for the user that identify a most likely or potential cause and/or instructions for how to troubleshoot or otherwise improve or resolve the network deficiency, such as by resetting or power cycling a device that is identified as a potential cause of the network deficiency.

Figure 13:
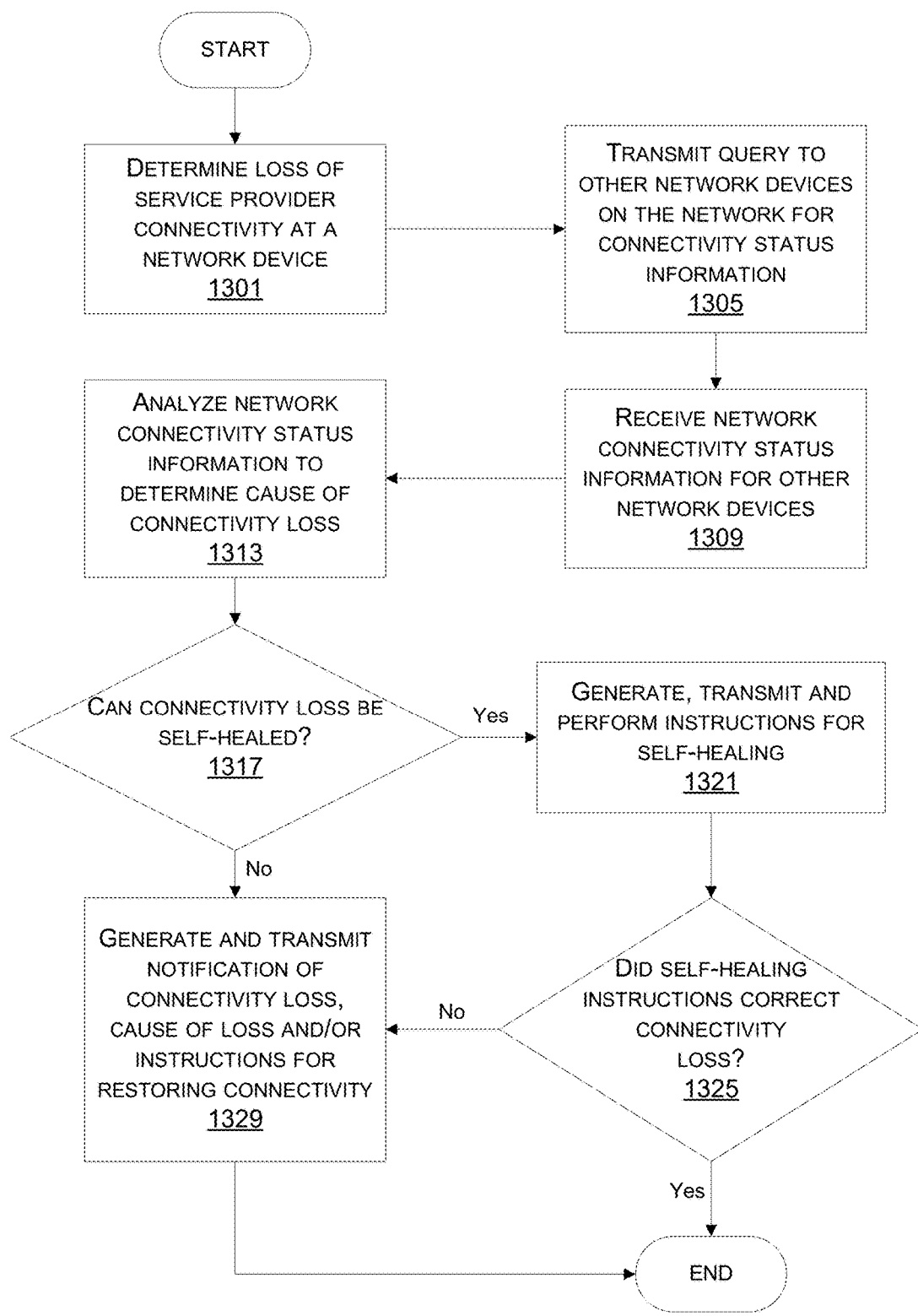
FIG. 13 provides a flowchart illustrating an embodiment of a process for identifying an internet connectivity loss and correcting the connectivity loss using a self-healing technique.

FIG. 13 provides an overview of an embodiment of a method for identifying and potentially improving network deficiencies on a local area network. Initially, at 1301, a loss of service provider connectivity is identified. Next, at 1305, a query is transmitted to other network devices on the network for network connectivity status information. At 1309, the network connectivity status information is received from the other network devices. Following this, at 1313, the network connectivity status is analyzed to determine the cause of the loss of connectivity with the service provider. At 1317, if the connectivity loss can be potentially self-healed then, at 1321, instructions are generated for self-healing and performed or transmitted such that upon receipt the instructions can be performed. At 1325, if the self-healing instructions did not correct the connectivity loss then additional steps are taken, at 1329, such as generating a notification of the connectivity loss with optional inclusion of the location, cause and instructions for restoring connectivity which can be transmitted for receipt at another network device, such as an access device which may display the notification.

Figure 14:
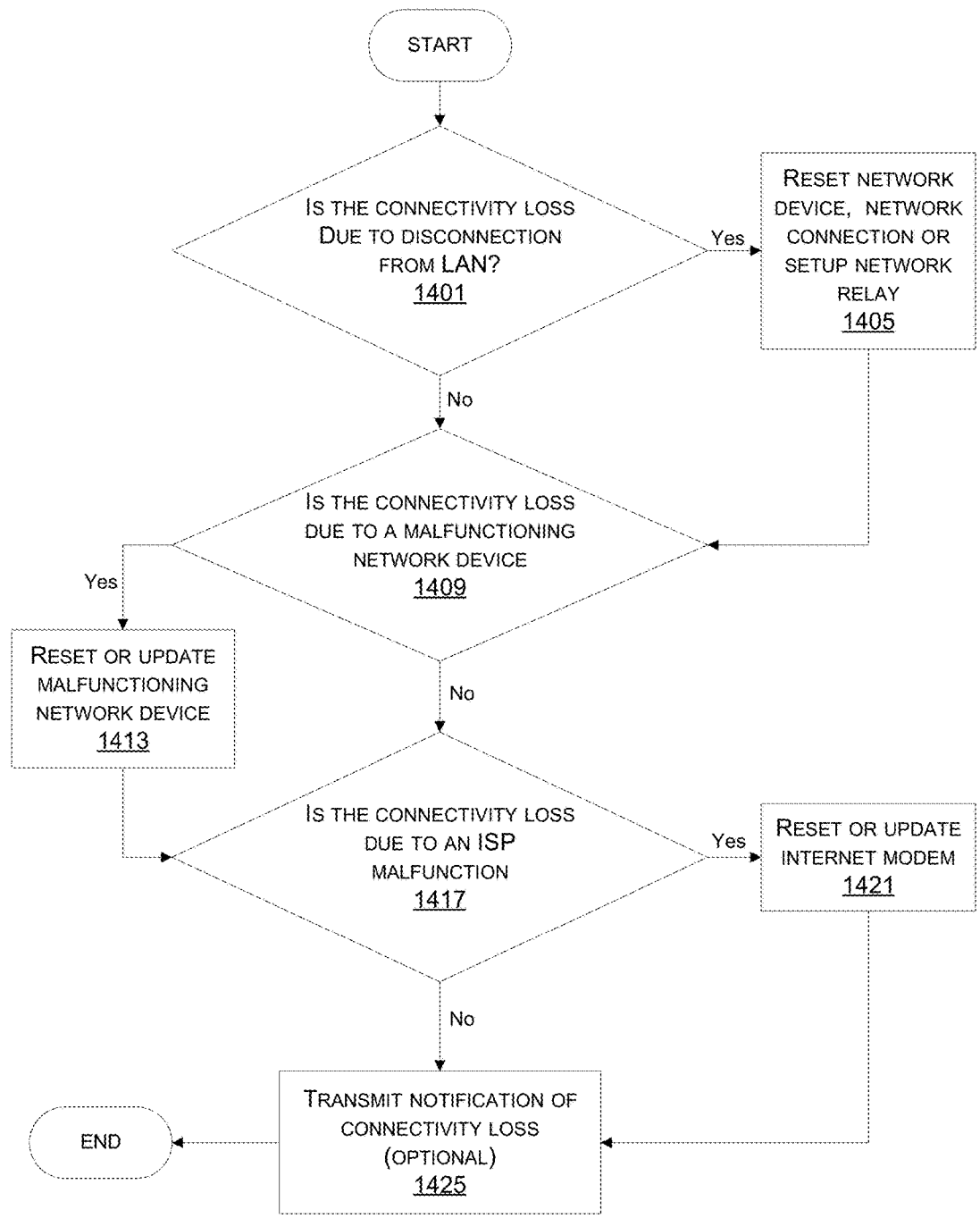
FIG. 14 provides a flowchart illustrating an embodiment of a process for correcting a connectivity loss using self-healing techniques.

FIG. 14 provides an overview of a method embodiment for troubleshooting a network deficiency from within a local area network, such as self-healing a network connectivity loss with a service provider. Initially, at 1401, it is determined whether the connectivity loss is due to disconnection from the local area network. If so, at 1405, the network device may be reset, the network connection may be reset or a network relay may be established to attempt to resolve the disconnection from the local area network. At 1409, it is determined whether the connectivity loss is due to a malfunctioning device, such as a malfunctioning wireless base station, router, switch, etc. If so, at 1413, the malfunctioning device is reset or updated in an attempt to restore connectivity to the service provider. At 1417, it is determined whether the connectivity loss is due to an internet service provider malfunction. If so, at 1421, an internet modem is reset, power cycled or updated. Optionally, at 1425, a notification of the connectivity loss is transmitted, if possible.

Figure 15:
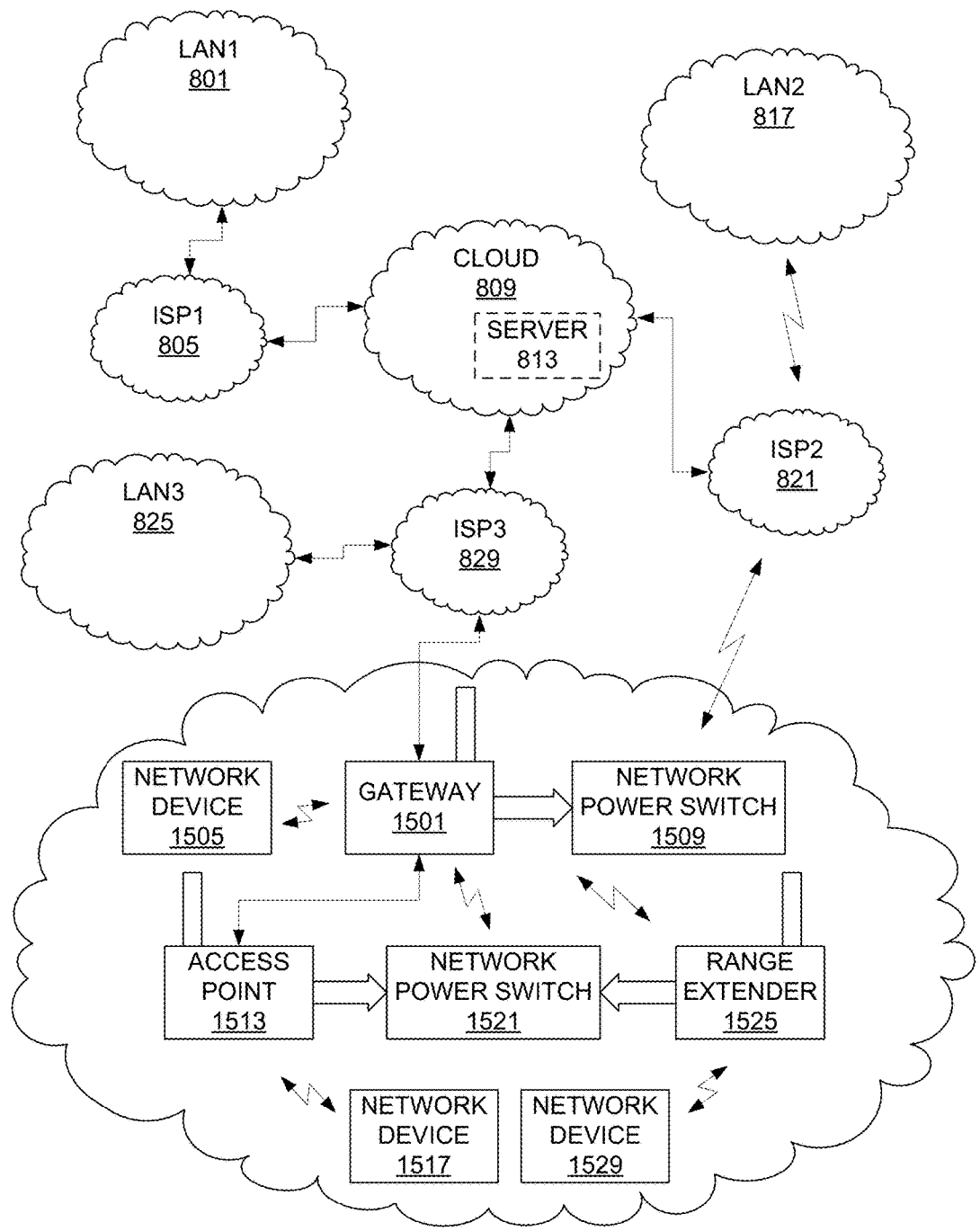
FIG. 15 is an illustration of an example of a wide area network environment, in accordance with some embodiments, showing detail of one local area network.

FIG. 15 provides an illustration of the network embodiment depicted in FIG. 8 with an expanded view of LAN4 833. Here, LAN4 includes gateway 1501, network device 1505, network power switch 1509, access point 1513, network device 1517, network power switch 1521, range extender 1525 and network device 1529. As illustrated network device 1505 connects wirelessly to gateway 1501 and access point 1513 connects to gateway 1501 over a wired connection. Gateway 1501 is powered by network power switch 1509, which provides the ability to cycle the power of network gateway 1501. Similarly, network power switch 1521 provides power to access point 1513 and range extender 1525 and so provides the ability to cycle the power of access point 1513 and range extender 1525. Network device 1517 connects wirelessly to access point 1513. Range extender connects wirelessly to gateway 1501 and provides wireless connectivity to the LAN to network device 1529. In addition, gateway 1501 is connected to cloud 809 by way of ISP3 829 and network power switch 1509 includes a wireless connection to ISP2 821 which provides connectivity to cloud 809.

The LAN4 configuration illustrated in FIG. 15 provides an exemplary LAN embodiment for diagnosing and autonomously self-healing problems on the LAN. In this embodiment, it is not critical that gateway 1501, access point 1513 and range extender 1525 have the ability to exchange messages with the other network devices, such as the ability to receive instructions to reboot, given that they are connected to network power switches 1509 and 1521. Thus, gateway 1501, access point 1513 and range extender 1525 can be power cycled via the network power switches.

As an example, if it is determined that any one or more of network devices 1505, 1517 or 1529 loses connectivity with server 813, these devices may first investigate themselves to ensure that their wireless transceiver is working properly. The devices may reset, reboot or power cycle themselves in an attempt to reestablish their connection to the LAN. If the wireless connection is working, they may determine whether their connection to the respective gateway, access point or range extender is not working. The devices may attempt to establish a wireless link for off-LAN4 communication with one or more other devices on the network, such as one another or network power switch 1521, in order to exchange information regarding the other devices connection to the LAN4 or server 813. If the wireless connections are working, they may exchange information with one another directly on the LAN4 to determine which, if any, other devices have lost the connection to server 813.

If only a subset, but not all, of the devices have lost connection to the server 813, this may indicate that the links between gateway 1501 and ISP3 829 and between ISP3 829 and cloud 809 are functioning correctly and that a network deficiency may exist within the LAN4. For example, if only network device 1517 has lost connection with server 813, this may indicate a problem at access point 1513, and network power switch 1521 can be used to cycle the power of access point 1513 in an attempt to resolve the problem. Similarly, if only network device 1529 has lost connection with server 813, this may indicate a problem at range extender 1525, and network power switch 1521 can be used to cycle the power of range extender 1525 in an attempt to resolve the problem. If both network device 1517 and network device 1529 have lost connection with server 813, but not network device 1505, this may indicate a problem at access point 1513, range extender 1525 or gateway 1501; network power switch 1521 can be used to cycle the power of access point 1513 and range extender 1525 and network power switch 1509 can be used to cycle the power of gateway 1501 in an attempt to resolve the problem. If both network device 1505 and network device 1529 have lost connection with server 813, but not network device 1517, this may indicate a problem with the wireless transceiver of gateway 1501; network power switch 1509 can be used to cycle the power of gateway 1501 in an attempt to resolve the problem. In exemplary embodiments, these steps are performed autonomously and achieve an improvement in the performance of LAN4 by resolving the disconnection with server 813.

In the configuration shown, network power switch 1509 connects directly to ISP2 821, providing the ability to cycle the power on gateway 1501, from any other network connected to cloud 809 regardless of any deficiency in LAN4, such as a malfunction at gateway 1501, or any deficiency at ISP3 829.

For embodiments where a gateway, access point or range extender are configured to exchange connection status information and/or receive and execute instructions, additional flexibility in the method can be achieved, as it can be more readily determined whether all or a portion of a LAN has lost network connectivity, such as with a cloud server or an ISP.

Figure 16:
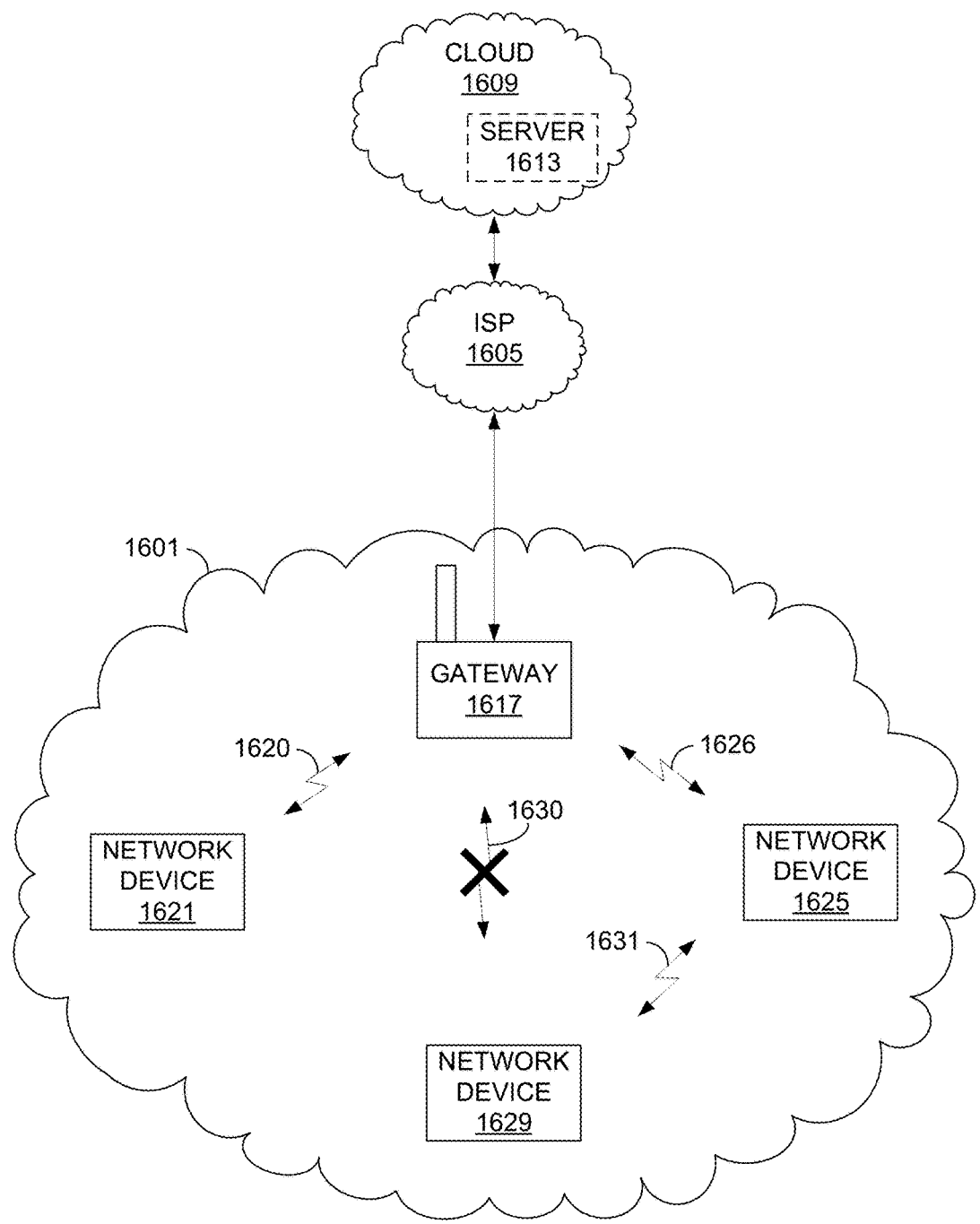
FIG. 16 is an illustration of an example of a network environment, in accordance with some embodiments.

FIG. 16 provides an illustration of a network environment including a local area network (LAN) 1601, which connects to a service provider (ISP) 1605 that provides connectivity to cloud 1609. As illustrated, server 1613 is connectable via cloud 1609. In LAN 1601, gateway 1617 provides connectivity to ISP 1605. Gateway 1617 also provides wireless connection 1622 to network device 1621, wireless connection 1626 to network device 1625 and wireless connection 1630 to network device 1629.

In one embodiment, the wireless link 1630 between gateway 1617 and network device 1629 may become lost, such as, for example, if network device 1629 is moved out of wireless range of gateway 1617 or if an object that causes interference or otherwise reduces the wireless signal strength is placed between network device 1629 and gateway 1617. In the event the wireless link 1630 becomes lost, the network device 1629 may lose connectivity with the server 1613. Upon determining that connectivity with the gateway 1617 is lost, the network device 1629 can attempt to determine whether its network transceiver is malfunctioning, and can attempt to self-heal the malfunction. The network device 1629 can attempt to self-heal by resetting or power cycling itself.

Alternatively or additionally, network device 1629 may attempt to establish off-LAN connections to other devices in LAN 1601, such as network device 1621 or network device 1625, to determine whether they too have lost their wireless connections with gateway 1617. If so, it may be that gateway 1617 has a problem and may need to be reset or power cycled. If, for example, network device 1629 establishes an ad hoc wireless link 1631 with network device 1625, network device 1629 may determine that network device 1625 has a connection with server 1613. In this case, network device 1629 may transmit its communications to server 1613 over wireless link 1631 to network device 1625 for relaying to server 1613.

Figure 17:
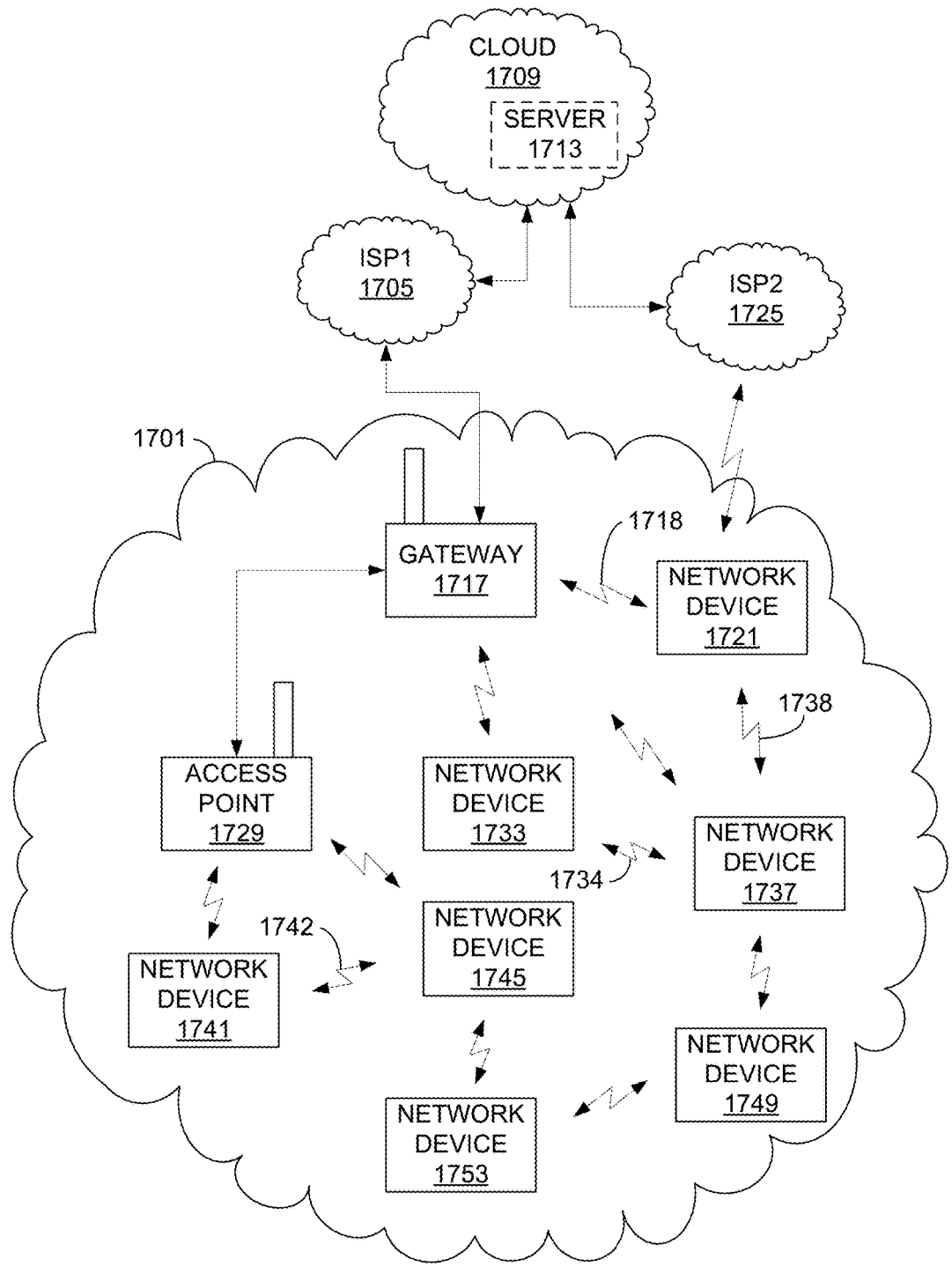
FIG. 17 is an illustration of an example of a network environment, in accordance with some embodiments.

FIG. 17 provides an illustration of a network environment including a local area network (LAN) 1701, which connects to a service provider (ISP1) 1705 that provides connectivity to cloud 1709. As illustrated, server 1713 is connectable via cloud 1709. In LAN 1701, gateway 1717 provides connectivity to ISP1 1705. Gateway 1717 also provides a wireless connection to network device 1721. Network device 1721 features a second connection to ISP2 1725, which provides connectivity to cloud 1709. Gateway 1717 provides wired connectivity to access point 1729, wireless connectivity to network devices 1733 and 1737 and wireless connectivity to network device 1721 over wireless connection 1718. Access point 1729 provides wireless connectivity to network device 1741 and network device 1745. In the embodiment shown, network device 1749 does not connect direct to gateway 1717 or access point 1729, but instead connects, such as over an ad hoc or mesh wireless connection, to network device 1737 in order to access LAN 1701. Similarly, network device 1753 does not connect direct to gateway 1717 or access point 1729, but instead connects, such as over an ad hoc or mesh wireless connection, to network device 1749 and to network device 1745 to access LAN 1701.

In the event of a failure of ISP1, it may be possible for the all communications to server 1713 to be relayed through the connection to ISP2 1725 of network device 1721 by way of wireless connection 1718 and maintain the operation of the network devices within LAN1 1701.

In the event of a total failure of gateway 1717, such as due to a power loss or malfunction of gateway 1717, it may be possible for the network devices to establish a larger overall mesh or ad hoc wireless network in order to relay all communications to server 1713 through the connection to ISP2 1725 of network device 1721 and maintain the operation of the network devices within LAN1 1701. For example, a wireless connection 1738 may be established between network device 1721 and network device 1737 and a wireless connection 1734 may be established between network device 1733 and network device 1737. Similarly, if both gateway 1717 and access point 1729 malfunction or lose power, access for network device 1741 to cloud 1709 can persist by establishing a wireless connection 1742 between network device 1741 and network device 1745.

Similarly, in the event of a failure of the wireless transceiver of gateway 1717 or access point 1729, but not both, the devices may reconfigure and establish a mesh or ad hoc wireless network in a manner sufficient to continue passing communications to server 1713 through ISP1 1705.

Figure 18:
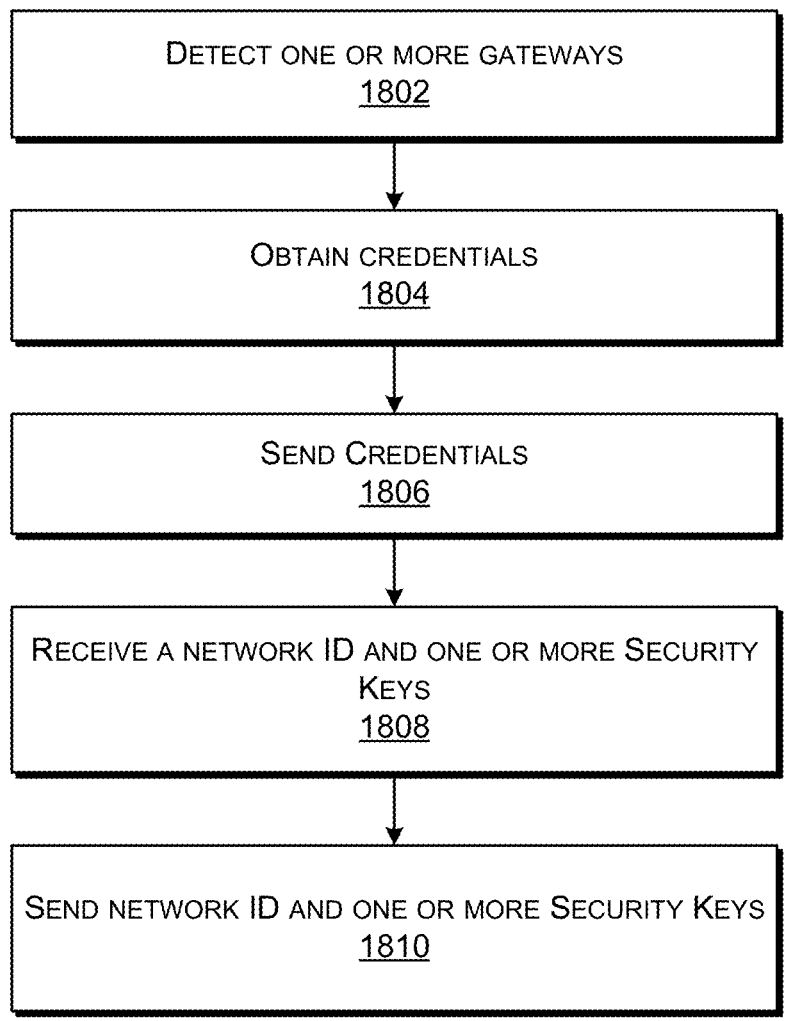
FIG. 18 is a flowchart illustrating an embodiment of a process for registering one or more network devices, in accordance with some embodiments.

As noted above in the description of FIG. 1, network devices, upon being powered on or reset, may be registered with a network (e.g., a network or other external network) and associated with a logical network within a local area network. FIG. 18 illustrates an example of a process 1800 for registering one or more devices, such as the network devices illustrated in any of FIG. 1-FIG. 4, FIG. 8, FIG. 10-FIG. 12, and FIG. 15-FIG. 17. When multiple network devices and gateways are included within a local area network, the network devices and/or gateways may be installed at different times, resulting in the techniques described with respect to FIG. 18 possibly occurring for each network device and/or gateway at different points in time. For example, referring to FIG. 1, a user may install network device 102 at a first point in time on a first floor of the user's house. Gateway 110 may also be located on the first floor, resulting in the network device 102 pairing with gateway 110. The user may later install gateway 112 and network device 106 on a second floor of the user's home, resulting in the network device 106 pairing with gateway 112.

At 1802, a network device may detect one or more gateways upon being powered on or reset. In some embodiments, a provisioning process may occur when the network device is powered on or reset and detected by an access device (e.g., access device 108 or other access devices discussed herein or shown in the figures). During the provisioning process, the access device may directly communicate with the network device. In some embodiments, direct communication between network devices and an access device may occur using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like.

The provisioning process may include pairing the network device with a gateway and registering the gateway, network device, and access device with a server, such as a server located within the network 114. For example, upon being powered on or reset to factory settings, the network device may send or broadcast identification information to one or more access devices. The identification information may be sent during a discovery process. For example, the identification information may be sent in response to a discovery request from an access device. In some cases, the identification information may include a name of the network device.

An application, program, or the like that is installed on and executed by the access device may receive the identification information from the network device. When the application on the access device is launched by a user, the access device may display the identification information for selection by the user. Once the network device identification information is selected, the access device may send a signal to the network device indicating that it has been selected. The network device may then send to the access device a list of gateways that are detected by the network device. The access device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The access device may then prompt the user to enter login information that is required for accessing the network signals provided by the selected gateway. For example, the login information may be the same information that was originally set up to access the gateway network signals (e.g., when the gateway was initially installed). Once entered, the access device may send the login information to the network device. The network device may use the login information to pair with the selected gateway. As one example, network device 102 and network device 104 may be paired with gateway 110, and network device 106 may be paired with gateway 112.

Once paired with a gateway, the network device may be registered with an external network (e.g., network 114, networks 214, 216, network 809, or any other external network discussed herein or shown in the figures). For example, the access device (e.g., via the application, program, or the like) may instruct the network device to register with the network upon receiving confirmation from the network device that it has been successfully paired with a gateway. At 1804, the network device may obtain credentials from the gateway as part of the registration process. For example, network device 102 may obtain credentials from gateway 110. At a same or later point in time, network devices 104 and 106 may obtain credentials from gateways 110 and 112, respectively. In some embodiments, the credentials may include a SSID of the local area network and a MAC address of the gateway. An SSID received from two gateways (e.g., gateways 110, 112) may be the same due to the gateways both being within the same local area network. In some cases, the SSID of the two gateways may be different. The MAC address of each of the gateways may be unique to each gateway. As a result of each gateway having a unique MAC address, the credentials obtained from a gateway may be unique to that particular gateway. One of ordinary skill in the art will appreciate that other credentials may be obtained from a gateway, such as an Internet Protocol address, or the like.

The network device may then send the gateway credentials to the network at 1806. For example, the network devices 102, 104, 106 may send credentials for the gateway with which each is paired to the server located within the network 114. For example, network device 102 may transmit the credentials obtained from gateway 110 to the server, and network device 106 may transmit the credentials obtained from gateway 112 to the server. In some embodiments, the network device may also send information relating to the network device (e.g., MAC address, serial number, make, model number, firmware version, and/or an interface module identifier, or the like) to the server, and/or information relating to the access device (e.g., MAC address, serial number, application unique identifier, or the like) to the server. In some embodiments, the communication of the credentials, the network device information, and/or the access device information sent from the network device to the network server may be in a Hypertext Transfer Protocol (HTTP) format, a Hypertext Transfer Protocol Secure (HTTPS) format, a secure Transmission Control Protocol (TCP) format, or the like. One of ordinary skill in the art will appreciate that other communication formats may be used to communicate between the network device and the network server.

Once the credentials, network device information, and/or access device information are received by the server, the server may register each gateway as a logical network within the local area network and may generate a network ID for each logical network. For example, the server may register the gateway 110 as a first logical network. During the registration process, the server may generate a first network ID for identifying the first logical network. As noted above, one of ordinary skill in the art will appreciate that any number of gateways may be present within the local area network, and thus that any number of logical networks may be registered for the local area network. The server may further generate a first set of security keys for authenticating the network device and the access device. For example, the server may generate a unique key for the network device 102 and a separate unique key for the access device 108.

In some embodiments, as previously described, network device 104 may also be paired with gateway 110 at the same or a later point in time as the network device 102. During registration of the network device 104, the server may determine that the access device 108 has already been registered with another network device (e.g., network device 102) that is associated with the same logical network of gateway 110. In such embodiments, the server may retrieve the first network ID that was used in registering the first logical network. The server may also generate a new unique security key for the network device 104, and may retrieve the unique key that was previously generated for the access device 108 when registering the gateway 110 as the first logical network.

The gateway 112 may also be registered by the server as a second logical network with a second network ID. A second set of security keys may be generated for the network device 106 and the access device 108. For example, the server may generate a unique security key for the network device 106 and a unique security key for the access device 108 as it relates to the second logical network. In some embodiments, the gateway may 112 be installed at a later point in time after the gateway 110 is installed, and thus may be registered as the second logical network at the later point in time.

A record or profile may then be created for associating each network ID with the credentials of a corresponding gateway, the corresponding network device(s), and the access device. For example, the server of the network 114 may associate the first network ID with the credentials of gateway 110. Similarly, the server may associate the second network ID with the credentials of gateway 112. In some embodiments, the server performs the association by generating and storing a record including the network ID, the set of security keys, the gateway credentials, the network devices associated with the network ID (e.g., MAC address or serial number of a network device), the access devices associated with the network ID (e.g., MAC address, serial number, application unique identifier, or the like), and/or any other information relevant to the network devices and/or gateways. Other relevant information may include location information corresponding to a location of any of the devices. In one example, the server may store the first network ID and the first set of security keys in a first record at a first memory space (e.g., in Flash, DRAM, a database, or the like) along with the SSID and MAC address for gateway 110 and an identifier of the network devices 102 and/or 104. The server may also store the second network ID and the second set of security keys in a second record at a second memory space along with the SSID and MAC address for gateway 112 and an identifier of the network device 106. In some embodiments, an example of a network device identifier may include a MAC address of the network device, a serial number of the network device, a universally unique identifier (UUID), a globally unique identifier (GUID), a unique device identifier (UDID), or any other unique identifier.

Each of the first and second network IDs may include a unique number or alphanumeric string generated sequentially or randomly. For example, the first time a network device and an associated gateway are registered on the network 114, the unique network ID for the logical network of the gateway may start with 7000000. Each subsequent logical network that is created may be a sequential increment of the initial network ID (e.g., 7000001, 7000002, 7000003, etc.). As another example, the network ID may be generated by a random or pseudo-random number generator. One of ordinary skill in the art will appreciate that other techniques for generating a unique ID may be used. The technique used to generate the network IDs may be dependent on a type of database that is included in the network 114. For example, different databases may have different proprietary mechanisms for creating a unique identifier.

The set of keys generated for each logical network may be generated using database specific technique. For example, a MySQL technique may be used to generate the sets of keys. Each key may include a universally unique identifier (UUID), a globally unique identifier (GUID), a unique device identifier (UDID), or other suitable unique identifier that may include letters and/or numbers. As described above, for each logical network, the server may generate a unique key for a network device and a separate unique key for an access device.

At 1808, the network device may receive the network ID and the set of security keys. For example, once the server has generated a record or profile associating the network device 102 with the first logical network, the server may transmit the first network ID and the first set of security keys to the network device 102. The network device 102 may store the first network ID and one or more keys of the first set of keys. For example, the network device 102 may store the unique security key that was created by the server for the network device 102.

As noted previously, the network devices 102, 104, 106 and gateways 110, 112 may be installed at different times. For example, in some embodiments, network device 104 may be installed at a point in time after the first logical network is created based on the pairing between gateway 110 and network device 102. In such embodiments, upon being powered on, the network device 104 may pair with gateway 110, obtain credentials from gateway 110, and transmit the credentials to the server in the network 114 using similar techniques as those described above. The server may associate the network device 104 with the previously generated first network ID. As described above, the server may also generate a new unique security key for the network device 104, and may retrieve the unique key that was previously generated for the access device 108 when registering the first logical network. The network device 104 may then receive and store the first network ID and the security keys from the server.

At 1810, the network device may send the network ID and the set of security keys to the access device. For example, the network device 102 may send to the access device 108 the first network ID and the unique security key generated for the access device 108. The network device 102 and the access device 108 may then communicate with the network server using the first network ID and each device's unique key. In some embodiments, the network device and the access device may generate a signature using their respective security key. The signature is sent to the network server along with a communication from the network device or access device. The network server may process the signature in order to authenticate each device, as described below. The network device and access device may use different techniques to generate a signature.

A network device may generate a signature using its uniquely generated security key. For example, the signature may be expressed as: Authorization=MacAddress":"Signature":"ExpirationTime. The Authorization term may be an attribute, and the MacAddress, Signature, and ExpirationTime terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed as: Signature=Base64(HMAC-SHA1(PrivateKey, StringToSign)). The Signature value may include an alphanumeric or numeric string. HMAC-SHA1 is an open source technique that includes a Hash-based Message Authentication Code (HMAC) using a SHA1 hash function. The HMAC-SHA1 technique uses the values PrivateKey and StringToSign as inputs. The PrivateKey input includes the unique security key that was generated by the server for the network device. The StringToSign input may be expressed as StringToSign=MacAddress+"\n"+SerialNumber+"\n"+ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as ExpirationTime=Number of seconds since Jan. 1, 1970.

The network device may place the signature in a data packet for transmission with a communication signal to the network server. The network device may also place the network ID in the data packet. The signature and the network ID, if included, may be used by the network server to verify that the network device is associated with the logical network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication.

An access device may also generate a signature using its uniquely generated security key. For example, the access device signature may be expressed as: Authorization=SDU UniqueId":"Signature":"ExpirationTime. The Authorization term may be an attribute, and the SDU UniqueId, Signature, and ExpirationTime terms may include values for the Authorization attribute. The SDU UniqueId term may include a unique phone identifier. The SDU UniqueId value may depend on the type of access device that is used and the type of values that may be accessed and/or generated by the type of access device. In some cases, one type of access device may not allow an application to access a unique identifier of the access device (e.g., a serial number, UUID, or the like). In such cases, the SDU UniqueId value may include a value generated by an application or program installed on and executed on the access device that is used to access the network device. The value may be unique to the application or program that generated the value. In other cases, another type of access device may allow an application to access a unique identifier of the access device. In such cases, the SDU UniqueId value may include a value that is unique to the access device itself, such as a serial number, UUID, or the like. In this example, the access device may retrieve the unique value from storage within the access device. One of ordinary skill in the art will appreciate that other unique identifiers may be used to uniquely identify the access device. The Signature value may be expressed as: Signature=Base64(HMAC-SHA1(PrivateKey, StringToSign)). Using this expression, the input to the HMAC-SHA1 technique may include a PrivateKey term and a StringToSign term. The PrivateKey input includes the unique security key that was generated by the server for the access device with regard to a particular logical network. The StringToSign input may be expressed as StringToSign=UniqueId+"\n"+"\n"+Expiration Time. The StringToSign value is different from the StringToSign value generated by network device in that no serial number is included. Accordingly, the StringToSign input is generated by appending an expiration time to the access device's unique identifier. The ExpirationTime term may indicate the period of time for which the signature is valid, similar to that above for the signature generated by the network device.

The access device may place the signature in a data packet and may transmit the data packet to the network server with a communication signal. The network device may also place the network ID in the data packet. The signature and the network ID, if included, may be used by the network server to verify that the access device is associated with the logical network and authorized to communicate with one or more network devices associated with the logical network. In some embodiments, a signature is provided with each communication sent from the access device to the server. The cloud server may receive the signature and may generate a signature using the same expression as that used by the access device. For example, the server may retrieve the access device's key and other relevant information from storage and generate the signature using the key and the other information using the expression described above. The server then verifies whether the signatures match. Upon determining that the signatures match, the server authenticates the access device and allows it to communicate with one or more of the network devices associated with logical network.

Once the provisioning process is completed, the access device may access the network devices locally via a gateway (e.g., the gateway 110 using the communication signal 118) or remotely via the network (e.g., the network 114 using the communication signal 120). In some embodiments, the communication between the access device 108 and the network 114 may be a HTTP or HTTPS communication. One of ordinary skill in the art will appreciate that other communication mechanisms may be used to communicate between the access device 108 and the network 114.

In some embodiments, a user may create an account with login information that is used to authenticate the user and allow access to the network devices. For example, once an account is created, a user may enter the login information in order to access a network device in a logical network.

In some embodiments, an accountless authentication process may be performed so that the user can access one or more network devices within a logical network without having to enter network device login credentials each time access is requested. While located locally within the local area network, an access device may be authenticated based on the access device's authentication with the logical network. For example, if the access device has authorized access to the logical network (e.g., a WiFi network provided by a gateway), the network devices paired with that logical network may allow the access device to connect to them without requiring a login. Accordingly, only users of access devices that have authorization to access the logical network are authorized to access network devices within the logical network, and these users are authorized without having to provide login credentials for the network devices.

An accountless authentication process may also be performed when the user is remote so that the user can access network devices within the logical network, using an access device, without having to enter network device login credentials. While remote, the access device may access the network devices in the local area network using an external network, such as a network, the Internet, or the like. One or more gateways may provide the network devices and/or access device connected to the local area network with access to the external network. To allow accountless authentication, a network server may provide a network ID and/or one or more keys to a network device and/or to the access device (e.g., running an application, program, or the like), as described above with respect to FIG. 8. For example, as described above, a unique key may be generated for the network device and a separate unique key may be generated for the access device. The keys may be specifically encrypted with unique information identifiable only to the network device and the access device. The network device and the access device may be authenticated using the network ID and/or each device's corresponding key each time the network device or access device attempts to access the network server.

A local area network (e.g., the network 100) may enable a user to monitor and/or control operation of the devices within the network (e.g., devices 102 and 104). For example, a user may monitor and/or control operation of devices by interacting with a visual interface of the gateway 110 (i.e., a web page for gateway 110) and/or a visual interface rendered on a display of an access device, such as access device 108. In some embodiments, an application may be run on the access device. The application may cause the access device to present a graphical interface that includes a visual interface for each device accessible on the network 100.

A network device may generate and/or provide a "status" of the network device. In certain embodiments, the status or state of a network device can be indicated on a visual interface on the access device, for example within the tile with text and/or graphically. The status of the network device can change based on time (e.g., a period, an interval, or other time schedule). The status of a network device may be any piece of information pertinent to that particular network device. The status of a network device may be any changeable variable of that particular network device. For example, the status of a network device may include a state of the-network device itself (e.g., on or off) or how the network device is situated within the network with respect to the other network and other network devices throughout the network. For example, the status of a network device may refer to the network device's proximity to another network device and/or its ability to communicate with another network device because of the relative signal strength between the two network devices. In certain embodiments, the status can include a value or some other information indicating a unit of measure for a setting or an attribute related to operation of a device connected to the network device. The setting or the attribute can be adjustable within a range of values. For example, the device connected to the network device can be a light bulb and the status can include a value corresponding to brightness (e.g., a percentage of total brightness) emitted by the light bulb when the light bulb is powered-on. In another example, the device can be a motion sensor and the status can include a value corresponding to sensitivity of the sensor in a range of values between 0 to 100 when the sensor is powered on. In yet another example, the device can be a fan and the status can include a value corresponding to a speed of the fan on a scale of 0 to 100 when the fan is powered-on.

As described above, upon being powered on or reset, the network devices 102 and/or 104 may be registered with the network 114 and associated with a logical network within the local area network 100. Similarly, upon being powered or switched off or otherwise being disconnected from the network 100, the status of the-network device 102 would be known and stored by a cache (not shown) associated with the network 100. For example, network 114 may include storage (e.g. cache) that stores the status of the network devices within each local area network 100 it is connected to and/or provides access to. In another example, the gateway 110 may include storage that stores the status of the network devices within each local area network it is connected to and/or provides access to. More specifically, the status stored in the cache may include a status table which indicates the current status of each network device (as of its last communication with each network device). A status table may include all statuses of each network device, or individual storage tables for each local area network or other subset of its network devices/networks. In one embodiment, a change in status may prompt the-network device to push its change in in status to the network 114 for storage or updating of the cloud's stored status table. In another embodiment, network 114 and/or gateway 110 may continuously (or periodically) communicate with each-network device to check to see if its status has changed.

In some embodiments, a network device (e.g. network device 102 and/or 104) may, upon connecting to the local area network 100, check the status of the-network devices on the network 100. In other embodiments, one-network device may check the status of one or more of the other network devices on the network 100. The network device may seek to check the status of another network device or access device for various reasons, including to display such status(es) to a user on a display or otherwise, to check whether that network device belongs to the same network, to synchronize or coordinate any scheduled executions, to update an attribute based on adjustment received among others. For example, a network device or user may desire to check various statuses on a connected device, such as power level, timestamped activity history (e.g. temperature for a thermostat, motion for a motion detector, etc.), how long it has been active/turned on, attributes for operation of the connected device (e.g., a brightness of a lamp, a speed of a fan, or a sensitivity of a sensor, etc.), among many others.

In some embodiments, a device, such as the access device 108 shown in FIG. 1 or the gateway 110, connected to the network 100 can communicate an updated status of a network device, such as the network devices 102 and/or 104. The updated status can be communicated via the network 100 and can include an adjustment that affects a status of the network device. The adjustment can include an amount of change to one or more attributes, one or more settings, or a combination thereof related to operation of the network device connected to the network 100. The access device 108 or the gateway 110 can present a graphical interface that can receive input corresponding to an adjustment to a status of a device. In some embodiments, the updated status of the network device communicated to the network 100 can be received by a network device to which the updated status applies, or can be received by the gateway 110, the network 110, or any other device in communication with the network. If the device cannot directly receive the updated status, it can also receive the updated status from the network 114, the gateway 110, or the other devices in the network 100. In some embodiments, the network device can communicate its updated status to the network 100, which can indicate whether the status has been updated. The updated status can be received by the access device or any other device in the network 100. In some embodiments where the access device is not located within the network 100, the access device may not immediately receive the updated status. The updated status can be stored by the network 114 or the gateway 110 for communication to the access device. The status of the network device can indicate whether an adjustment was made based on an adjustment in a setting or an attribute transmitted by the access device. Alternatively, or additionally, the access device can receive, from any other network device connected to the network 100, a status update indicating whether the adjustment was in fact made at a network device.

A network device seeking to check the status of any other device on the network 100 may communicate with the network 114, to which all devices on the network 100 are connected either directly or indirectly. Since the network 114 and/or the gateway 110 can store an updated table/list of the statuses of each of the network devices 102 and 104 within the requesting network's local area network, the network 114 and/or gateway 110 may communicate such status data to the network devices 102 and 104 and the access device. For example, if network devices 102 and 104 were to each turn on and communicate their statuses to network 114, network 114 may analyze the status of network devices 102 and 104 and communicate to-network devices 102 and 104 that they are each connected to the same local area network 100.

Figure 19:
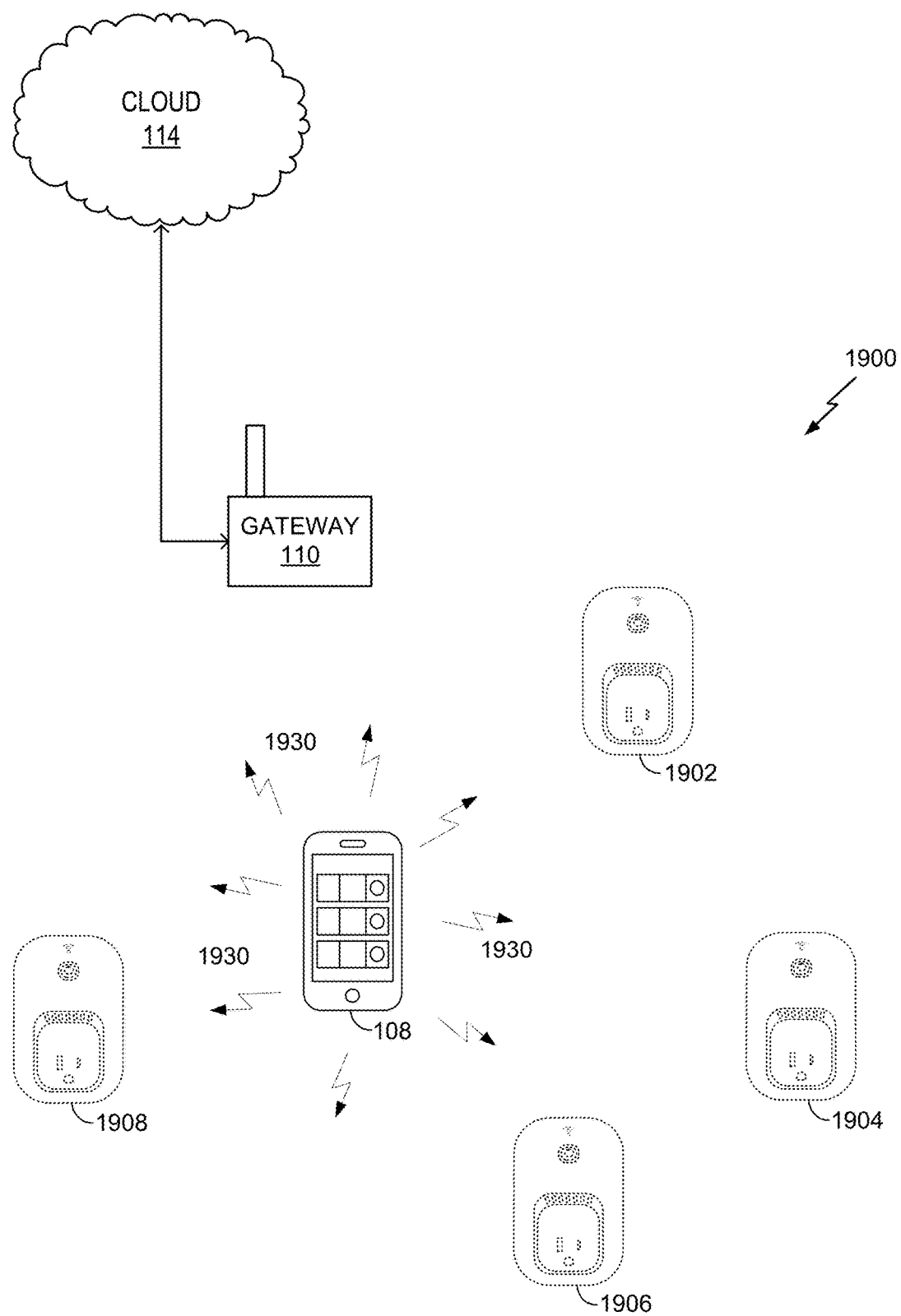
FIG. 19 is an illustration of an example of a network environment, in accordance with some embodiments.

FIG. 19 illustrates an example of a network 1900, according to embodiments of the present disclosure. Specifically, the network 1900 can be a wireless local area network enabling an access device to communicate with network devices to control adjustment of attributes related to operation of the network devices. Network 1900 includes network device 1902, network device 1904, network device 1906, and network device 1908. The network 1900 also includes access device 108. In other words, the network 1900 may be substantially similar to the network 100 except that access device 108 has been turned on near the network 1900, to which it is associated, or has entered an area to which the network 1900 can reach.

When access device 108 can enter the network 1900 as shown in FIG. 19, access device 108 may be authenticated based on the access device's authentication with the logical network or may otherwise commence communication with network 114. Access device 108 may also communicate notification of its presence or other information directly to other network devices 1902-1908 within network 1900, as shown in FIG. 19 by communication paths 1930. As noted, such communication may include various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like. For example, access device 108 may communicate to all other devices in network 1900, including network device 1902, network device 1904, network device 1906, and network device 1908, information/data regarding its status. Such status data may include the fact that it is present and turned on, or other status data/information. At any time that network devices 1902, 1904, 1906 and 1908 recognize that access device 108 is present at network 1900, the network devices may communicate back to access device 108. For example, the network devices may send an acknowledgement (e.g., ACK signal) back to access device 108 to confirm that they received the status data sent by access device 108. The network devices may also send their own status data to access device 108.

While network devices 1902-1908 and access device 108 may each receive communication from other network devices around the network 1900, including the status of each of those network devices, network devices 1902-1908 and/or access device 108 may be continuously scanning network 1900 (including, for example, running discovery algorithms) to determine whether any devices within the network have moved, turned on/off or otherwise added to or subtracted from the network 1900, or have otherwise changed statuses.

Since network devices 1902-1908 and access device 108 may each receive communication from other devices around network 1900, including the status of each of those devices, each network device within network 1900 may know the status of each other network device in the network 1900. For example, access device 108 or devices 1902-1908 may not be required to communicate with network 114 in order to obtain one or more of such statuses. Since network 114 is an external network and may be remote from network 1900, communication between network devices within the network 1900 and cloud 114 may take more time than communication between two devices within network 1900. For example, communication between devices within network 1900 may take anywhere from 1 millisecond to 100 milliseconds, while communication between a device within network 1900 and the network 114 may take anywhere from 50 milliseconds to 1 second or more). Furthermore, if a network device is retrieving information from cloud 114, the request must travel from the network device to network 114, and then the information must travel back from network 114 to the network device. This process may double the latency caused by retrieving information with cloud 114. Therefore, devices within the network 1900 may choose to send and receive/retrieve statuses directly with other devices within the network 1900 instead of communicating such information via network 114. When a network device receives status data from another network device on the device's local area network 1900, it may store that status data so that it may retrieve and use that status data at a later time.

Figure 20:
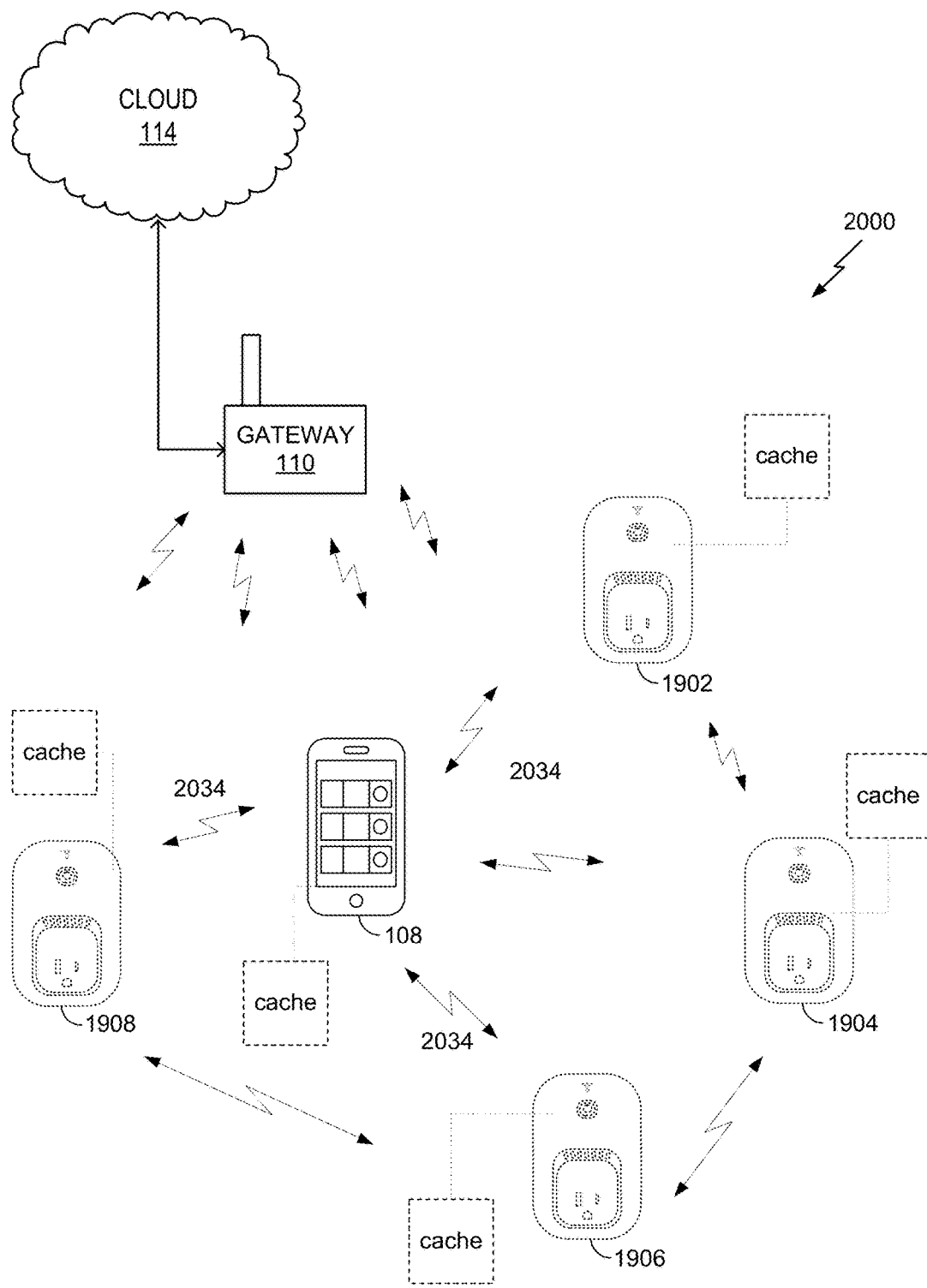
FIG. 20 is an illustration of another example of a network environment, in accordance with some embodiments.

FIG. 20 illustrates an example of a network 2000, according to embodiments of the present disclosure. The local area network 2000 may include network device 1902, network device 1904, network device 1906, network device 1908, and access device 108. FIG. 20 also illustrates that one or more network devices 1902-1908 and/or access device 108 may include a storage device, such as a cache, for storing data, including data regarding its own status and data regarding statuses received from the other devices within local area network 2000. For example, access device 108 may, after being powered up, broadcast/send its status to network device 1908 via communication 2034. Network device 1908 may store the status data received from access device 108 until the next time access device 108 updates its status by sending new/updated status data to network device 1908. Cache may be used for storage within network devices 1902-1908 and/or access devices within the local area network 2000 so that each of the devices may be able to quickly retrieve the data it needs from storage. An application operating on the access device 108 can access the cache to obtain information to display the visual interface for each network device 1902-1908 registered within the network 2000. Although a caching device may be used to store such data within the network and/or access devices within the local area network 2000, other types of storage may be used.

The cache can contain a known interface list including interface information for different, known types of devices. The known list can include a record for each network device known by the access device 108 to exist on the network 2000. When an application is run on the access device 108, the access device 108 can access the known interfaces in the cache to present the display of access device 108. The display can present one or more visual interfaces, each corresponding to a network device known to exist on the network 2000. Each visual interface can be generated based on a visual interface module corresponding to each device on the network 2000. In an example, the display can include a visual interface (e.g., a module tile) for each device in the network 2000 having an interface in the known interface list.

The cache can also contain known status information about each network device in the known device list. When the application is run on the access device 108, the access device 108 can access the known status information in the cache to present a status display. The access device 108 can populate each tile with an indicator representing the respective known status information for each device in the known device list. The status display can include an indicator of one or more attributes, one or more settings, or a combination thereof related to operation of each device in the network 2000. For example, the status display can include a speed of a fan (e.g., a fan speed of 56 in a range of values between 0 and 100) of the network device 1902 (e.g., a fan), a value of sensitivity of a sensor (e.g., a value of 34 in a range of values 0-100) for the network device 1904 (e.g., a motion sensor), a value of brightness (e.g., 65 percent brightness) for the network device 1906 (e.g., a light bulb), and a value of temperature (e.g. a slow cooker). Although shown as having a single indicator for an attribute or a setting related to operation of a network device, the status display can present a plurality of indicators corresponding to different attributes and/or settings related to operation of a network device.

In some embodiments, the cache can include other information about a network device. The other information can indicate a device's firmware version, last known firmware update status, connectivity to cloud status, registration status (e.g., whether the network device has a key or not), and other such information. The cache can include information that could be used for troubleshooting. In embodiments described below, the access device 108 can access status information from another other device on the network 2000 and can use that information to update its own cache, update the status display, and/or pass the information to the network 114 and/or the gateway 110 for trouble shooting and/or storage.

Even though each network device may know and store (e.g. in cache) the state of each other network device within local area network 2000, a network device may not know when another network device changes status (e.g. turns/powers off). However, network devices and/or access devices within local area network 2000 may broadcast/send any updates in its status to other devices on the network. For example, if network device 1902 changes status, it may send status data to the other network devices, such as network devices 1904, 1906 and 1908 and to access device 108. However, network device 1902 may not know which devices to update since the other devices may change statuses periodically (e.g. turn off).

Therefore, a network or access device may subscribe to another network or access device within local area network 2000. For example, network devices 1904, 1906 and 1908 and access device 108 may subscribe to status data notifications/updates from network device 1902. Such a subscription may be registered for upon initial connection with network device 1902 when network device 1902 first enters local area network 2000 or at any other time after network device 1902 has been associated with local area network 2000. Subscriptions may be controlled to last indefinitely or may expire after a certain predetermined period of time after initial subscription. However, network devices may re-subscribe to another network device before or after their previous subscription has expired.

Subscriptions between network device and/or access devices may be registered, similar to registering a network device upon initial entrance into the local area network, including security registrations described herein with respect to FIGS. 1 and 18. For example, a network device may send its unique security key, which it may have stored along with its network ID after being registered on the network, to a network device to which it wants to subscribe. However, subscriptions may take on many other forms, including sending a different form of identification to a network device to which a network device wants to subscribe. However, subscriptions may take on many other forms, including sending a different form of identification to a network device to which a network device wants to subscribe.

Upon receiving a subscription from another network device or access device, the device being subscribed to may store a list of the devices that subscribed to it. For example, network device 1902 may store a list of network devices 1904, 1906 and 1908 and access device 108 after those devices subscribe to network device 1902. Then, when network device 1902 undergoes a change in status, network device 1902 may send that change in status to only the devices that had previously subscribed to it but where the subscription had not yet expired. Furthermore, according to some embodiments, the subscription list of a network device may be automatically updated if that device receives notification that another device has left the range of the local area network, either from that device itself or from a different device. Therefore, the various devices within a given local area network, such as network 2000, each contain continuously updated statuses of each other device on the network and obtain those statuses and updates through direct communication without necessary use of the cloud.

Figure 21:
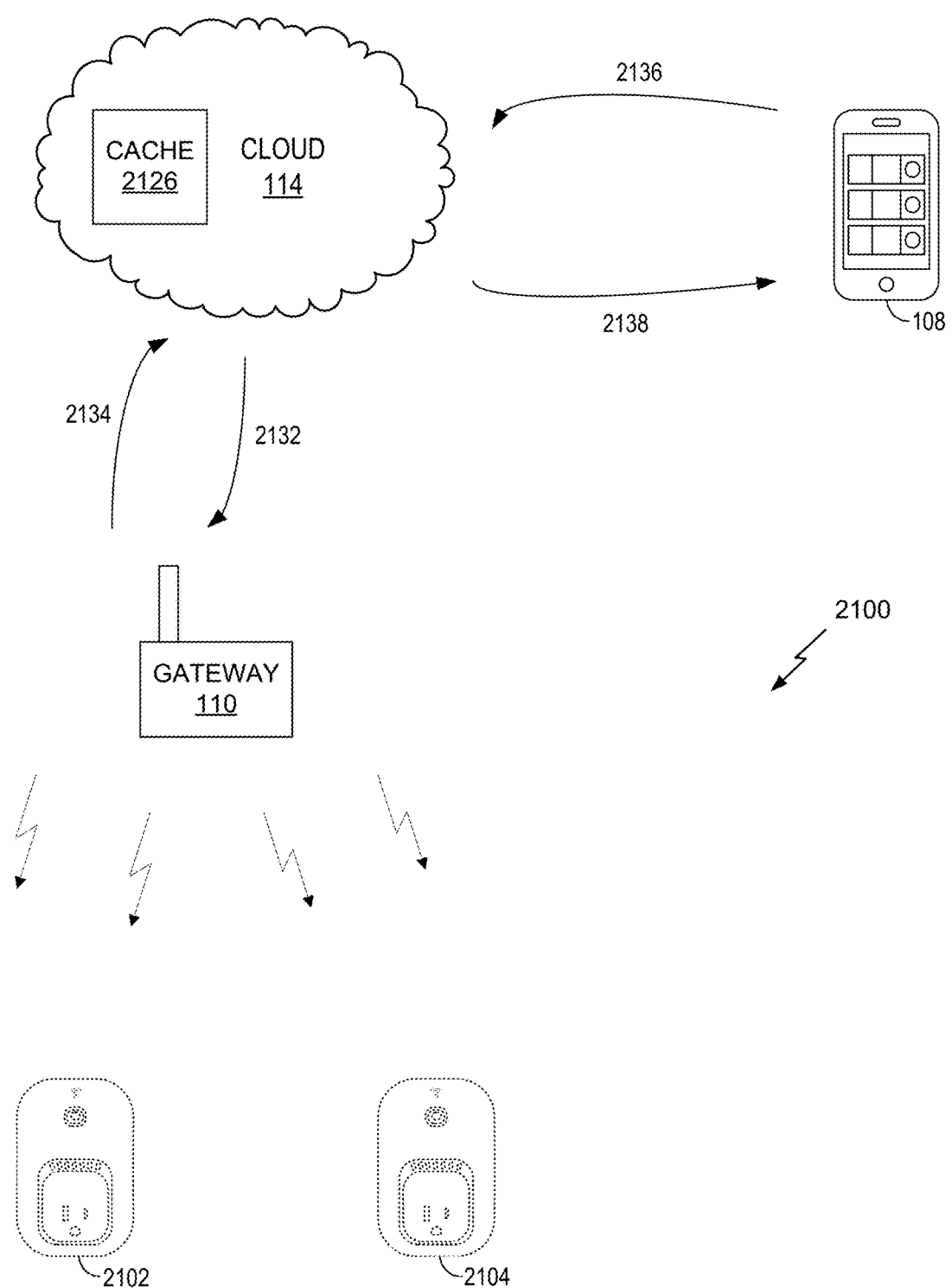
FIG. 21 is an illustration of another example of a network environment, in accordance with some embodiments.

FIG. 21 illustrates an access device 108 that is located remotely from network 2100 (e.g. local area network), according to embodiments of the present disclosure. Local area network 2100 includes gateway 110 and network devices 2102 and 2104 (which may be, for example, the same as any of network devices 1902-1908 in FIG. 19 and FIG. 20), as shown in FIG. 21. However, network 2100 may also include a variety of other network devices and one or more access devices directly connected to network 2100. Gateway 110 is connected to network 114, and allows network devices 2102 and 2104 to connect to cloud 114, the internet, or other external networks via gateway 110. In some embodiments, the network devices 2102 and 2104 may include home automation devices that allow a user to access, control, and/or configure various home appliances located within the user's home, such as a television, radio, light, microwave, iron, and/or the like.

Access device 108 is not directly connected to network 2100. Instead, access device 108 is external to network 2100 and may connect to network 114 and to network 2100 via network 114. As noted, network devices 2102 and 2104 may change status on a periodic basis. In some embodiments, even when external to and not directly connected to network 2100, an access device may request to check the status of the devices on the network. When access device 108 seeks to check the status of any device on the network, the access device 108 may transmit/send a communication 2136 to the network 114, to which all devices on the network are connected either directly or indirectly via gateway 110. Since the network 114 stores an updated table/list of the statuses of each of the devices within the requesting access device's network, the network 114 may transmit a communication 2138 of such status data to the access device 108. For example, after network devices 2102 and 2104 are turned on, authenticated and are a part of network 2100, network devices 2102 and 2104 may communicate their statuses to network 114. Furthermore, any time the status of network devices 2102 and 2104 changes, the device that incurred a status change may push/send information (e.g. an indication) of that status change to network 114. Network 114 may store, in cache 2126 or otherwise, the statuses (which may be time stamped in metadata or otherwise) of network devices 2102 and 2104. Therefore, when access device 108 requests from network 114 the statuses of devices on network 2100, cloud 114 may send its most recently stored/updated statuses to access device 108.

To obtain the most updated status data of devices within network 2100, cloud 114 may, upon receiving a request for status data related to network devices 2102 and 2104, transmit/send a communication 2132 (e.g. request, query, etc.) for such status data to network devices 2102 and 2104 via gateway 110. Once network devices 2102 and 2104 receive this request, network devices 2102 and 2104 may send a communication 2134 (e.g. updated status data) to cloud 114 to replace the previously stored/cached statuses in cache 2126. Upon receipt of updated status data 2134 from network 2100, cloud 114 may send a communication 2138 of such status data to the access device 108.

However, the process of network 114 requesting updated statuses from network devices 2102 and 2104 within network 2100 may cause latency within the system. More specifically, the time required for network 114 to request updated statuses from network devices 2102 and 2104 and to in turn receive updated statuses from network devices 2102 and 2104 may be substantially greater than the time required for network 114 to send its currently stored statuses (without being updated) for network devices 2102 and 2104 to access device 108. For example, of the total time required for access device 108 to receive updated statuses from network 114, 80% or more of that total time may include network 114 requesting updated statuses from network devices 2102 and 2104. On the other hand, of the total time required for access device 108 to receive updated statuses from network 114, 20% or more of that total time may include the status data being transmitted from network 114 to access device 108. Since a majority of the process required for access device 108 to request and receive status data for network devices 2102 and 2104 is the transmission of data between cloud 114 and network devices 2102 and 2104, the access device 108 and network 114 may maximize efficiency by minimizing the effect of the transmission of data between cloud 114 and network devices 2102 and 2104 on the whole process/system.

Figure 22:
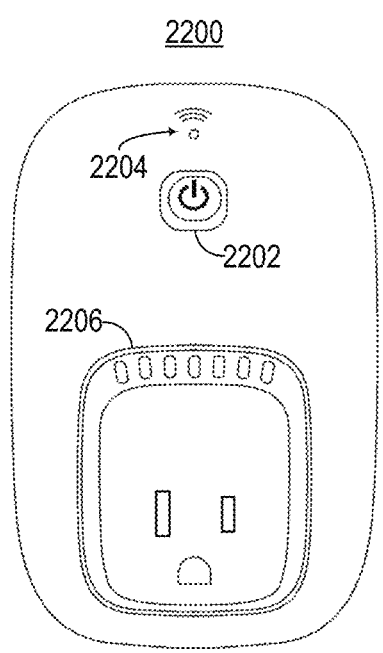
FIG. 22 is an illustration of an example of a front view of a network device, in accordance with an embodiment.
Figure 23:
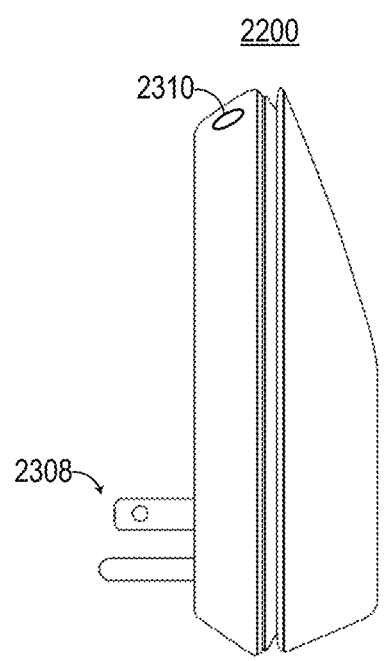
FIG. 23 is an illustration of an example of a side view of a network device, in accordance with an embodiment.

FIG. 22 illustrates an example of a front view of a network device 2200. FIG. 23 illustrates an example of a side view of the network device 2200. The network device 2200 may include any of the network devices described herein. In some embodiments, the network device 2200 may be a home automation network device. For example, the network device 2200 may include a home automation switch that may be coupled with a home appliance. A user may wirelessly access the network device 2200 in order to access, control, and/or configure various home appliances located within the user's home. For instance, the user may remotely control appliances such as a television, radio, light, microwave, iron, space heater, wall A/C unit, washer, dryer, fan, and/or the like.

In some embodiments, the network device 2200 may include a WiFi enabled switch that connects home appliances and other electronic devices to a compatible 802.11b/g/n/ac WiFi network. The network device 2200 may thus allow users to locally or remotely turn devices on or off from anywhere, program customized notifications, and/or change device status. The network device 2200 may further allow a user to create custom schedules or have devices respond to sunrise or sunset.

The network device 2200 includes an power switch 2202 that may be depressed in order to turn the network device 2200 on and off. In some embodiments, a light source may be integrated with or located behind the power switch. For example, a light-emitting diode (LED) may be located on a circuit board under the power button 2202. The light source may be illuminated when the network device 2200 is powered on, and may not be illuminated when the network device 2200 is powered off.

The network device 2200 further includes a communications signal indicator 2204. The signal indicator 2204 may indicate whether the network device 2200 has access to a communications signal, such as a WiFi signal. For example, the signal indicator 2204 may include a light source (e.g., a LED) that illuminates when the network device 2200 is connected to a communications signal. The light source may depict different colors or other characteristics (e.g., flashing, dimming, or the like) to indicate different levels of signal strength or mode of operation.

The network device 2200 includes a restore button 2310. The restore button 2310 may allow a user to reset the network device 2200 to factory default settings. For example, upon being depressed, the restore button 2310 may cause all software on the device to be reset to the settings that the network device 2200 included when purchased from the manufacturer.

The network device 2200 further includes a plug 2308 and an outlet 2206. The plug 2308 allows the network device 2200 to be plugged into a wall socket, such as a socket providing 120V, 220V, or the like. In turn, an appliance may be plugged into the outlet 2206. Once the network device 2200 is registered according to the techniques described above, an appliance plugged into the socket 2206 may be controlled by a user using an access device (e.g., access device 108).

Figure 24:
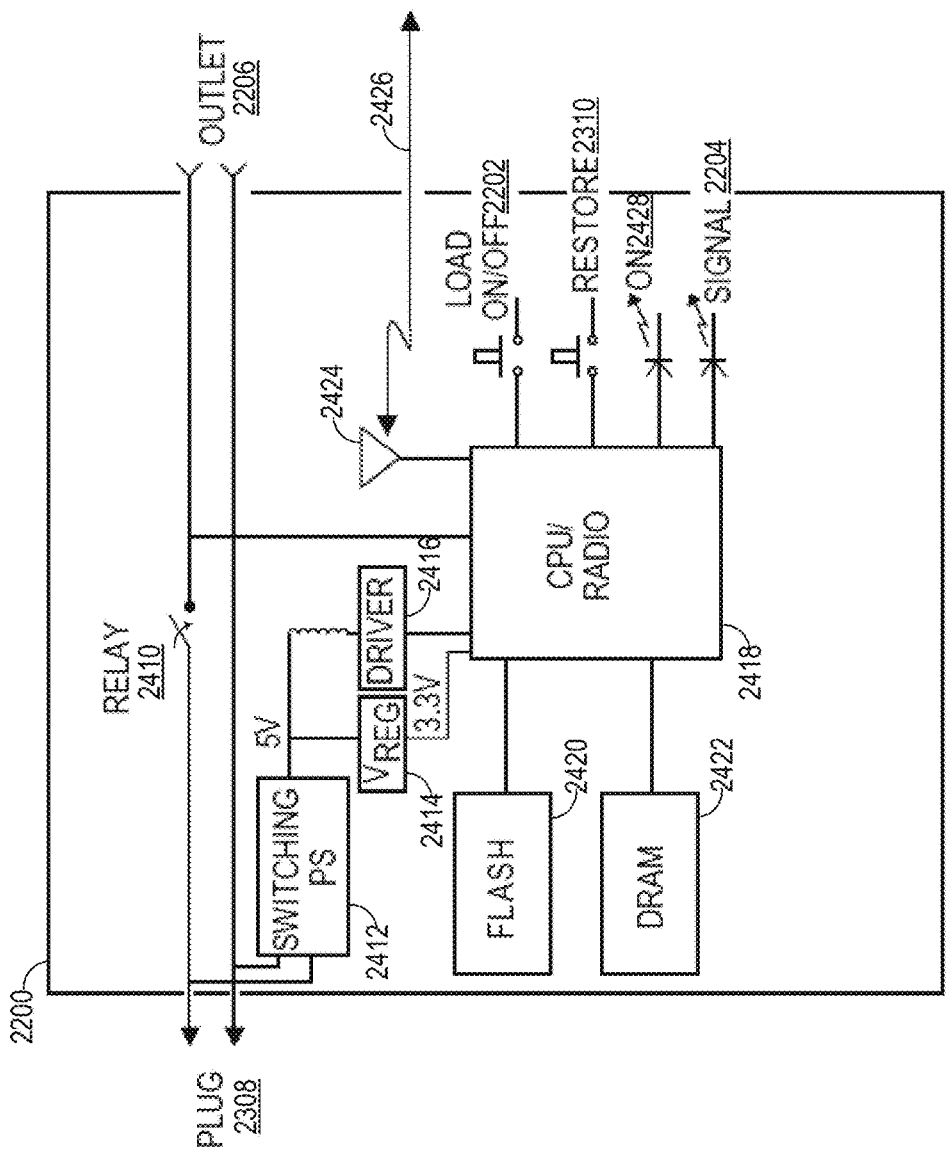
FIG. 24 is an example of a block diagram of a network device, in accordance with an embodiment.

FIG. 24 is an example of a block diagram of the network device 2200 depicting different hardware and/or software components of the network device 2200. As described above with respect to FIGS. 22 and 23, the network device 2200 includes the outlet 2206, the plug 2308, the power button 2202, the restore button 2310, and the communications signal indicator 2204. The network device 2200 also includes light source 2428 associated with the power button 2202. As previously described, the light source 2428 may be illuminated when the network device 2200 is powered on.

The network device 2200 further includes a relay 2410. The relay 2410 is a switch that controls whether power is relayed from the plug 2308 to the outlet 2206. The relay 2410 may be controlled either manually using the power button 2202 or remotely using wireless communication signals. For example, when the power button 2202 is in an ON position, the relay 2410 may be closed so that power is relayed from the plug 2308 to the outlet 2206. When the power button 2202 is in an OFF position, the relay 2410 may be opened so that current is unable to flow from the plug 2308 to the outlet 2206. As another example, an application or program running on an access device may transmit a signal that causes the relay 2410 to be opened or closed. For instance, an access application may display a graphical interface on the access device that includes a power button. The user may tap or otherwise select the power button, and the access application may send a communication signal (e.g., over a WiFi network) to the network device 2200 instructing the network device 2200 to open or close the relay 2410.

The network device 2200 further includes flash memory 2420 and dynamic random access memory (DRAM) 2422. The flash memory 2420 may be used to store instructions or code relating to an operating system, one or more applications, and any firmware. The flash memory 2420 may include nonvolatile memory so that any firmware or other program can be can updated. In the event the network device 2200 loses power, information stored in the flash memory 2420 may be retained. The DRAM 2422 may store various other types of information needed to run the network device 2200, such as all runtime instructions or code.

The network device 2200 further includes a CPU/Radio 2418. The CPU/Radio 2418 controls the operations of the network device 2200. For example, the CPU/Radio 2418 may execute various applications or programs stored in the flash memory 2420 and/or the dynamic random access memory (DRAM) 2422. The CPU/Radio 2418 may also receive input from the various hardware and software components, interpret the input, and perform one or more functions in response to the input. As one example, the CPU/Radio 2418 may determine whether the power button 2202 has been pressed, and determines whether the relay 2410 needs to be opened or closed. The CPU/Radio 2418 may further perform all communications functions in order to allow the network device 2200 to communicate with other network devices, one or more gateways, a network, and/or one or more access devices. While the CPU and radio of the network device 2200 are shown to be combined in the CPU/Radio 2418, one of ordinary skill in the art will appreciate that, in some embodiments, the CPU and radio may be separately located within the network device 2200. For example, CPU circuitry may be situated at a separate location on a circuit board from the location of radio circuitry, the CPU circuitry may be located on a different circuit board from the radio circuitry, or the like. Further, the network device 2200 may include multiple transceiver radios that are configured to communicate using one or more communication protocols, such as any combination of a WiFi™ transceiver radio, a Bluetooth™ transceiver radio, a Zigbee™ transceiver radio, a UWB transceiver radio, a WiFi-Direct transceiver radio, a BLE transceiver radio, an IR transceiver, and/or any other wireless network transceiver radio or interface. For example, the network device 2200 may include a single transceiver radio for each frequency band of one or more of the communication protocols (e.g., a single 5 GHz transceiver radio and a single 2.4 GHz transceiver radio, or the like). As another example, the network device 2200 may include two or more transceiver radios for each frequency band of one or more of the communication protocols (e.g., two 5 GHz transceiver radios and a two 2.4 GHz transceiver radios, or the like). In examples in which the network device 2200 includes multiple transceiver radios for a frequency band of a communication protocol, the network device 2200 may communicate using multiple channels (up to the number of transceiver radios) of the frequency band at any given point in time. In some embodiments, the network device 2200 does not include a cellular network transceiver radio or interface, and thus may not be configured to directly communicate with a cellular network. In some embodiments, the network device 2200 may include a cellular network transceiver radio, and may be configured to communicate with a cellular network using the cellular network transceiver radio.

The network device 2200 may communicate with other devices and/or networks via antenna 2424. For example, antenna 2424 may include a 2.4 GHz antenna, a 5 GHz antenna, or any other suitable antenna, that can transmit and receive WiFi communications signals. In some embodiments, the antenna 2424 can comprise or be coupled with a wireless transceiver. The network device 2200 may include other types of antennas that can communicate Bluetooth® signals, Zigbee® signals, Ultra-Wideband (UWB) signals, WiFi-Direct signals, BLE signals, IR signals, sound signals, UPnP signals, and/or the like. In some embodiments, the antenna 2424 may be configured to communicate different types of signals, such as the WiFi signals, Bluetooth® signals, Zigbee® signals, UWB signals, WiFi-Direct signals, BLE signals, IR signals, sound signals, and/or the like. In some embodiments, the network device 2200 may include multiple antennas for communicating the different types of communication signals. As one example, the network device 2200 may include both a 2.4 GHz antenna and a 5 GHz antenna.

The network device 2200 further includes a driver 2416, a switching power supply 2412, and a voltage regulator 2414. The driver 2416 may include instructions or code that can be used to translate control signals or commands received from applications running on the DRAM 2422 to commands that the various hardware components in the network device 2200 can understand. In some embodiments, the driver 2416 may include an ambient application running on the DRAM 2422. The switching power supply 2412 may be used to transfer power from the outlet in which the plug 2308 is connected to the various loads of the network device 2200 (e.g., CPU/Radio 2418). The switching power supply 2412 may efficiently convert the voltage and current characteristics of the electrical power to a level that is appropriate for the components of the network device 2200. For example, the switching power supply 2412 may perform AC-DC conversion. In some embodiments, the switching power supply 2412 may be used to control the power that is relayed from the plug 2308 to the outlet 2206. The voltage regulator 2414 may be used to convert the voltage output from the switching power supply 2412 to a lower voltage usable by the CPU/Radio 2418. For example, the voltage regulator 2414 may regulate the DC voltage from 5V to 3.3V.

The network device 2200 further includes a network address translation (NAT) proxy engine (not shown). For example, program code can include the NAT proxy engine that enables the CPU/Radio 2418 to perform one or more operations. In some examples, the NAT proxy engine can perform one or more of the steps described above with respect to FIG. 5 or FIG. 6. For example, the NAT proxy engine may obtain a communication received by the wireless transceiver. The communication includes a performance metric of one or more devices on a local area network that share a common network service provider with the network device 2200. The NAT proxy engine can determine that the network device 2200 is selected for operating as the proxy NAT device for the devices and can aggregate NAT traversal for the devices by, at least in part, establishing a single NAT connection with the common network service provider, as described above with respect to FIG. 5. The NAT proxy engine can then send a signal to the transceiver to transmit the communications of the devices over the single NAT connection with the common network service provider. In another example, the NAT proxy engine can obtain a first communication received by the wireless transceiver that includes a performance metric of one or more devices on the local area network that share a common network service provider with the network device 2200. The NAT proxy engine can determine that another device is selected for operating as the proxy NAT device for the network device 2200, as described above with respect to FIG. 6. The NAT proxy engine can then send a signal to the transceiver to transmit to the proxy NAT device a second communications destined for the common network service provider. The proxy NAT device can then send the second communication to the common network service provider over a single NAT connection for the devices that is established by the proxy NAT device.

In various embodiments, functions may be stored as one or more computer-program products, such as instructions or code, in a non-transitory machine-readable storage medium, such as the flash memory 2420 and/or the DRAM 2422. The network device 2200 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 5, 6, or 8, may be implemented as code and/or instructions executable by a computer (and/or a processor within a computer); in an aspect, then, such code and/or instructions can be used to configure and/or adapt a computer (or other device) to perform one or more operations in accordance with the described methods. Such functions or code may include code to perform the steps described above with respect to FIG. 5, 6, or 8. The memory, such as the flash memory 2420 and/or the DRAM 2422, may be a processor-readable memory and/or a computer-readable memory that stores software code (programming code, instructions, etc.) configured to cause a processor(s) within the CPU/Radio 2418 to perform the functions described. In other embodiments, one or more of the functions described may be performed in hardware.

A set of these instructions and/or code might be stored on a non-transitory machine-readable storage medium, such as the flash memory 2420 and/or the DRAM 2422. In some cases, the storage medium might be incorporated within a computer system, such as the CPU/Radio 2418. In other embodiments, the storage medium might be separate from a computer system (e.g., a removable medium, such as a compact disc), and/or provided in an installation package, such that the storage medium can be used to program, configure and/or adapt a computer with the instructions/code stored thereon. These instructions might take the form of executable code, which is executable by the network device 2200 and/or might take the form of source and/or installable code, which, upon compilation and/or installation on the network device 2200 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

It should be appreciated that the network device 2200 may have other components than those depicted in FIGS. 22-24. Further, the embodiment shown in the figures are only one example of a network device that may incorporate an embodiment of the disclosure. In some other embodiments, network device 2200 may have more or fewer components than shown in the figure, may combine two or more components, or may have a different configuration or arrangement of components.

Figure 25:
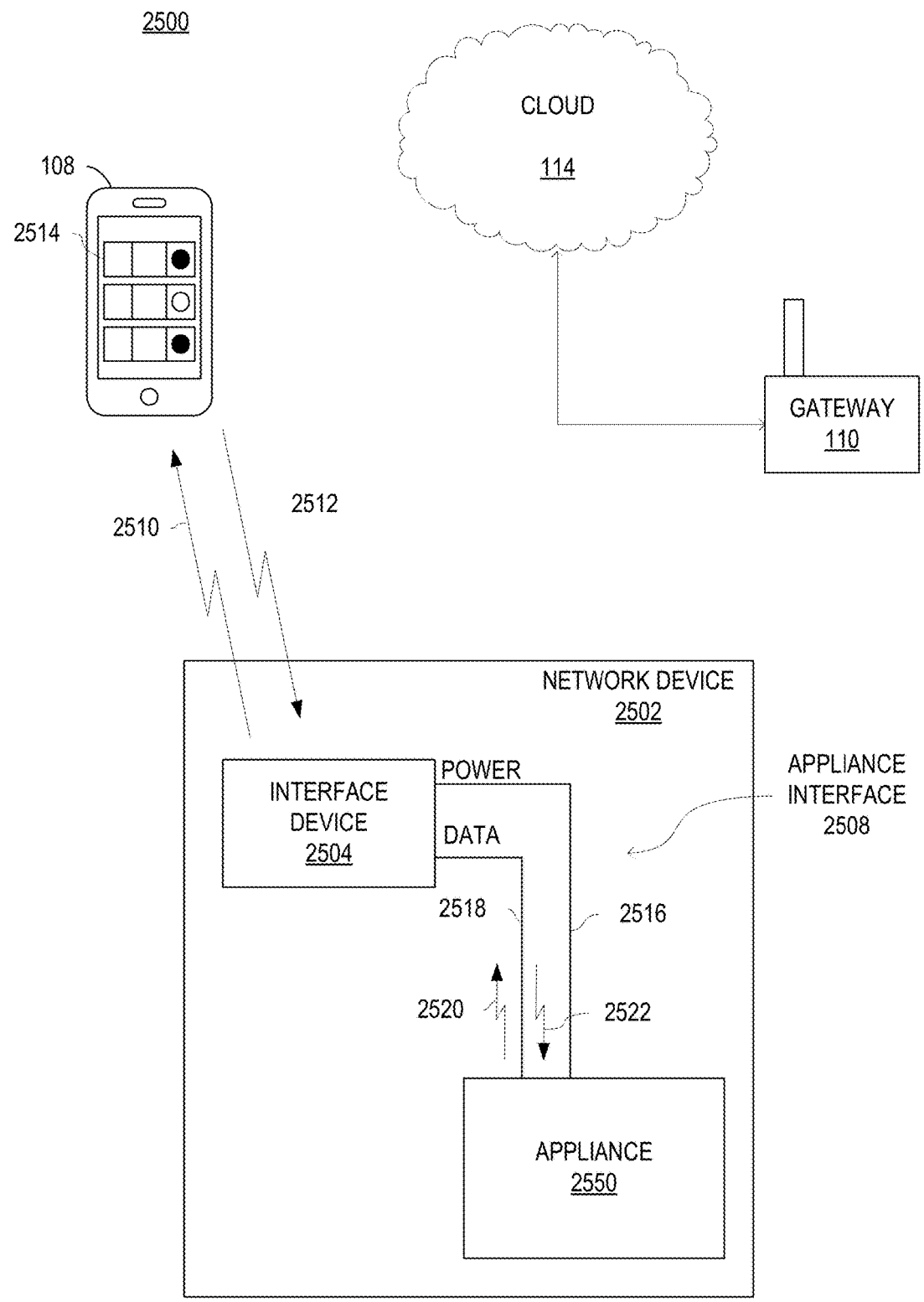
FIG. 25 is a schematic illustration of a local area network including a network device that includes an appliance, in accordance with an embodiment.

FIG. 25 is a schematic illustration of a local area network 2500 including a network device 2502 that includes an appliance 2550. The network device 2502 can comprise an interface device 2504 and the appliance 2550 connected by an appliance interface 2508. The appliance interface 2508 can include a data connection 2518 and a power connection 2516. The data connection 2518 can be a serial connection (e.g., RS-232, USB, or other), or any other suitable data connection. The interface device 2504 can be fully powered by the appliance 2502 through the power connection 2516, or can have a separate source of power.

The appliance 2550 can be any suitable electric device, such as a crock pot, space heater, an iron, a washing machine, a dishwasher, a lamp, a radio, a computer, an amplifier, or another electrical device. Additional examples of suitable electrical devices include electrical devices incorporated into or with non-electrical devices, such as an actuator system in an electrically-actuated deadbolt, a sensing system in a seat cushion, or other suitable electrical device incorporated into or with a non-electrical device. The appliance 2550 can be adapted to operate with the interface device 2504. The appliance 2550 can be any finite state machine. The appliance 2550 can, but need not, know or store one or more states related to the appliance. For example, the appliance 2550 may know or store data related to whether the appliance 2550 is turned on, how long the appliance has been on (or off), among other status data.

The interface device 2504 can be positioned within the housing of the appliance 2550, or can be attached externally to the appliance 2550. The interface device 2504 can be removable from the appliance 2550, or can be permanently installed in or on the appliance 2550.

The interface device 2504 can be connected to the local area network 2500 through a network interface. The interface device 2504 can be connected by a wired or wireless connection (e.g., WiFi, Zigbee, or others described herein or well known). In some embodiments, the interface device 2504 can be connected directly to the network 114 through a cellular internet connection (e.g., EDGE, LTE, or others).

The interface device 2504 can communicate with another network device, an access device 108, or another client device through the network interface 2506. The interface device 2504 can transmit a status information signal 2510 with status information to the access device 108, and the access device 108 can transmit a network device control signal 2512 to the interface device 2504. The status information signal 2510 and the network device control signal 2512 can be transmitted between the interface device 2504 and the access device 108 using a telecommunications network (e.g., a cellular network, or other suitable broadband network), using a local area network 2500 (e.g., through a gateway 110), or using the network 114, although such a signal may pass through an intermediary device or network to do so.

The interface device 2504 can interpret the network device control signal 2512 and perform actions based on the contents of the network device control signal 2512. The network device control signal 2512 can include commands that can be performed by the interface device 2504 itself. The network device control signal 2512 can also include commands that are to be performed by the appliance 2550. Commands that are to be performed by the appliance 2550 can include commands like turn on or off, set a desired temperature (e.g., heat up or cool down to 215° F. or any other temperature), or other suitable commands depending on the particular appliance. The interface device 2504 can interpret the network device control signal 2512 and can send out a command 2522, through the data connection 2518 of the appliance interface 2508, based on the network device control signal 2512. The appliance 2550 can then perform the command indicated in the network device control signal 2512.

The interface device 2504 can also transmit commands to the appliance 2550 that are not based on a network device control signal received from the access device 108, but are rather based on programming in the interface device 2504. Examples of such commands can include commands to update a communication rate, commands to check a state of the appliance 2550, commands to set or get a clock time of the appliance 2550, or any other suitable commands.

The interface device 2504 can receive, through the data connection 2518 of the appliance interface 2508, a response (e.g., response 2520) to any command from the appliance 2550. In some examples, the response 2520 can include an indication that the command 2522 was received. In some examples, the response may include only an indication that a command is received (e.g., an ACK). In some examples, the response 2520 can include information for some value on the appliance 2550, such as an "on/off" state, a serial number, a product identification, a manufacturer identification, a temperature, a time since live, a setting, or any other value retrievable from the appliance 2550. The interface device 2504 can interpret the value and can send information about the value (e.g., the state of the appliance is "on," the temperature of the appliance, the time since the appliance first turned on, or other information) as status information (e.g. using status information signal 2510) to the access device 108. Additionally, the interface device 2504 can send status information about itself (e.g., time since live, supplied power, signal strength, and others) as status information (e.g. using status information signal 2510) to the access device 108.

The interface device 2504 can also use responses (e.g., response 2520) from the appliance 2550 to perform additional functions at the interface device 2504, such as error handling. In some cases, when performing the additional functions, the interface device 2504 does not transmit any status information 2510 to the access device 108 based on those particular responses.

The access device 108 can include one or more display tiles (e.g., display tile 2514) for displaying information and controls corresponding to the network device 102.

In some embodiments, the interface device 2504 can transmit a heartbeat command (e.g., command 2522) over the data connection 2518 to the appliance 2502 to determine whether the appliance 2550 is working properly and/or in a state of readiness. If the interface device 2504 determines that the appliance 2550 has had some sort of failure (e.g., the appliance 2550 sends a response 2520 indicating a failure or the interface device 2504 does not receive any response 2520), the interface device 2504 can take corrective action (e.g., restarting the appliance 2550 or an element of the appliance 2550), can log the event, or can alert the user).

Figure 26:
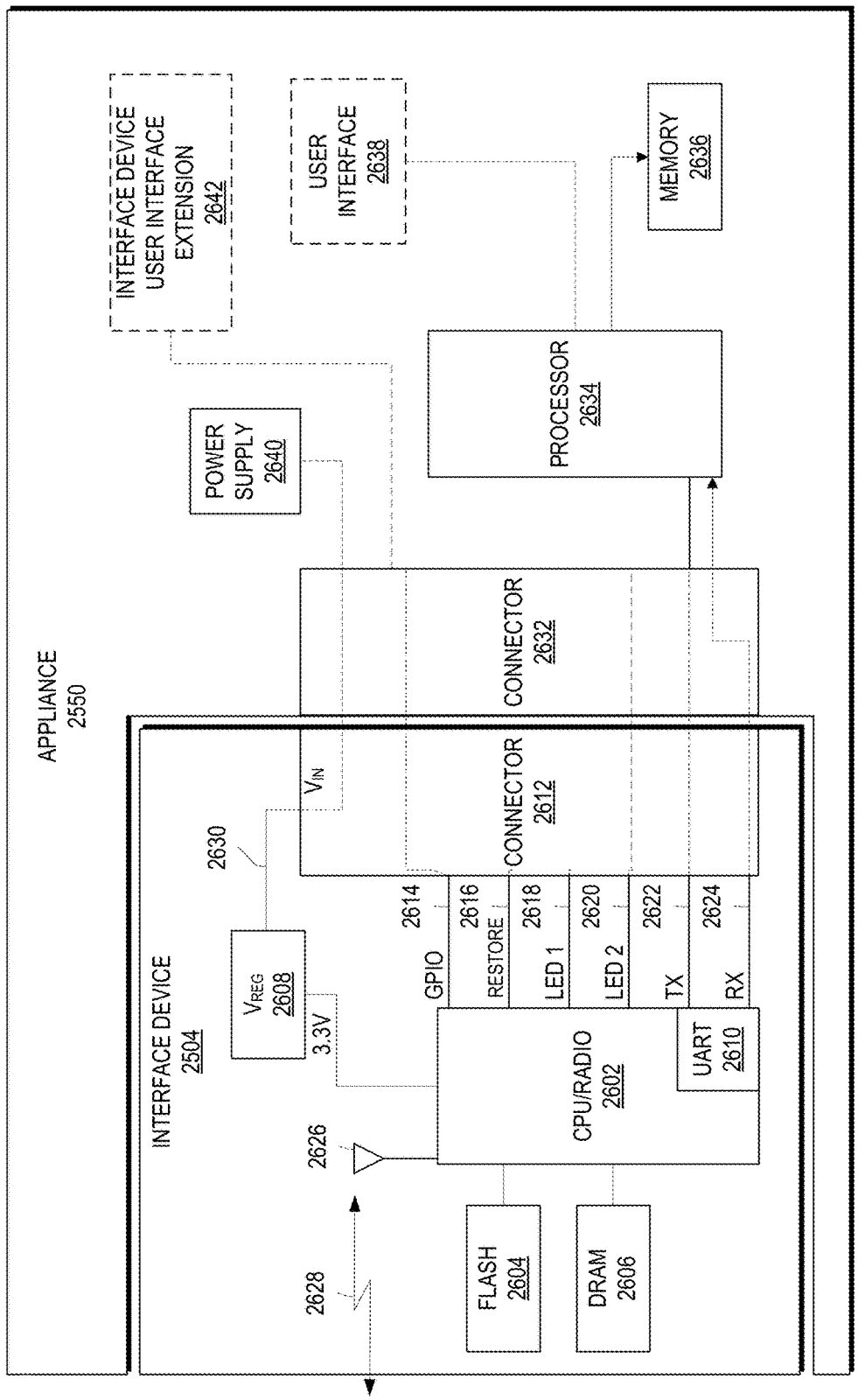
FIG. 26 is an example of a block diagram of a network device including an interface device attached to an appliance, in accordance with an embodiment.

FIG. 26 depicts a block diagram of a network device including an interface device 2504 attached to an appliance 2550 according to one embodiment. The interface device 2504 can include connector 2612 that interacts with connector 2632 of the appliance 2550.

The interface device 2504 can include flash memory 2604 and dynamic random access memory (DRAM) 2606. The flash memory 2604 may be used to store instructions or code relating to an operating system, one or more applications, and any firmware. The flash memory 2604 can be used to store a cache. The flash memory 2604 may include non-volatile memory so that any firmware or other program can be can updated. In the event the interface device 2504 loses power, information stored in the flash memory 2604 may be retained. The DRAM 2606 may store various other types of information needed to run the interface device 2504, such as all runtime instructions or code. The flash memory 2604 or DRAM 2606 or a combination thereof may include all instructions necessary to communicate with an appliance 2550, including all instructions necessary to communicate using the appliance serial protocol disclosed herein.

The interface device 2504 further includes a CPU/Radio 2602. The CPU/Radio 2602 can control the operations of the interface device 2504. For example, the CPU/Radio 2602 may execute various applications or programs stored in the flash memory 2604 and/or the dynamic random access memory (DRAM) 2606. The CPU/Radio 2602 may also receive input from the appliance 2550, interpret the input, and perform one or more functions in response to the input. The CPU/Radio 2602 may further perform all communications functions in order to allow the interface device 2504 to communicate with other network devices, one or more gateways, a network, and/or one or more access devices. The interface device 2504 may communicate with other devices and/or networks via antenna 2626. For example, antenna 2626 may include a 2.4 GHz antenna that can transmit and receive WiFi communications signals 2628. The antenna 2626 may include other types of antennas that can communicate Bluetooth® signals, Zigbee® signals, Ultra-Wideband (UWB) signals, and/or the like. In some embodiments, the interface device 2504 may include multiple antennas for communicating different types of communication signals.

The CPU/Radio 2602 can include at least one universal asynchronous receiver/transmitter (UART) 2610. The CPU/Radio 2503 can use the UART 2610 to send and receive serial communications. The CPU/Radio 2503 can send data through a transmit line 2622 and a receive data through a receive line 2624. The CPU/Radio 2503 can send and receive data through the transmit line 2622 and receive line 2624 using a serial protocol, such as RS232. The CPU/Radio 2602 can also include an input/output (GPIO) line 2614, a restore line 2616, an LED 1 line 2618, and an LED 2 line 2620. The CPU/Radio 2602 can have additional or fewer lines as necessary. The GPIO line 2614 can be used for any suitable function, such as powering an indicator light on an appliance 2550 or accepting an input from the appliance 2550. A signal sent on the restore line 2616 can be used to restore the CPU/Radio 2602 and/or the interface device 2504 to factory defaults. The LED 1 line 2618 and LED 2 line 2620 can be used to power first and second LEDs that can be used to indicate various statuses, such as whether the interface device has a network connection and whether the interface device is powered on.

The interface device 2504 further includes a voltage regulator 2608. The voltage regulator 2608 may be used to convert the voltage output from the appliance 2550 to a voltage usable by the CPU/Radio 2602. For example, the voltage regulator 2608 may regulate the DC voltage from 5V to 3.3V. The voltage regulator 2608 can be supplied with power from a power line 2630.

Each of the interface lines, including the GPIO line 2614, the restore line 2616, the LED 1 line 2618, the LED 2 line 2620, the transmit line 2622, the receive line 2624, the power line 2630, and any additional lines, can be routed through connector 2612. Connector 2612 can be a proprietary or universal connector. Any appliance 2550 to which the interface device 2504 is attached through the connector 2612 can have the necessary hardware to make use of the interface lines, such as to provide power to the power line 2630 and to provide the first and second LEDs that are driven by the LED 1 line 2618 and LED 2 line 2620.

In alternate embodiments, some interface lines are not routed through the connector 2612. For example, the power line 2630 can be routed to a power supply attached directly to the interface device 2504, and the LED 1 line 2618 and LED 2 line 2620 can be routed to first and second LEDs located within the interface device 2504.

In various embodiments, functions may be stored as one or more instructions or code in memory, such as the flash memory 2604 and/or the DRAM 2606. The interface device 2504 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed below may be implemented as code and/or instructions executable by a computer (and/or a processor within a computer); in an aspect, then, such code and/or instructions can be used to configure and/or adapt a device (e.g. a specialty computer) to perform one or more operations in accordance with the described methods. Such functions or code may include code to perform various steps described below. The memory, such as the flash memory 2604 and/or the DRAM 2606, may be a processor-readable memory and/or a computer-readable memory that stores software code (programming code, instructions, etc.) configured to cause a processor(s) within the CPU/Radio 2602 to perform the functions described. In other embodiments, one or more of the functions described may be performed in hardware.

A set of these instructions and/or code might be stored on a computer-readable storage medium, such as the flash memory 2604 and/or the DRAM 2606. In some cases, the storage medium might be incorporated within a computer system, such as the CPU/Radio 2602. In other embodiments, the storage medium might be separate from a computer system (e.g., a removable medium, such as a compact disc), and/or provided in an installation package, such that the storage medium can be used to program, configure and/or adapt a device (e.g. a computer) with the instructions/code stored thereon. These instructions might take the form of executable code, which is executable by the interface device 2504 and/or might take the form of source and/or installable code, which, upon compilation and/or installation on the interface device 2504 (e.g., using any of a variety of compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

The interface device 2504 may have other components than those depicted in FIG. 26. Further, the embodiment shown in the figures are only one example of an interface device that may incorporate an embodiment of the disclosure. In some other embodiments, interface device 2504 may have more or fewer components than shown in the figure, may combine two or more components, or may have a different configuration or arrangement of components.

The appliance 2550 can have a processor 2634. The processor 2634 can be a microcontroller, such as a Peripheral Interface Controller (PIC). The appliance 2550 can include a memory 2636 (e.g., a flash memory or other) that is readable by the processor 2634. The memory 2636 can include instructions enabling the innate functionality of the appliance 2550, such as heating and timing for a crock pot. The appliance 2550 can also include a NAT proxy engine that operates similarly to the NAT proxy engine described above with respect to the network device 2200 shown in FIG. 24.

The appliance 2550 can include a user interface 2638. The user interface 2638 can provide buttons, displays, LEDs, knobs, and other input and output elements necessary for a user to interact with the appliance 2550. For example, a user interface 2638 for a slow cooker can include a display, a power button, a temperature adjustment button, and a start button. The user interface 2638 can be driven and/or monitored by the processor 2634. In some embodiments, the appliance 2550 is "headless" or has no user interface 2638.

The appliance 2550 can include a power supply 2640 that can provide power to the voltage regulator 2638 of the interface device 2504 through connector 2632, connector 2612, and power line 2630.

The appliance 2550 can include an interface device user interface extension 2642. The interface device user interface extension 2642 can include various input and output elements that are passed directly to the interface device 2504 without being processed by the processor 2634. Examples of input and output elements of the interface device user interface extension 2642 include LEDs associated with the LED 1 line 2618 and LED 2 line 2620, a hardware restore button associated with the restore line 2616, or any other suitable input/output element.

Figure 27:
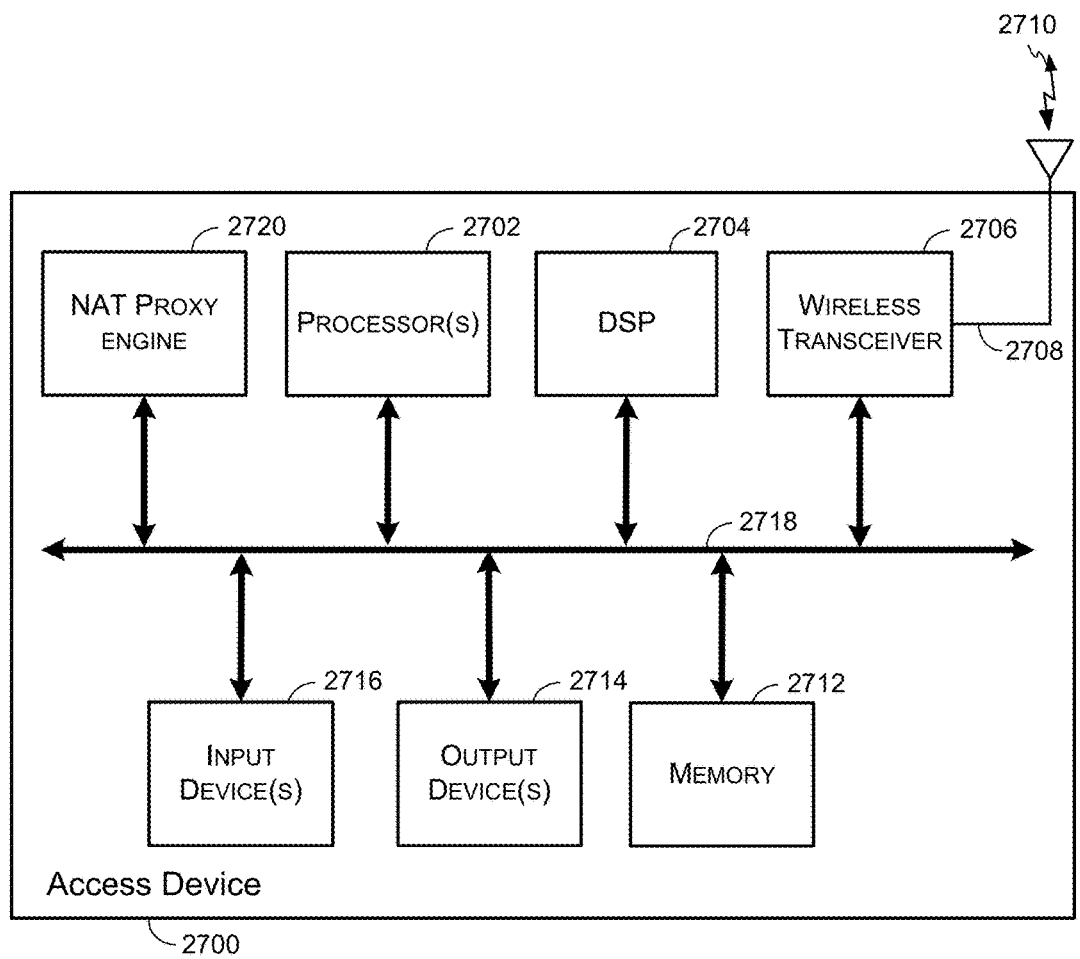
FIG. 27 is a block diagram illustrating an example of an access device, in accordance with some embodiments.

FIG. 27 illustrates an example of an access device 2700. The access device 2700 may include any human-to-machine interface with network connection capability that allows access to a network. For example, the access device 2700 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., television, refrigerator, security system, game console, browser, or the like), a speech or gesture interface (e.g., Kinect™ sensor, Wiimote™, or the like), an internet of things (IoT) device interface (e.g., an Internet enabled appliance such as a wall switch, a control interface, or the like). The access device 2700 includes hardware elements that can be electrically coupled via a bus 2718 (or may otherwise be in communication, as appropriate). In one embodiment, the bus 2718 can be used for the processor(s) 2702 to communicate between cores and/or with the memory 2712. The hardware elements may include one or more processors 2702, including without limitation one or more processors, such as digital signal processing chips, graphics acceleration processors, and/or other suitable processor; one or more input devices 2716, which can include without limitation a camera, a mouse, a keyboard, a touch sensitive screen, a touch pad, a keypad, and/or the like; and one or more output devices 2714, which can include, without limitation, a display, a printer, and/or the like.

The access device 2700 may include one or more wireless transceivers 2706 connected to the bus 2718. The wireless transceiver 2706 may be operable to receive wireless signals via antenna 2708 (e.g., signal 2710). The wireless signal 2710 may be transmitted via a wireless network. In some embodiments, the wireless network may be any wireless network including but not limited to a local area network (e.g., local area network 100 or 200), such as WiFi, a Personal Access Network (PAN), such as Bluetooth™, Zigbee™, or the like, or a wide area network, such as a cellular network (e.g. a GSM, WCDMA, LTE, CDMA2000 network), a network, the Internet, or other network. Wireless transceiver 2706 may be configured to receive various radio frequency (RF) signals (e.g., signal 2710) via antenna 2708 from one or more gateways, network devices, other access devices, networks, and/or the like. Access device 2700 may also be configured to decode and/or decrypt, via the DSP 2704 and/or processor(s) 2702, various signals received from one or more gateways, network devices, other access devices, networks, and/or the like.

The access device 2700 further includes a network address translation (NAT) proxy engine 2720. For example, program code can include the NAT proxy engine 2720 that enables the processor(s) 2702 to perform one or more operations. In some examples, the NAT proxy engine 2920 can perform one or more of the steps described above with respect to FIG. 5 or FIG. 6. For example, the NAT proxy engine 2902 may obtain a communication received by the wireless transceiver 2706 that includes a performance metric of one or more devices on a local area network that share a common network service provider with the access device 2700. The NAT proxy engine 2720 can determine that the access device 2700 is selected for operating as the proxy NAT device for the devices and can aggregate NAT traversal for the devices by, at least in part, establishing a single NAT connection with the common network service provider, as described above with respect to FIG. 5. The NAT proxy engine 2720 can then send a signal to the transceiver 2706 to transmit the communications of the devices over the single NAT connection with the common network service provider. In another example, the NAT proxy engine 2902 may obtain a first communication received by the wireless transceiver 2706 that includes a performance metric of one or more devices on the local area network that share a common network service provider with the access device 2700. The NAT proxy engine 2720 can determine that another device is selected for operating as the proxy NAT device for the access device 2700, as described above with respect to FIG. 6. The NAT proxy engine 2720 can then send a signal to the transceiver 2706 to transmit to the proxy NAT device a second communications destined for the common network service provider. The proxy NAT device can then send the second communication to the common network service provider over a single NAT connection for the devices that is established by the proxy NAT device.

The access device 2700 may further include (and/or be in communication with) one or more non-transitory machine-readable storage mediums or storage devices (e.g., memory 2712), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 2712, such as RAM, ROM, FLASH, or disc drive, and executed by processor(s) 2702 or DSP 2704. The access device 2700 can also comprise software elements (e.g., located within the memory 2712), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 5 or FIG. 6, may be implemented as code and/or instructions executable by a computer (and/or a processor within a computer); in an aspect, then, such code and/or instructions can be used to configure and/or adapt a computer (or other device) to perform one or more operations in accordance with the described methods. Such functions or code may include code to perform the steps described above with respect to FIG. 5 or FIG. 6. The memory 2712 may be a non-transitory machine-readable storage medium, processor-readable memory, and/or a computer-readable memory that stores the one or more computer-program products configured to cause the processor(s) 2702 to perform the functions described. In other embodiments, one or more of the functions described may be performed in hardware.

A set of these instructions and/or code might be stored on a non-transitory machine-readable storage medium, such as the memory 2712. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a computer with the instructions/code stored thereon. These instructions of one or more computer-program products might take the form of executable code, which is executable by the access device 2700 and/or might take the form of source and/or installable code, which, upon compilation and/or installation on the access device 2700 (e.g., using any of a variety of generally available compilers, installation programs, compression/decompression utilities, etc.) then takes the form of executable code.

Figure 28:
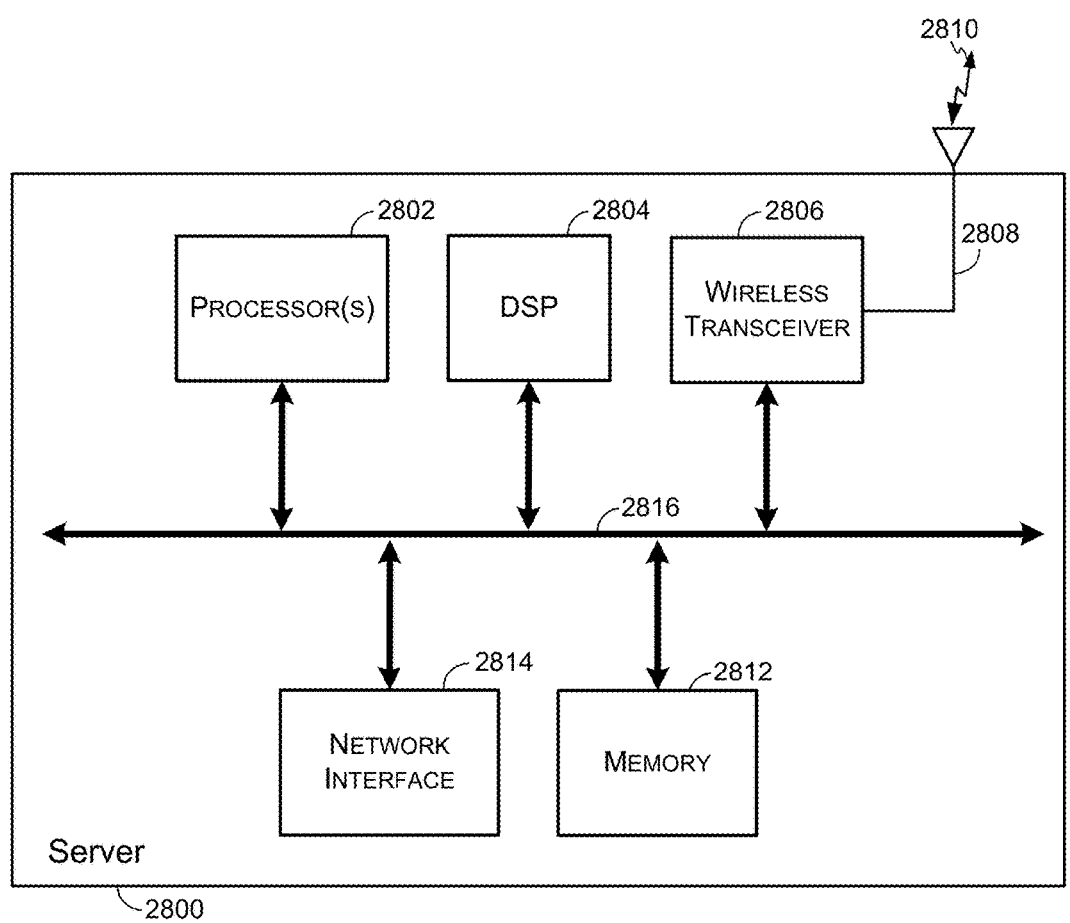
FIG. 28 is a block diagram illustrating an example of a server, in accordance with some embodiments.

FIG. 28 illustrates an example of a server 2800. The server 2800 includes hardware elements that can be electrically coupled via a bus 2816 (or may otherwise be in communication, as appropriate). In one embodiment, the bus 2816 can be used for the processor(s) 2802 to communicate between cores and/or with the memory 2812. The hardware elements may include one or more processors 2802, including without limitation one or more processors, such as digital signal processing chips, graphics acceleration processors, and/or other suitable processor, memory 2812, DSP 2804, a wireless transceiver 2806, a bus 2816, and antenna 2808. Furthermore, in addition to the wireless transceiver 2806, server 2800 can further include a network interface 2814 to communicate with a network (e.g., a local area network, a network of a preferred carrier, Internet, etc.).

The server 2800 may further include (and/or be in communication with) one or more non-transitory machine-readable storage mediums or storage devices (e.g., memory 2812), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more one or more computer-program products, such as instructions or code, in memory 2812. The server 2800 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement various methods and/or configure various systems. The memory 2812 may be a non-transitory machine-readable storage medium, processor-readable memory, and/or a computer-readable memory that stores the one or more computer-program products configured to cause the processor(s) 1602 to perform the various functions. In other embodiments, one or more functions may be performed in hardware.

Figure 29:
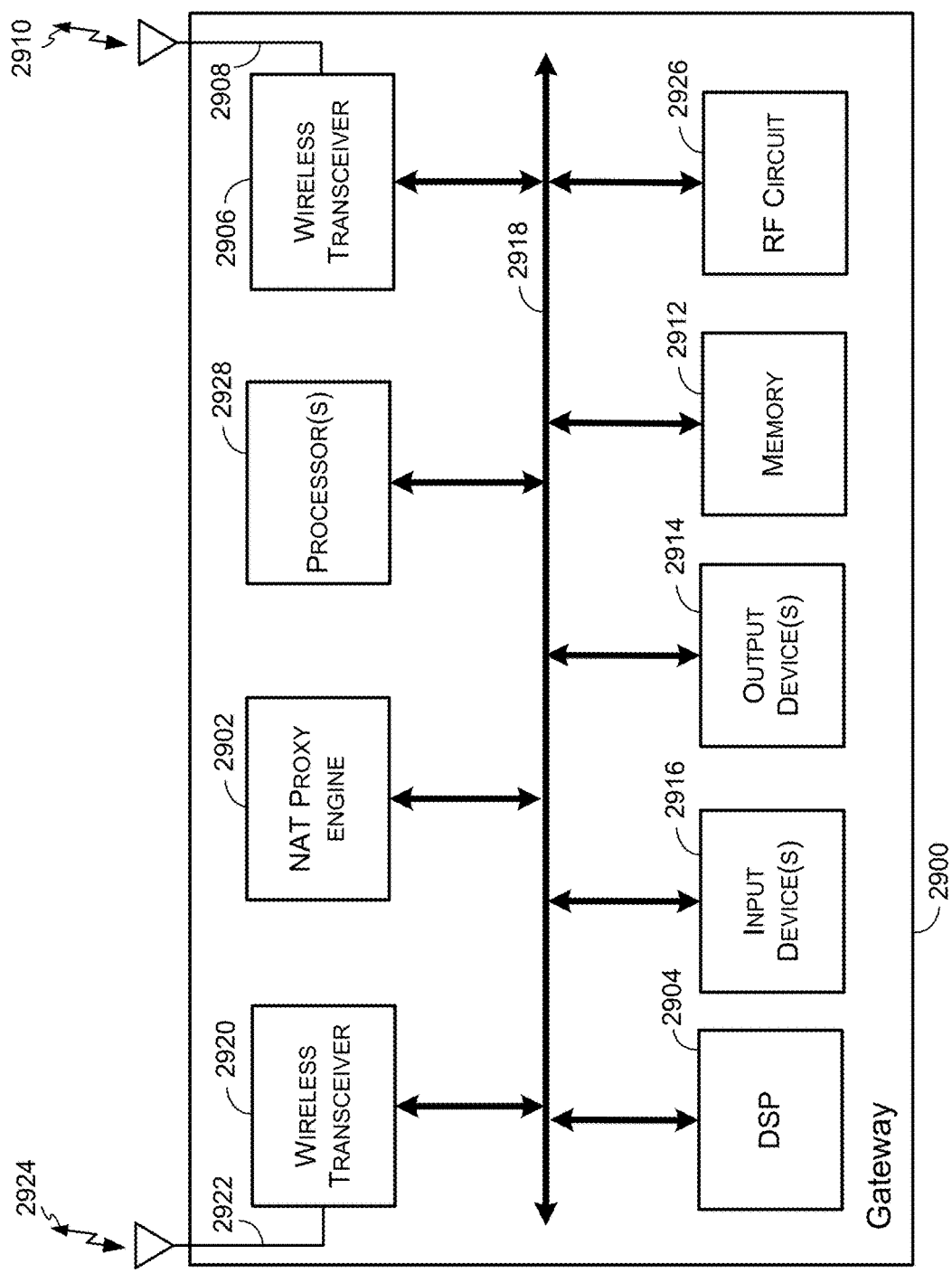
FIG. 29 is a block diagram illustrating an example of a gateway, in accordance with some embodiments.

FIG. 29 illustrates an example of a gateway 2900. The gateway 2900 may include a range extending device, a router, an access point, a modem, and/or any other device that provides network access among one or more computing devices and/or external networks. For example, the gateway 2900 may include a router gateway with access point and router functionality, and may further include an Ethernet switch and/or a modem. As another example, the gateway 2900 may include a range extending gateway that may be used to improve signal range and strength within a network by taking an existing signal from another gateway (e.g., a router gateway, an access point, or the like) and rebroadcasting the signal to create a second logical network.

The gateway 2900 includes hardware elements that can be electrically coupled via a bus 2918 (or may otherwise be in communication, as appropriate). In one embodiment, the bus 2918 can be used for the processor(s) 2928 to communicate between cores and/or with the memory 2912. The hardware elements may include the one or more processors 2928, such as digital signal processing chips, graphics acceleration processors, and/or the like; one or more input devices 2916, such as a keyboard, a keypad, a touch sensitive screen, a touch pad, and/or the like; and one or more output devices 2914, which can include, without limitation, a display, light or sound indicators, and/or the like.

The gateway 2900 may include one or more wireless transceivers 2906 and 2920 connected to the bus 2918. The wireless transceiver 2906 may be operable to receive wireless signals (e.g., a wireless signal 2910) via an antenna 2908. The wireless transceivers 2920 may be operable to receive wireless signals (e.g., a wireless signal 2914) via an antenna 2922. The wireless transceivers 2906 and 2920 may each include a transceiver radio designed to transmit and receive signals using frequencies of a specific frequency band. For example, wireless transceiver 2906 may include a 2.4 GHz WiFi transceiver radio circuit, and wireless transceiver 2920 may include a 5 GHz WiFi transceiver radio circuit. Accordingly, the gateway 2900 may include a single transceiver radio circuit for a first frequency band, and a single transceiver radio circuit for a second frequency band. In some embodiments, the gateway 2900 may include multiple wireless transceivers (not shown) for each available frequency band. The antennas 2908 and 2922 may include multiple band antennas that can transmit and/or receive signals over different frequency bands.

The gateway 2900 may further include radio frequency (RF) circuit 2926. In some embodiments, the wireless transceivers 2906 and 2920 may be integrated with or coupled to the RF circuit 2926 so that the RF circuit 2926 includes the wireless transceivers 2906 and 2920. In some embodiments, the wireless transceivers 2906 and 2920 and the RF circuit 2926 are separate components. The RF circuit 2926 may include a RF amplifier that may amplify signals received over antennas 2908 and 2922. The RF circuit 2926 may also include a power controller that may be used to adjust signal amplification by the RF amplifier. The power controller may be implemented using hardware, firmware, software, or any combination thereof.

The wireless signals 2910 and 2924 may be transmitted via a wireless network. In some embodiments, the wireless network may be any wireless network including but not limited to a local area network (e.g., local area network 100 or 200), such as WiFi, a Personal Access Network (PAN), such as Bluetooth™, Zigbee™, or the like, or a wide area network, such as a cellular network (e.g. a GSM, WCDMA, LTE, CDMA2000 network), a network, the Internet, or other network. Wireless transceivers 2906 and 2920 may be configured to receive various radio frequency (RF) signals (e.g., signals 2910 and 2924) via antennas 2908 and 2924, respectively, from one or more other gateways, access devices, network devices, networks, and/or the like. Gateway 2900 may also be configured to decode and/or decrypt, via the DSP 2904 and/or processor(s) 2928, various signals received from one or more gateways, network devices, networks, and/or the like.

The gateway 2900 may include a power supply (not shown) that can power the various components of the gateway 2900. The power supply may include a switch-mode power supply, a linear power supply, a push-pull power supply, or any other suitable type of power supply. In some embodiments, the gateway 2900 may include multiple power supplies. For example, a switch-mode power supply may be used to condition input power, and a linear power supply may be used to power the RF circuit 2926. The power supply may be configured to operate over various ranges of appropriate input voltages.

The gateway 2900 further includes a network address translation (NAT) proxy engine 2902. For example, program code can include the NAT proxy engine 2902 that enables the processor(s) 2928 to perform one or more operations. For example, the NAT proxy engine 2902 can perform one or more of the steps described above with respect to FIG. 7. In some examples, the NAT proxy engine 2902 may obtain a communication received by the wireless transceiver 2906 or transceiver 2920 that includes an indication that the gateway device is selected for operating as a proxy NAT device for devices on a local area network that share a common network service provider. The gateway 2900 provides the devices with access to the local area network. The NAT proxy engine 2902 can determine that the gateway device is selected for operation as the proxy NAT device for the devices and can aggregate NAT traversal for the devices by, at least in part, establishing a single NAT connection with the common network service provider, as described above with respect to FIG. 7. The NAT proxy engine 2728 can then send a signal to the transceiver 2906 or transceiver 2920 to transmit the communications of the devices over the single NAT connection with the common network service provider.

The gateway 2900 may further include (and/or be in communication with) one or more non-transitory machine-readable storage mediums or storage devices (e.g., memory 2912), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 2912, such as RAM, ROM, FLASH, or disc drive, and executed by processor(s) 2928 or DSP 2904. The gateway 2900 can also comprise software elements (e.g., located within the memory 2912), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 7 and FIG. 18, may be implemented as code and/or instructions executable by a computer (and/or a processor within a computer); in an aspect, then, such code and/or instructions can be used to configure and/or adapt a computer (or other device) to perform one or more operations in accordance with the described methods. Such functions or code may include code to perform operations described above with respect to FIG. 7 and FIG. 18. The memory 2912 may be a non-transitory machine-readable storage medium, processor-readable memory, and/or a computer-readable memory that stores the one or more computer-program products configured to cause the processor(s) 2928 to perform the functions described. In other embodiments, one or more of the functions described may be performed in hardware.

A set of these instructions and/or code might be stored on a non-transitory machine-readable storage medium, such as the memory 2912. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a computer with the instructions/code stored thereon. These instructions of one or more computer-program products might take the form of executable code, which is executable by the gateway 2900 and/or might take the form of source and/or installable code, which, upon compilation and/or installation on the gateway 2900 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of this disclosure are described with reference to specific embodiments thereof, but those skilled in the art will recognize that the disclosure is not limited thereto. Various features and aspects of the above-described embodiments and examples may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

As used below, any reference to a series of examples is to be understood as a reference to each of those examples disjunctively (e.g., "Examples 1-4" is to be understood as "Examples 1, 2, 3, or 4").

Example 1 is a computing device, comprising: one or more processors; a receiver configured to receive a communication, wherein the communication includes a performance metric of one or more devices on a local network, wherein the computing device and the one or more devices share a common network service provider; and a non-transitory machine-readable storage medium containing instructions which when executed on the one or more data processors, cause the one or more processors to perform operations including: determining that the computing device is selected for operating as a proxy network address translation device for the one or more devices that share the common network service provider, wherein determining that the computing device is selected is based on the performance metric; aggregating network address translation traversal for the one or more devices that share the common network service provider, wherein aggregating network address translation traversal includes establishing a single network address translation connection with the common network service provider, and wherein communications of the one or more devices are communicated over the single network address translation connection; and causing a transmitter to transmit communications of the one or more devices, wherein the communications of the one or more devices are transmitted over the single network address translation connection with the common network service provider.

Example 2 is the computing device of example 1, further comprising instructions which when executed on the one or more data processors, cause the one or more processors to perform operations including: comparing a performance metric of the computing device with the received performance metric of the one or more devices; and determining that the computing device is selected for operating as the proxy network address translation device for the one or more devices when the performance metric of the computing device outperforms the performance metric of the one or more devices.

Example 3 is the computing device of examples 1-2, wherein the performance metric includes signal strength, a number of hops, processing power, connection reliability, or duty cycle.

Example 4 is the computing device of examples 1-3, further comprising instructions which when executed on the one or more data processors, cause the one or more processors to perform operations including: determining whether the computing device has an existing connection to the common network service provider; and determining that the computing device is selected for operating as the proxy network address translation device for the one or more devices when the computing device has an existing connection to the common network service provider.

Example 5 is the computing device of examples 1-4, further comprising instructions which when executed on the one or more data processors, cause the one or more processors to cause the transmitter to transmit a request message to the one or more devices, wherein the request message includes a request for each of the one or more devices to send the performance metric.

Example 6 is the computing device of examples 1-5, wherein the performance metric of one or more devices is periodically received.

Example 7 is the computing device of examples 1-6, further comprising instructions which when executed on the one or more data processors, cause the one or more processors to cause the transmitter to transmit a query, wherein the query includes a request for selection of the computing device as the proxy network address translation device for the one or more devices.

Example 8 is the computing device of examples 1-7, wherein the receiver is configured to receive a response to the query indicating that the computing device is selected as the proxy network address translation device for the one or more device.

Example 9 is the computing device of examples 1-8, further comprising: wherein the receiver is configured to receive a network communication, wherein the network communication includes a unique identifier assigned to a destination device for the network communication, and wherein the network communication is received over the single network address translation connection with the common network service provider; and instructions which when executed on the one or more data processors, cause the one or more processors to determine the destination device for the network communication, wherein the destination device is determined by comparing the unique identifier to a table of unique identifiers assigned to the computing device and the one or more devices.

Example 10 is a computer-implemented method, comprising: receiving, by a computing device, a communication, wherein the communication includes a performance metric of one or more devices on a local network, wherein the computing device and the one or more devices share a common network service provider; determining that the computing device is selected for operating as a proxy network address translation device for the one or more devices that share the common network service provider, wherein determining that the computing device is selected is based on the performance metric; aggregating network address translation traversal for the one or more devices that share the common network service provider, wherein aggregating network address translation traversal includes establishing a single network address translation connection with the common network service provider, and wherein communications of the one or more devices are communicated over the single network address translation connection; and causing a transmitter to transmit communications of the one or more devices, wherein the communications of the one or more devices are transmitted over the single network address translation connection with the common network service provider.

Example 11 is the method of example 10, further comprising: comparing a performance metric of the computing device with the received performance metric of the one or more devices; and determining that the computing device is selected for operating as the proxy network address translation device for the one or more devices when the performance metric of the computing device outperforms the performance metric of the one or more devices.

Example 12 is the method of examples 10-11, wherein the performance metric includes signal strength, a number of hops, processing power, connection reliability, or duty cycle.

Example 13 is the method of examples 10-12, further comprising: determining whether the computing device has an existing connection to the common network service provider; and determining that the computing device is selected for operating as the proxy network address translation device for the one or more devices when the computing device has an existing connection to the common network service provider.

Example 14 is the method of examples 10-13, further comprising: causing the transmitter to transmit a request message to the one or more devices, wherein the request message includes a request for each of the one or more devices to send the performance metric.

Example 15 is the method of examples 10-14, wherein the performance metric of one or more devices is periodically received.

Example 16 is the method of examples 10-15, further comprising: causing the transmitter to transmit a query, wherein the query includes a request for selection of the computing device as the proxy network address translation device for the one or more devices.

Example 17 is the method of examples 10-16, further comprising: receiving a response to the query indicating that the computing device is selected as the proxy network address translation device for the one or more device.

Example 18 is the method of examples 10-17, further comprising: receiving a network communication, wherein the network communication includes a unique identifier assigned to a destination device for the network communication, and wherein the network communication is received over the single network address translation connection with the common network service provider; and determining the destination device for the network communication, wherein the destination device is determined by comparing the unique identifier to a table of unique identifiers assigned to the computing device and the one or more devices.

Example 19 is a computer-program product tangibly embodied in a non-transitory machine-readable storage medium of a computing device, including instructions configured to cause one or more data processors to: receive a communication, wherein the communication includes a performance metric of one or more devices on a local network, wherein the computing device and the one or more devices share a common network service provider; determine that the computing device is selected for operating as a proxy network address translation device for the one or more devices that share the common network service provider, wherein determining that the computing device is selected is based on the performance metric; aggregate network address translation traversal for the one or more devices that share the common network service provider, wherein aggregating network address translation traversal includes establishing a single network address translation connection with the common network service provider, and wherein communications of the one or more devices are communicated over the single network address translation connection; and cause a transmitter to transmit communications of the one or more devices, wherein the communications of the one or more devices are transmitted over the single network address translation connection with the common network service provider.

Example 20 is the computer-program product of example 19, further comprising instructions configured to cause the one or more data processors to: compare a performance metric of the computing device with the received performance metric of the one or more devices; and determine that the computing device is selected for operating as the proxy network address translation device for the one or more devices when the performance metric of the computing device outperforms the performance metric of the one or more devices.

Example 21 is the computer-program product of examples 19-20, wherein the performance metric includes signal strength, a number of hops, processing power, connection reliability, or duty cycle.

Example 22 is the computer-program product of examples 19-21, further comprising instructions configured to cause the one or more data processors to: determine whether the computing device has an existing connection to the common network service provider; and determine that the computing device is selected for operating as the proxy network address translation device for the one or more devices when the computing device has an existing connection to the common network service provider.

Example 23 is the computer-program product of examples 19-22, further comprising instructions configured to cause the one or more data processors to: cause the transmitter to transmit a request message to the one or more devices, wherein the request message includes a request for each of the one or more devices to send the performance metric.

Example 24 is the computer-program product of examples 19-23, wherein the performance metric of one or more devices is periodically received.

Example 25 is the computer-program product of examples 19-24, further comprising instructions configured to cause the one or more data processors to: cause the transmitter to transmit a query, wherein the query includes a request for selection of the computing device as the proxy network address translation device for the one or more devices.

Example 26 is the computer-program product of examples 19-25, further comprising instructions configured to cause the one or more data processors to: receive a response to the query indicating that the computing device is selected as the proxy network address translation device for the one or more device.

Example 27 is the computer-program product of examples 19-26, further comprising instructions configured to cause the one or more data processors to: receive a network communication, wherein the network communication includes a unique identifier assigned to a destination device for the network communication, and wherein the network communication is received over the single network address translation connection with the common network service provider; and determine the destination device for the network communication, wherein the destination device is determined by comparing the unique identifier to a table of unique identifiers assigned to the computing device and the one or more devices.

Example 28 is a computing device, comprising: one or more processors; a receiver configured to receive a first communication, wherein the first communication includes a performance metric of one or more devices on a local network, and wherein the computing device and the one or more devices share a common network service provider; and a non-transitory machine-readable storage medium containing instructions which when executed on the one or more data processors, cause the one or more processors to perform operations including: determining that another device is selected for operating as a proxy network address translation device for the computing device, wherein determining that the other device is selected is based on the performance metric; and causing a transmitter to transmit a second communication destined for the common network service provider, wherein the second communication is transmitted over a connection with the other device, and wherein the second communication is communicated to the common network service provider by the other device.

Example 29 is the computing device of example 28, further comprising instructions which when executed on the one or more data processors, cause the one or more processors to perform operations including: comparing a performance metric of the computing device with the received performance metric of the one or more devices; and determining that the other device is selected for operating as the proxy network address translation device for the computing device when the performance metric of the computing device is outperformed by the performance metric of the other device.

Example 30 is the computing device of examples 28-29, further comprising: wherein the receiver is configured to receive a query, and wherein the query includes a request for selection of the other device as the proxy network address translation device for the computing device; and instructions which when executed on the one or more data processors, cause the one or more processors to cause the transmitter to transmit a response to the query, wherein the response indicates that the other device is selected as the proxy network address translation device for the computing device.

Example 31 is the computing device of examples 28-30, further comprising instructions which when executed on the one or more data processors, cause the one or more processors to cause the transmitter to transmit a message, wherein the message indicates that the other device is selected as the proxy network address translation device for the computing device.

Example 32 is the computing device of examples 28-31, wherein the performance metric includes signal strength, a number of hops, processing power, connection reliability, or duty cycle.

Example 33 is the computing device of examples 28-32, further comprising instructions which when executed on the one or more data processors, cause the one or more processors to perform operations including: determining whether the other device has an existing connection to the common network service provider; and determining that the other device is selected for operating as the proxy network address translation device for the computing device when the other device has an existing connection to the common network service provider.

Example 34 is the computing device of examples 28-33, further comprising instructions which when executed on the one or more data processors, cause the one or more processors to cause the transmitter to transmit a request message to the one or more devices, wherein the request message includes a request for each of the one or more devices to send the performance metric.

Example 35 is the computing device of examples 28-34, wherein the performance metric of one or more devices is periodically received.

Example 36 is a computer-implemented method, comprising: receiving, by a computing device, a first communication, wherein the first communication includes a performance metric of one or more devices on a local network, and wherein the computing device and the one or more devices share a common network service provider; determining that another device is selected for operating as a proxy network address translation device for the computing device, wherein determining that the other device is selected is based on the performance metric; and causing a transmitter to transmit a second communication destined for the common network service provider, wherein the second communication is transmitted over a connection with the other device, and wherein the second communication is communicated to the common network service provider by the other device.

Example 37 is the method of example 36, further comprising comparing a performance metric of the computing device with the received performance metric of the one or more devices; and determining that the other device is selected for operating as the proxy network address translation device for the computing device when the performance metric of the computing device is outperformed by the performance metric of the other device.

Example 38 is the method of examples 36-37, further comprising: receiving a query, and wherein the query includes a request for selection of the other device as the proxy network address translation device for the computing device; and transmitting a response to the query, wherein the response indicates that the other device is selected as the proxy network address translation device for the computing device.

Example 39 is the method of examples 36-38, further comprising transmitting a message, wherein the message indicates that the other device is selected as the proxy network address translation device for the computing device.

Example 40 is the method of examples 36-39, wherein the performance metric includes signal strength, a number of hops, processing power, connection reliability, or duty cycle.

Example 41 is the method of examples 36-40, further comprising: determining whether the other device has an existing connection to the common network service provider; and determining that the other device is selected for operating as the proxy network address translation device for the computing device when the other device has an existing connection to the common network service provider.

Example 42 is the method of examples 36-41, further comprising transmitting a request message to the one or more devices, wherein the request message includes a request for each of the one or more devices to send the performance metric.

Example 43 is the method of examples 36-42, wherein the performance metric of one or more devices is periodically received.

Example 44 is a computer-program product tangibly embodied in a non-transitory machine-readable storage medium of a computing device, including instructions configured to cause one or more data processors to: receive a first communication, wherein the first communication includes a performance metric of one or more devices on a local network, and wherein the computing device and the one or more devices share a common network service provider; determine that another device is selected for operating as a proxy network address translation device for the computing device, wherein determining that the other device is selected is based on the performance metric; and cause a transmitter to transmit a second communication destined for the common network service provider, wherein the second communication is transmitted over a connection with the other device, and wherein the second communication is communicated to the common network service provider by the other device.

Example 45 is the computer-program product of example 44, further comprising instructions configured to cause the one or more data processors to: compare a performance metric of the computing device with the received performance metric of the one or more devices; and determine that the other device is selected for operating as the proxy network address translation device for the computing device when the performance metric of the computing device is outperformed by the performance metric of the other device.

Example 46 is the computer-program product of examples 44-45, further comprising instructions configured to cause the one or more data processors to: receive a query, and wherein the query includes a request for selection of the other device as the proxy network address translation device for the computing device; and transmit a response to the query, wherein the response indicates that the other device is selected as the proxy network address translation device for the computing device.

Example 47 is the computer-program product of examples 44-46, further comprising instructions configured to cause the one or more data processors to: transmit a message, wherein the message indicates that the other device is selected as the proxy network address translation device for the computing device.

Example 48 is the computer-program product of examples 44-47, wherein the performance metric includes signal strength, a number of hops, processing power, connection reliability, or duty cycle.

Example 49 is the computer-program product of examples 44-48, further comprising instructions configured to cause the one or more data processors to: determine whether the other device has an existing connection to the common network service provider; and determine that the other device is selected for operating as the proxy network address translation device for the computing device when the other device has an existing connection to the common network service provider.

Example 50 is the computer-program product of examples 44-49, further comprising instructions configured to cause the one or more data processors to: transmit a request message to the one or more devices, wherein the request message includes a request for each of the one or more devices to send the performance metric.

Example 51 is the computer-program product of examples 44-50, wherein the performance metric of one or more devices is periodically received.

Example 52 is a gateway device, comprising: one or more processors; a receiver configured to receive a communication, wherein the communication includes an indication that the gateway device is selected for operating as a proxy network address translation device for one or more devices on a local network, and wherein the one or more devices share a common network service provider; and a non-transitory machine-readable storage medium containing instructions which when executed on the one or more data processors, cause the one or more processors to perform operations including: determining that the gateway device is selected for operating as a proxy network address translation device for the one or more devices that share the common network service provider, wherein determining that the gateway device is selected is based on the received communication; and aggregating network address translation traversal for the one or more devices that share the common network service provider, wherein aggregating network address translation traversal includes establishing a single network address translation connection with the common network service provider, and wherein communications of the one or more devices are communicated over the single network address translation connection; and a transmitter configured to transmit communications of the one or more devices, wherein the communications of the one or more devices are transmitted over the single network address translation connection with the common network service provider.

Example 53 is the gateway device of example 52, wherein the gateway device is selected for operating as the proxy network address translation device for one or more devices based on a comparison of a performance metric of the gateway device with a performance metric of the one or more devices.

Example 54 is the gateway device of examples 52-53, wherein the performance metric includes signal strength, a number of hops, processing power, connection reliability, or duty cycle.

Example 55 is the gateway device of examples 52-54, further comprising: wherein the receiver is configured to receive a network communication, wherein the network communication includes a unique identifier assigned to a destination device for the network communication, and wherein the network communication is received over the single network address translation connection with the common network service provider; and instructions which when executed on the one or more data processors, cause the one or more processors to determine the destination device for the network communication, wherein the destination device is determined by comparing the unique identifier to a table of unique identifiers assigned to the one or more devices.

Example 56 is a computer-implemented method, comprising: receiving, at a gateway device, a communication, wherein the communication includes an indication that the gateway device is selected for operating as a proxy network address translation device for one or more devices on a local network, and wherein the one or more devices share a common network service provider; determining that the gateway device is selected for operating as a proxy network address translation device for the one or more devices that share the common network service provider, wherein determining that the gateway device is selected is based on the received communication; aggregating network address translation traversal for the one or more devices that share the common network service provider, wherein aggregating network address translation traversal includes establishing a single network address translation connection with the common network service provider, and wherein communications of the one or more devices are communicated over the single network address translation connection; and transmitting communications of the one or more devices, wherein the communications of the one or more devices are transmitted over the single network address translation connection with the common network service provider.

Example 57 is the method of example 56, wherein the gateway device is selected for operating as the proxy network address translation device for one or more devices based on a comparison of a performance metric of the gateway device with a performance metric of the one or more devices.

Example 58 is the method of examples 56-57, wherein the performance metric includes signal strength, a number of hops, processing power, connection reliability, or duty cycle.

Example 59 is the method of examples 56-58, further comprising: receiving a network communication, wherein the network communication includes a unique identifier assigned to a destination device for the network communication, and wherein the network communication is received over the single network address translation connection with the common network service provider; and determining the destination device for the network communication, wherein the destination device is determined by comparing the unique identifier to a table of unique identifiers assigned to the one or more devices.

Example 60 is a computer-program product tangibly embodied in a non-transitory machine-readable storage medium of a computing device, including instructions configured to cause one or more data processors to: receive a communication, wherein the communication includes an indication that the gateway device is selected for operating as a proxy network address translation device for one or more devices on a local network, and wherein the one or more devices share a common network service provider; determine that the gateway device is selected for operating as a proxy network address translation device for the one or more devices that share the common network service provider, wherein determining that the gateway device is selected is based on the received communication; aggregate network address translation traversal for the one or more devices that share the common network service provider, wherein aggregating network address translation traversal includes establishing a single network address translation connection with the common network service provider, and wherein communications of the one or more devices are communicated over the single network address translation connection; and transmit communications of the one or more devices, wherein the communications of the one or more devices are transmitted over the single network address translation connection with the common network service provider.

Example 61 is the computer-program product of example 60, wherein the gateway device is selected for operating as the proxy network address translation device for one or more devices based on a comparison of a performance metric of the gateway device with a performance metric of the one or more devices.

Example 62 is the computer-program product of examples 60-61, wherein the performance metric includes signal strength, a number of hops, processing power, connection reliability, or duty cycle.

Example 63 is the computer-program product of examples 60-62, further including instructions configured to cause the computing device to: receive a network communication, wherein the network communication includes a unique identifier assigned to a destination device for the network communication, and wherein the network communication is received over the single network address translation connection with the common network service provider; and determine the destination device for the network communication, wherein the destination device is determined by comparing the unique identifier to a table of unique identifiers assigned to the one or more devices.

Example 64 is a computer implemented method, comprising: receiving, at a computing device, network connectivity status information for a plurality of network devices distributed across a plurality of remote networks; identifying a network deficiency using the network connectivity status information; identifying a location of the network deficiency using the network connectivity status information; and transmitting a notification of the network deficiency including the location of the network deficiency, wherein when the notification is received, the notification is used to improve the network deficiency.

Example 65 is the method of example 64, wherein the notification includes instructions for improving the network deficiency.

Example 66 is the method of examples 64-65, wherein the instructions are to reset, update or disable a malfunctioning network device.

Example 67 is the method of examples 64-66, receiving system status information for one or more service providers, wherein identifying the network deficiency and identifying the location of the network deficiency includes using the system status information.

Example 68 is the method of examples 64-67, wherein identifying the network deficiency or identifying the location of the network deficiency includes identifying a pattern in the network connectivity status information.

Example 69 is the method of examples 64-68, further comprising: transmitting a query relating to the network deficiency; and receiving a response or detecting a lack of response to the query, wherein identifying the location of the network deficiency includes using the response or lack of response to the query.

Example 70 is the method of examples 64-69, wherein the query requests information from one or more network devices on a remote network that includes the network deficiency.

Example 71 is the method of examples 64-70, wherein the location of the network deficiency includes an extent of the network deficiency.

Example 72 is a system, comprising: one or more data processors; and a non-transitory computer-readable storage medium containing instructions, which when executed on the one or more data processors, cause the one or more data processors to perform operations including: receiving network connectivity status information for a plurality of network devices distributed across a plurality of remote networks; identifying a network deficiency using the network connectivity status information; identifying a location of the network deficiency using the network connectivity status information; and transmitting a notification of the network deficiency including the location of the network deficiency.

Example 73 is the system of example 72, wherein the notification includes improvement instructions for improving the network deficiency.

Example 74 is the system of examples 72-73, wherein the improvement instructions are to reset, update or disable a malfunctioning network device.

Example 75 is the system of examples 72-74, the operations further comprising: receiving system status information for one or more service providers, wherein identifying the network deficiency and the location of the network deficiency includes using the system status information.

Example 76 is the system of examples 72-75, wherein identifying the network deficiency or identifying the location of the network deficiency includes identifying a pattern in the network connectivity status information.

Example 77 is the system of examples 72-76, the operations further comprising: transmitting a query relating to the network deficiency; and receiving a response or lack of response to the query, wherein identifying the location of the network deficiency includes using the response or lack of response to the query.

Example 78 is the system of examples 72-77, wherein the query requests information from one or more network devices on a remote network that includes the network deficiency.

Example 79 is the system of examples 72-78, wherein the location of the network deficiency includes an extent of the network deficiency.

Example 80 is a computer-program product tangibly embodied in a non-transitory machine-readable storage medium, including instructions configured to cause a computing device to: receive network connectivity status information for a plurality of network devices distributed across a plurality of remote networks; identify a network deficiency using the network connectivity status information; identify a location of the network deficiency using the network connectivity status information; and transmit a notification of the network deficiency including the location of the network deficiency.

Example 81 is the computer-program product of example 80, wherein the notification includes improvement instructions for improving the network deficiency.

Example 82 is the computer-program product of examples 80-81, wherein the improvement instructions are to reset, update or disable a malfunctioning network device.

Example 83 is the computer-program product of examples 80-82, further including instructions configured to cause the computing device to: receive system status information for one or more service providers, wherein the instructions configured to cause the computing device to identify the network deficiency and identify the location of the network deficiency include causing the computing device to use the system status information.

Example 84 is the computer-program product of examples 80-83, wherein the instructions configured to cause the computing device to identify the network deficiency or the location of the network deficiency include causing the computing device to identify a pattern in the network connectivity status information.

Example 85 is the computer-program product of examples 80-84, further including instructions configured to cause the computing device to: transmit a query relating to the network deficiency; and receive a response or lack of response to the query, wherein the instructions configured to cause the computing device to identify the location of the network deficiency include causing the computing device to identify the location of the network deficiency using the response or lack of response to the query.

Example 86 is the computer-program product of examples 80-85, wherein the query requests information from one or more network devices on a network that includes the network deficiency.

Example 87 is the computer-program product of examples 80-86, wherein the location of the network deficiency includes an extent of the network deficiency.

Example 88 is a computer implemented method, comprising: determining, by a computing device associated with a local area network, a loss of service provider connectivity at a network device associated with the local area network; transmitting a query requesting network connectivity status information for one or more other network devices associated with the local area network, wherein the network connectivity status information includes service provider connectivity and local area network connectivity; receiving the network connectivity status information in response to the query; analyzing the network connectivity status information; and generating instructions for restoring connectivity between the network device and the service provider based on the analysis.

Example 89 is the method of example 88, wherein analyzing the network connectivity status information includes identifying a pattern in the network connectivity status information indicative of a network deficiency.

Example 90 is the method of examples 88-89, wherein analyzing the network connectivity status information includes determining a cause for the loss of service provider connectivity.

Example 91 is the method of examples 88-90, wherein analyzing the network connectivity status information includes comparing the network connectivity status information with previous network connectivity status information.

Example 92 is the method of examples 88-91, further comprising: determining that the network device has lost connectivity with the local area network, wherein the instructions include establishing an off-network connection with one or more of the other network devices associated with the local area network.

Example 93 is the method of examples 88-92, wherein the instructions include relaying communications to the service provider using the off-network connection.

Example 94 is the method of examples 88-93, further comprising: transmitting a notification of the instructions or of the loss of service provider connectivity.

Example 95 is the method of examples 88-94, wherein the network device having lost service provider connectivity is the computing device.

Example 96 is the method of examples 88-95, wherein the instructions include resetting or updating the network device or one or more other network devices.

Example 97 is a system, comprising: one or more data processors; and a non-transitory computer-readable storage medium containing instructions, which when executed on the one or more data processors, cause the one or more data processors to perform operations including: determining a loss of service provider connectivity at a network device associated with a local area network; transmitting a query requesting network connectivity status information for one or more other network devices associated with the local area network, wherein the network connectivity status information includes service provider connectivity and local area network connectivity; receiving the network connectivity status information in response to the query; analyzing the network connectivity status information; and generating restoration instructions for restoring connectivity between the network device and the service provider based on the analysis.

Example 98 is the system of example 97, wherein analyzing the network connectivity status information includes identifying a pattern in the network connectivity status information indicative of a network deficiency.

Example 99 is the system of examples 97-98, wherein analyzing the network connectivity status information includes determining a cause for the loss of service provider connectivity.

Example 100 is the system of examples 97-99, wherein analyzing the network connectivity status information includes comparing the network connectivity status information with previous network connectivity status information.

Example 101 is the system of examples 97-100, the operations further comprising: determining that the network device has lost connectivity with the local area network, wherein the restoration instructions include establishing an off-network connection with one or more network devices associated with the local area network.

Example 102 is the system of examples 97-101, wherein the restoration instructions include relaying communications to the service provider using the off-network connection.

Example 103 is the system of examples 97-102, the operations further comprising: transmitting a notification of the restoration instructions or of the loss of service provider connectivity.

Example 104 is the system of examples 97-103, wherein the network device includes the one or more data processors.

Example 105 is a computer-program product tangibly embodied in a non-transitory machine-readable storage medium, including instructions configured to cause a computing device to: determine a loss of service provider connectivity at a network device associated with a local area network; transmit a query requesting network connectivity status information for one or more other network devices associated with the local area network, wherein the network connectivity status information includes service provider connectivity and local area network connectivity; receive the network connectivity status information in response to the query; analyze the network connectivity status information; and generate restoration instructions for restoring connectivity between the network device and the service provider based on the analysis.

Example 106 is the computer-program product of example 105, wherein analyzing the network connectivity status information includes identifying a pattern in the network connectivity status information indicative of a network deficiency.

Example 107 is the computer-program product of examples 105-106, wherein analyzing the network connectivity status information includes determining a cause for the loss of service provider connectivity.

Example 108 is the computer-program product of examples 105-107, wherein analyzing the network connectivity status information includes comparing the network connectivity status information with previous network connectivity status information.

Example 109 is the computer-program product of examples 105-108, further including instructions configured to cause the computing device to: determine that the network device has lost connectivity with the local area network, wherein the restoration instructions include establishing an off-network connection with one or more of the other network devices associated with the local area network.

Example 110 is the computer-program product of examples 105-109, wherein the restoration instructions include relaying communications to the service provider using the off-network connection.

Example 111 is the computer-program product of examples 105-110, further including instructions configured to cause the computing device to: transmit a notification of the restoration instructions or of the loss of service provider connectivity.

What is claimed is:

1. A computing device, comprising:
   one or more processors;
   a transceiver configured to receive communications from a plurality of devices in a network, wherein the computing device and one or more devices of the plurality of devices in the network share a common network service provider, wherein a first device of the one or more devices acts as a proxy network address translation device for the one or more devices sharing the common network service provider, wherein a gateway device in the network acts as a network address translation device for the computing device and the plurality of devices, and wherein the computing device and the plurality of devices are client devices; and
   a non-transitory machine-readable storage medium containing instructions which when executed on the one or more processors, cause the one or more processors to perform operations including:
      determining that one or more network performance metrics associated with the computing device are below a threshold value;
      receiving, from each of the one or more devices, one or more network performance metrics associated with the one or more devices;
      generating a comparison value by comparing each of the one or more performance metrics associated with the one or more devices and the one or more network performance metrics associated with the computing device;
      determining that the computing device is selected for operating as a new proxy network address translation device for the one or more devices using the comparison value, wherein the comparison value indicates that the one or more network performance metrics associated with the computing device outperforms the one or more network performance metrics associated with the one or more devices;
      aggregating network address translation traversal for the one or more devices, wherein aggregating the network address translation traversal includes:
         establishing a connection from the computing device to each of the one or more devices;
         establishing a single internal connection from the computing device to the gateway device for the one or more devices, wherein the computing device acts as a network address translator by mapping an Internet Protocol (IP) address of the one or more devices included in communications from the one or more devices to an IP address of the computing device; and
         facilitating a single external connection from the gateway device to the common network service provider to provide communications for each of the one or more devices and the computing device to the common network service provider;
      transmitting communications as the new proxy network address translation device for the one or more devices, wherein the communications of the one or more devices are transmitted over the single internal connection with the gateway device and the single external connection with the common network service provider.

2. The computing device of claim 1, wherein the one or more network performance metrics associated with the one or more devices and the one or more network performance metrics associated with the computing device includes signal strength, a number of hops, processing power, connection reliability, and/or duty cycle.

3. The computing device of claim 1, wherein determining that the computing device is selected for operating as the new proxy network address translation device for the one or more devices is additionally based on the computing device having an existing connection to the common network service provider.

4. The computing device of claim 1, further comprising instructions which when executed on the one or more processors, cause the one or more processors to cause the transceiver to transmit a request message to the one or more devices, wherein the request message includes a request for each of the one or more devices to send the one or more network performance metrics.

5. The computing device of claim 1, wherein the one or more network performance metrics associated with the one or more devices are periodically received.

6. The computing device of claim 1, further comprising: transmitting a query, wherein the query includes a request for selection of the computing device as the new proxy network address translation device for the one or more devices.

7. The computing device of claim 6, further comprising: receiving a response to the query indicating that the computing device is selected as the new proxy network address translation device for the one or more devices.

8. The computing device of claim 1, further comprising: wherein the transceiver is configured to receive a network communication, wherein the network communication includes a unique identifier assigned to a destination device for the network communication, and wherein the network communication is received over the single external connection with the common network service provider; and instructions which when executed on the one or more processors, cause the one or more processors to determine the destination device for the network communication, wherein the destination device is determined by comparing the unique identifier to a table of unique identifiers assigned to the computing device and the one or more devices.

9. A computer-implemented method, comprising:
receiving, by a computing device, one or more network performance metrics associated with each of one or more devices of a plurality of devices in a network, wherein the computing device and the one or more devices share a common network service provider, wherein a first device of the one or more devices acts as a proxy network address translation device for the one or more devices sharing the common network service provider, wherein a gateway device in the network acts as a network address translation device for the plurality of devices in the network, and wherein the computing device and the plurality of devices are client devices;

determining that one or more network performance metrics associated with a particular device of the one or more devices are below a threshold value;

generating a comparison value by comparing the one or more network performance metrics associated with each of the one or more devices and one or more network performance metrics associated with the computing device;

determining that the computing device is selected for operating as a new proxy network address translation device for the one or more devices that share the common network service provider using the comparison value, wherein the comparison value indicates that the one or more network performance metrics associated with the computing device outperforms the one or more network performance metrics associated with the one or more devices;

aggregating network address translation traversal for the one or more devices, wherein aggregating the network address translation traversal includes:
establishing a connection from the computing device to each of the one or more devices;
establishing a single internal connection from the computing device to the gateway device for the one or more devices, wherein the computing device acts as a network address translator by mapping an Internet Protocol (IP) address of the one or more devices included in communications from the one or more devices to an IP address of the computing device; and facilitating a single external connection from the gateway device to the common network service provider to provide communications for each of the one or more devices and the computing device to the common network service provider;
transmitting communications as the new proxy network address translation device for the one or more devices, wherein the communications of the one or more devices are transmitted over the single internal connection with the gateway device and the single external connection with the common network service provider.

10. The method of claim 9, wherein the one or more network performance metrics associated with the one or more devices and the one or more network performance metrics associated with the computing device includes signal strength, a number of hops, processing power, connection reliability, and/or duty cycle.

11. The method of claim 9, wherein determining that the computing device is selected for operating as the new proxy network address translation device for the one or more devices is additionally based on the computing device having an existing connection to the common network service provider.

12. The method of claim 9, further comprising:
transmitting a request message to the one or more devices, wherein the request message includes a request for each of the one or more devices to send the one or more network performance metrics.

13. The method of claim 9, wherein the one or more network performance metrics associated with one or more devices is periodically received.

14. The method of claim 9, further comprising:
transmitting a query, wherein the query includes a request for selection of the computing device as the new proxy network address translation device for the one or more devices.

15. The method of claim 14, further comprising:
receiving a response to the query indicating that the computing device is selected as the new proxy network address translation device for the one or more devices.

16. The method of claim 9, further comprising:
receiving a network communication, wherein the network communication includes a unique identifier assigned to a destination device for the network communication, and wherein the network communication is received over the single external connection with the common network service provider; and
determining the destination device for the network communication, wherein the destination device is determined by comparing the unique identifier to a table of unique identifiers assigned to the computing device and the one or more devices.

17. A computer-program product tangibly embodied in a non-transitory machine-readable storage medium of a computing device, including instructions configured to cause one or more processors to:
receive one or more network performance metrics associated with each of one or more devices of a plurality of devices in a network, wherein the computing device and the one or more devices share a common network service provider, wherein a first device of the one or more devices acts as a proxy network address translation device for the one or more devices sharing the common network service provider, wherein a gateway device in the network acts as a network address translation device for the plurality of devices in the network, and wherein the computing device and the plurality of devices are client devices;

determining that the one or more network performance metrics associated with a particular device of the one or more devices are below a threshold value;

generating a comparison value by comparing the one or more network performance metrics associated with each of the one or more devices and one or more network performance metrics associated with the computing device;

determining that the computing device is selected for operating as a new proxy network address translation device for the one or more devices that share the common network service provider using the comparison value, wherein the comparison value indicates that the one or more network performance metrics associated with the computing device outperforms the one or more network performance metrics associated with the one or more devices;

aggregate network address translation traversal for the one or more, wherein the aggregating network address translation traversal includes:

establishing a connection from the computing device to each of the one or more devices;

establishing a single internal connection from the computing device to the gateway device for the one or more devices, wherein the computing device acts as a network address translator by mapping an Internet Protocol (IP) address of the one or more devices included in communications from the one or more devices to an IP address of the computing device; and facilitating a single external connection from the gateway device to the common network service provider to provide communications for each of the one or more devices and the computing device to the common network service provider;

transmitting communications as the new proxy network address translation device for the one or more devices, wherein the communications of the one or more devices are transmitted over the single internal connection with the gateway device and the single external connection with the common network service provider.

* * * * *